US012779439B2

(12) United States Patent
Punke et al.

(10) Patent No.: US 12,779,439 B2
(45) Date of Patent: Nov. 3, 2026

(54) SYSTEM FOR THE TREATMENT OF AN EXHAUST GAS OF A DIESEL COMBUSTION ENGINE

(71) Applicant: BASF Corporation, Florham Park, NJ (US)

(72) Inventors: Alfred Punke, Schwuelper Walle (DE); Gerd Grubert, Hannover (DE); Jeffrey B Hoke, Iselin, NJ (US); Shiang Sung, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 466 days.

(21) Appl. No.: 18/549,939

(22) PCT Filed: Mar. 18, 2022

(86) PCT No.: PCT/EP2022/057142
§ 371 (c)(1),
(2) Date: Sep. 11, 2023

(87) PCT Pub. No.: WO2022/195072
PCT Pub. Date: Sep. 22, 2022

(65) Prior Publication Data

US 2024/0157348 A1 May 16, 2024

(30) Foreign Application Priority Data

Mar. 18, 2021 (EP) .................................... 21163535

(51) Int. Cl.
*B01J 23/00* (2006.01)
*B01D 47/00* (2006.01)
(Continued)

(52) U.S. Cl.
CPC .......... *B01J 29/67* (2013.01); *B01D 53/9422* (2013.01); *B01D 53/9472* (2013.01);
(Continued)

(58) Field of Classification Search
CPC .... B01J 35/04; B01J 37/0246; B01J 23/8926; B01J 21/12; B01J 23/00; B01D 53/9481; B01D 53/9459
(Continued)

(56) References Cited

U.S. PATENT DOCUMENTS 5,677,258 A 10/1997 Kurokawa et al.
10,005,075 B2 6/2018 Rajaram et al.
(Continued)

FOREIGN PATENT DOCUMENTS

DE 19617123 10/1996
DE 102016101094 A1 8/2016
(Continued)

OTHER PUBLICATIONS

International Search Report and Written Opinion from corresponding PCT International Application No. PCT/EP2022/057142 dated Jun. 15, 2022.
(Continued)

*Primary Examiner* — Monzer R Chorbaji
(74) *Attorney, Agent, or Firm* — DLA Piper LLP (US)

(57) ABSTRACT

The present invention relates to a system for the treatment of an exhaust gas of a diesel combustion engine, a process for preparation of such a system, and a use thereof. In particular, said system comprises a NOx adsorber component and a lean NOx trap component, wherein the NOx adsorber component is comprised in a first catalyst comprising a first substrate and a first coating comprising a platinum group metal supported on a zeolitic material; and wherein the lean NOx trap component is comprised in a second catalyst comprising a second substrate and a second coating comprising Pt and Pd both supported on a specific first non-
(Continued)

zeolitic oxidic support material, wherein in said system the NOx adsorber component is arranged upstream of the lean NOx trap component.

13 Claims, 10 Drawing Sheets

(51) Int. Cl.

| | |
|---|---|
| ***B01D 50/00*** | (2022.01) |
| ***B01D 53/94*** | (2006.01) |
| ***B01J 21/04*** | (2006.01) |
| ***B01J 21/12*** | (2006.01) |
| ***B01J 23/40*** | (2006.01) |
| ***B01J 23/42*** | (2006.01) |
| ***B01J 23/44*** | (2006.01) |
| ***B01J 23/656*** | (2006.01) |
| ***B01J 29/67*** | (2006.01) |
| ***B01J 29/70*** | (2006.01) |
| ***F01N 3/28*** | (2006.01) |
| *B01J 35/56* | (2024.01) |

(52) U.S. Cl.

CPC .......... *B01D 53/9477* (2013.01); *B01J 21/04* (2013.01); *B01J 21/12* (2013.01); *B01J 23/42* (2013.01); *B01J 23/44* (2013.01); *B01J 23/6562* (2013.01); *B01J 29/7007* (2013.01); *F01N 3/2803* (2013.01); *B01D 2251/208* (2013.01); *B01D 2255/1021* (2013.01); *B01D 2255/1023* (2013.01); *B01D 2255/1025* (2013.01); *B01D 2255/91* (2013.01); *B01D 2257/404* (2013.01); *B01D 2258/012* (2013.01); *B01J 35/56* (2024.01); *F01N 2370/04* (2013.01); *F01N 2510/063* (2013.01); *F01N 2510/068* (2013.01)

(58) Field of Classification Search

USPC .......... 422/177; 502/303, 326, 339; 423/210

See application file for complete search history.

(56) References Cited

U.S. PATENT DOCUMENTS

| | | | |
|---|---|---|---|
| 10,145,281 B2 | 12/2018 | Ren et al. | |
| 2011/0173950 A1 | 7/2011 | Wan et al. | |
| 2015/0075140 A1 | 3/2015 | Swallow | |
| 2015/0251169 A1 | 9/2015 | Baba et al. | |
| 2017/0096922 A1* | 4/2017 | Bergeal | F01N 3/2807 |
| 2018/0058286 A1 | 3/2018 | Qi et al. | |
| 2018/0085707 A1 | 3/2018 | Feaviour | |
| 2020/0282385 A1 | 9/2020 | Gregori et al. | |

FOREIGN PATENT DOCUMENTS

| | | |
|---|---|---|
| DE | 102016112065 | 1/2017 |
| DE | 102016118810 | 4/2017 |
| EP | 3824988 A1 | 5/2021 |
| JP | 2017225974 A | 12/2017 |
| WO | 2017/001828 | 1/2017 |
| WO | 2017/060693 | 4/2017 |
| WO | 2018/183688 A1 | 10/2018 |
| WO | 2019/229675 A1 | 12/2019 |

OTHER PUBLICATIONS

International Preliminary Report on Patentability from corresponding PCT International Application No. PCT/EP2022/057142 dated Sep. 28, 2023.

Extended European Search Report from corresponding European Application No. 21163535.4 dated Sep. 20, 2021.

* cited by examiner

SYSTEM FOR THE TREATMENT OF AN EXHAUST GAS OF A DIESEL COMBUSTION ENGINE

TECHNICAL FIELD

The present invention relates to a system for the treatment of an exhaust gas of a diesel combustion engine, a process for preparation of such a system, and a use thereof.

INTRODUCTION

Typically, a diesel engine emits an exhaust gas comprising NO and $NO_2$. It is known that conventional systems for exhaust gas treatment comprising a diesel oxidation catalyst (DOC) and selective catalytic reduction (SCR) have the drawback of a poor conversion of exhaust gas systems in particular at temperatures below 200° C. As a remedy, lean NOx trap (LNT) catalysts are commonly used which can store NOx. Further, diesel oxidation catalysts are known containing a NOx adsorber component for storing NOx.

U.S. Ser. No. 10/005,075 B2 discloses a passive NOx adsorber effective to adsorb NOx at or below a low temperature and release the adsorbed NOx at temperatures above the low temperature, said passive NOx adsorber comprising a noble metal and a specific small pore molecular sieve. Further, an exhaust system is disclosed comprising the passive NOx adsorber and a catalyst component selected from the group consisting of a selective catalytic reduction (SCR) catalyst, a particulate filter, a SCR filter, a NOx adsorber catalyst, a three-way catalyst, an oxidation catalyst, and combinations thereof.

WO 2018/183688 A1 discloses an exhaust purification system for the reduction of emissions from an exhaust stream, comprising an oxygen detection system, a catalyst and an air injection system positioned between the oxygen detection system and the catalyst to inject air into the exhaust stream at designated exhaust conditions, to protect the catalyst from oxygen-deprived conditions. The catalyst may comprise a NOx storage catalyst, e.g. a passive NOx adsorber, or a cold start catalyst.

US 2018/0085707 A1 discloses an oxidation catalyst for treating an exhaust gas produced by a diesel engine comprising a catalytic region and a substrate, wherein the catalytic region comprises a catalytic material comprising a copper component and a platinum group metal; and a support material, wherein the platinum group metal and the copper component are each supported on the support material.

US 2017/0096922 A1 relates to an exhaust system comprising a passive NOx adsorber, the system comprising (i) a NOx adsorber catalyst comprising a molecular sieve catalyst disposed on a substrate, wherein the molecular sieve catalyst comprises a noble metal and a molecular sieve, (ii) means for introducing hydrocarbons into the exhaust gas, and (iii) a lean NOx trap, wherein the NOx absorber catalyst is upstream of both the means for introducing hydrocarbons into the exhaust gas and the lean NOx trap.

US 2015/075140 A1 discloses an exhaust system for treating an exhaust gas from an internal combustion engine, comprising (a) a modified lean NOx trap (LNT), wherein the modified LNT comprises Pt, Pd, Ba, and a ceria-containing material and the modified LNT has a Pt:Pd molar ratio of at least 3:1, (b) a urea injection system, (c) an ammonia-selective catalytic reduction catalyst, wherein the modified LNT stores NOx at temperatures below about 200° C. and releases the stored NOx at temperatures above about 200° C.

However, common lean NOx trap (LNT) catalysts suffer from sulfur poisoning, thus, they require a desulfation operation. In particular, a lean NOx trap (LNT) catalyst requires short rich pulse(s) from the engine to remove and convert the stored NOx and a high temperature lean-rich treatment to remove the stored sulfur. Such a desulfation operation can ensure the performance of the lean NOx trap (LNT) catalyst. In view of resource efficiency, it is, however, an aim to reduce the number of such rich regeneration pulses in order to reduce fuel consumption. Further, each pulse is generating greenhouse gases, in particular $N_2O$ and $CH_4$, such that this is also a reason to aim at a reduction of the number of such rich regeneration pulses.

On the other hand, a diesel oxidation catalyst (DOC) including a NOx adsorber function (NADOC) shows a high NOx adsorption at low temperatures during cold start of the engine and achieves thermal NOx desorption at 150 to 250° C. However, under specific real driving harsh cold start conditions including high NOx exposure and high temperatures a NA-DOC shows an inferior NOx adsorption performance. Further, common NA-DOC cannot withstand desulfation operation for regeneration of a lean NOx trap (LNT) catalyst.

DETAILED DESCRIPTION

It was an object of the present invention to provide a system which can be used for exhaust gas abatement in connection with any diesel engine requiring a high NOx conversion to meet current and future emission regulations including Euro 7. In particular, it was an object of the present invention to provide a system for the treatment of an exhaust gas of a diesel combustion engine showing an improved performance with respect to the conversion of NOx. Further, it was an object of the present invention to provide a system for the treatment of an exhaust gas of a diesel combustion engine showing an improved NOx adsorption in particular after cold start of the diesel engine. Further, it was an object of the present invention to provide a system for the treatment of an exhaust gas of a diesel combustion engine showing good $SO_2$ desorption properties when the lean NOx trap catalyst component is heated. Further, it was an object of the present invention to provide a system for the treatment of an exhaust gas of a diesel combustion engine showing an improved performance with respect to the conversion of NOx also after desulfation (DeSOx) operation, thus, being particularly suitable for working in connection with a fuel injector to effect such a desulfation (DeSOx) operation. Thus, it was an object of the present invention to provide a system comprising a NOx adsorber containing diesel oxidation catalyst which is able to store NOx and wherein the system also withstands DeSOx operation.

It was surprisingly found that an improved system can be provided with respect to the abatement of NOx emissions. In particular, it was found that a system according to the present invention exhibits a high NOx adsorption and low NOx emissions, in particular after cold start of the diesel engine. The system particularly comprises a NOx adsorber component and a lean NOx trap (LNT) component. More specifically, the system of the present invention comprises a NOx adsorber component and a lean NOx trap component, wherein the NOx adsorber component is comprised in a first catalyst comprising a first substrate and a first coating comprising a platinum group metal supported on a zeolitic material; and wherein the lean NOx trap component is comprised in a second catalyst comprising a second substrate and a second coating comprising Pt and Pd both supported on a specific first non-zeolitic oxidic support material, wherein in said system the NOx adsorber component is arranged upstream of the lean NOx trap component. Therefore, it has surprisingly been found that a selective catalytic reduction (SCR) function and a diesel oxidation catalyst including NOx adsorption (NA-DOC) can be combined in one system, which can achieve a comparatively high performance with respect to NOx conversion. Further, it was surprisingly found that the system of the present invention can desorb $SO_2$ when the lean NOx trap catalyst component is heated while keeping its NOx adsorption capability. In sum, it was surprisingly found that the system of the present invention is suitable for serving cold start NOx control and can be operated under lean-only conditions.

Therefore, the present invention relates to a system for the treatment of an exhaust gas of a diesel combustion engine, the system comprising a NOx adsorber component and a lean NOx trap component, wherein the NOx adsorber component is comprised in (a) a first catalyst comprising (a.1) a first substrate comprising an inlet end, an outlet end, a substrate axial length extending from the inlet end to the outlet end of the first substrate, and a plurality of passages defined by internal walls of the first substrate extending therethrough;

(a.2) a first coating being said NOx adsorber component, said coating being disposed on the surface of the internal walls of the first substrate over at least 50% of the substrate axial length of the first substrate, the first coating comprising a platinum group metal supported on a zeolitic material; and wherein the lean NOx trap component is comprised in (b) a second catalyst comprising (b.1) a second substrate comprising an inlet end, an outlet end, a substrate axial length extending from the inlet end to the outlet end of the second substrate, and a plurality of passages defined by internal walls of the second substrate extending therethrough;

(b.2) a second coating being said lean NOx trap component, said coating being disposed on the surface of the internal walls of the second substrate over at least 50% of the substrate axial length of the second substrate, the second coating comprising a first non-zeolitic oxidic support material, Pt and Pd, wherein Pt and Pd are both supported on the first non-zeolitic oxidic support material;

wherein the first non-zeolitic oxidic support material comprises $CeO_2$ and $Al_2O_3$, wherein at least 45 weight-% of the first non-zeolitic oxidic support material consist of $Al_2O_3$, calculated as $Al_2O_3$, and wherein at least 10 weight-% of the first non-zeolitic oxidic support material consist of $CeO_2$, calculated as $CeO_2$, wherein in said system the NOx adsorber component is arranged upstream of the lean NOx trap component.

It is preferred that the first substrate according to (a.1) of the system is a flow-through substrate or a wall flow filter substrate, more preferably a flow-through substrate, wherein the flow-through substrate is more preferably one or more of a cordierite flow-through substrate and a metallic flow-through substrate, more preferably a cordierite flow-through substrate or a metallic flowthrough substrate.

It is preferred that the first substrate according to (a.1) of the system is a monolith, more preferably a honeycomb monolith, wherein the first substrate according to (a.1) more preferably has a volume in the range of from 0.500 to 1.900 l, more preferably in the range of from 0.700 to 1.500 l, more preferably in the range of from 0.800 to 1.000 l, more preferably in the range of from 0.900 to 0.950 l, wherein the first substrate according to (a.1) more preferably is a cordierite flow-through substrate. Alternatively, it is preferred that the first substrate according to (a.1) has a volume in the range of from 0.550 to 0.650 l, wherein the first substrate according to (a.1) more preferably is a metallic flow-through substrate.

It is preferred that the first coating according to (a.2) of the system is disposed on the surface of the internal walls of the first substrate according to (a.1) over 50 to 100%, more preferably over 80 to 100%, more preferably over 90 to 100%, more preferably over 95 to 100%, more preferably over 98 to 100%, of the substrate axial length of the first substrate according to (a.1), wherein the first coating according to (a.2) more preferably is disposed on the surface of the internal walls of the first substrate according to (a.1) from the inlet end to the outlet end of the first substrate according to (a.1).

It is preferred that the platinum group metal comprised in the first coating according to (a.2) of the system comprises one or more of Pd, Pt, Rh, Ir, Os and Ru, more preferably one or more of Pd, Pt and Rh, more preferably one or more of Pd and Pt, wherein the platinum group metal more preferably comprises, more preferably consists of, Pd.

It is preferred that the zeolitic material comprised in the first coating according to (a.2) of the system comprises, more preferably consists of, a 10-membered ring pore zeolitic material.

It is preferred that the framework structure of the zeolitic material comprised in the first coating according to (a.2) of the system comprises a tetravalent element Y, a trivalent element X and oxygen, wherein Y more preferably comprises, more preferably consists of, one or more of Si, Sn, Ti, Zr and Ge, more preferably Si, and wherein X more preferably comprises, more preferably consists of, one or more of Al, B, In and Ga, more preferably Al.

It is preferred that the zeolitic material comprised in the first coating according to (a.2) of the system exhibits a molar ratio of Y:X, calculated as $YO_2:X_2O_3$, in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 26:1.

It is preferred that the zeolitic material comprised in the first coating according to (a.2) of the system has a framework type selected from the group consisting of FER, TON, MTT, SZR, MFI, MWW, AEL, HEU, AFO, a mixture of two or more thereof and a mixed type of two or more thereof, more preferably selected from the group consisting of FER, MFI, TON, a mixture of two or more thereof and a mixed type of two or more thereof, more preferably selected from the group consisting of FER and MFI, wherein more preferably the zeolitic material according to (a.2) has a framework type FER.

It is preferred that the platinum group metal comprised in the first coating according to (a.2) of the system is comprised in the zeolitic material according to (a.2), more preferably in an amount in the range of from 0.5 to 10 weight-%, more preferably in the range of from 0.75 to 6 weight-%, more preferably in the range of from 1 to 4 weight-%, more preferably in the range of from 1 to 3 weight-%, based on the weight of the platinum group metal and the zeolitic material, both comprised in the first coating according to (a.2).

It is preferred that the first coating according to (a.2) of the system comprises the platinum group metal according to (a.2), more preferably Pd, at a loading, calculated as elemental platinum group metal, more preferably as elemental Pd, in the range of from 80 to 200 g/ft$^3$, more preferably in the range of from 100 to 180 g/ft$^3$, more preferably in the range of from 120 to 160 g/ft$^3$, more preferably in the range of from 130 to 150 g/ft$^3$.

It is preferred that the first coating according to (a.2) further comprises $ZrO_2$, preferably at a loading in the range of from 0.11 to 0.20 g/in$^3$, more preferably in the range of from 0.13 to 0.17 g/in$^3$, more preferably in the range of from 0.14 to 0.16 g/in$^3$.

It is preferred that the first coating according to (a.2) of the system comprises from 0.001 to 1 weight-% more preferably from 0.01 to 0.1 weight-%, of $CeO_2$, calculated as $CeO_2$, wherein the first coating according to (a.2) is more preferably essentially free of $CeO_2$.

It is preferred that from 98 to 100 weight-%, more preferably from 99 to 100 weight-%, more preferably from 99.5 to 100 weight-%, more preferably from 99.9 to 100 weight-%, of the first coating according to (a.2) of the system consist of the platinum group metal according to (a.2) and the zeolitic material according to (a.2), wherein more preferably the first coating according to (a.2) essentially consists of the platinum group metal according to (a.2) and the zeolitic material according to (a.2).

It is preferred that the first catalyst according to (a) of the system comprises the first coating according to (a.2) at a loading in the range of from 0.5 to 8 g/in$^3$, more preferably in the range of from 1 to 5 g/in$^3$, more preferably in the range of from 1.5 to 4.5 g/in$^3$, more preferably in the range of from 2 to 4 g/in$^3$.

It is preferred that the first catalyst according to (a) of the system consists of the first substrate according to (a.1) and the first coating according to (a.2).

It is preferred that the second substrate according to (b.1) of the system is a flow-through substrate or a wall flow filter substrate, more preferably a flow-through substrate, wherein the flowthrough substrate is preferably one or more of a cordierite flow-through substrate and a metallic flow-through substrate, more preferably a cordierite flow-through substrate or a metallic flowthrough substrate, wherein the metallic flow-through substrate preferably is a metallic electrically and/or thermally conductive flow-through substrate.

It is preferred that the second substrate according to (b.1) of the system is a monolith, more preferably a honeycomb monolith, wherein the second substrate according to (b.1) more preferably has a volume in the range of from 0.400 to 2.100 l, preferably in the range of from 0.500 to 1.900 l, more preferably in the range of from 0.700 to 1.500 l, more preferably in the range of from 0.750 to 1.400 l, more preferably in the range of from 0.800 to 1.000 l, more preferably in the range of from 0.900 to 0.950 l, preferably if the second substrate according to (b.1) is a cordierite flow-through substrate. Alternatively, it is preferred that the second substrate according to (b.1) has a volume in the range of from 0.900 to 3.000 l, more preferably in the range of from 1.500 to 2.500 l, more preferably in the range of from 1.700 to 2.300 l, more preferably in the range of from 1.900 to 2.100 l, more preferably if the second substrate according to (b.1) is a metallic substrate.

It is preferred that the second coating according to (b.2) of the system is disposed on the surface of the internal walls of the second substrate according to (b.1) over 50 to 100%, more preferably over 80 to 100%, more preferably over 90 to 100%, more preferably over 95 to 100%, more preferably over 98 to 100%, of the substrate axial length of the second substrate according to (b.1), wherein the second coating according to (b.2) preferably is disposed on the surface of the internal walls of the second substrate according to (b.1) from the inlet end to the outlet end of the second substrate according to (b.1) or from the outlet end to the inlet end of the second substrate according to (b.1).

Preferably the first coating according to (a.2) of the system is disposed on the surface of the internal walls of the first substrate according to (a.1) over 98 to 100% of the substrate axial length of the first substrate according to (a.1), more preferably over the total substrate axial length of the first substrate according to (a.1), and the second coating according to (b.2) of the system is disposed on the surface of the internal walls of the second substrate according to (b.1) over 98 to 100%, of the substrate axial length of the second substrate according to (b.1), more preferably over the total substrate axial length of the second substrate according to (b.1), wherein the first substrate and the second substrate are arranged in consecutive order, with no gap between the two substrates (FIG. 3A). It is also conceivable that there is preferably a gap between the substrate, such as the distance between the substrates would be in the range of from 10 to 30 mm.

Alternatively, it is preferred that the first coating according to (a.2) of the system is disposed on the surface of the internal walls of the first substrate according to (a.1) over 50% or more and less than 100% of the first substrate axial length and that the second coating according to (b.2) of the system is disposed on the surface of the internal walls of the second substrate according to (b.1) over 50% or more and less than 100% of the second substrate axial length, wherein the first substrate and the second substrate are arranged in consecutive order, with no gap between the two substrates (FIG. 3B). It is also conceivable that there is preferably a gap between the substrate, such as the distance between the substrates would be in the range of from 10 to 30 mm.

It is preferred that from 45 to 90 weight-%, more preferably from 50 to 90 weight-%, more preferably from 51 to 89 weight-%, more preferably from 55 to 85 weight-%, more preferably from 60 to 80 weight-%, more preferably from 65 to 75 weight-%, of the first non-zeolitic oxidic support material comprised in the second coating according to (b.2) of the system consist of $Al_2O_3$, calculated as $Al_2O_3$.

It is preferred that from 10 to 55 weight-%, more preferably from 10 to 50 weight-%, more preferably from 11 to 49 weight-%, more preferably from 15 to 45 weight-%, more preferably from 20 to 40 weight-%, more preferably from 25 to 35 weight-%, of the first non-zeolitic oxidic support material comprised in the second coating according to (b.2) of the system consist of $CeO_2$.

It is preferred that the first non-zeolitic oxidic support material comprised in the second coating according to (b.2) further comprises BaO, wherein more preferably from 5 to 20 weight-%, more preferably from 5 to 15 weight-%, more preferably from 5 to 10 weight-%, of the first non-zeolitic oxidic support material comprised in the second coating according to (b.2) consist of BaO.

It is preferred that from 90 to 100 weight-%, more preferably from 95 to 100 weight-%, more preferably from 99 to 100 weight-%, more preferably from 99.9 to 100 weight-%, of the first non-zeolitic oxidic support material comprised in the second coating according to (b.2) of the system consist of $CeO_2$, $Al_2O_3$ and optionally BaO. In this connection, it is also conceivable that the first non-zeolitic oxidic support material comprised in the second coating according to (b.2) of the system comprises, preferably consists of, a mixed oxide comprising Ce, Al, optionally Ba, and O. Thus, it is conceivable that the first non-zeolitic oxidic support material comprised in the second coating according to (b.2) of the system comprises, preferably consists of, one or more of a mixture of ceria, alumina, and optionally baria, and a mixed oxide of ceria, alumina, and optionally baria.

It is preferred that the second coating according to (b.2) of the system comprises Pt at a loading, calculated as elemental Pt, in the range of from 50 to 190 g/ft$^3$, more preferably in the range of from 80 to 160 g/ft$^3$, more preferably in the range of from 100 to 140 g/ft$^3$, more preferably in the range of from 110 to 130 g/ft$^3$.

It is preferred that the second coating according to (b.2) of the system comprises Pd at a loading, calculated as elemental Pd, in the range of from 4 to 24 g/ft$^3$, more preferably in the range of from 8 to 20 g/ft$^3$, more preferably in the range of from 10 to 18 g/ft$^3$, more preferably in the range of from 12 to 16 g/ft$^3$.

It is preferred that the second coating according to (b.2) of the system exhibits a ratio of the weight of Pt, calculated as elemental Pt, to the weight of Pd, calculated as elemental Pd, in the range of from 2:1 to 20:1, more preferably in the range of from 5:1 to 12:1, more preferably in the range of from 7:1 to 10:1, more preferably in the range of from 8:1 to 9:1.

It is preferred that the second coating according to (b.2) of the system comprises the first non-zeolitic oxidic support material according to (b.2) at a loading in the range of from 0.5 to 5 g/in$^3$, preferably in the range of from 0.75 to 3 g/in$^3$, more preferably in the range of from 1 to 2 g/in$^3$, more preferably in the range of from 1.2 to 1.8 g/in$^3$, more preferably in the range of from 1.4 to 1.6 g/in$^3$. Alternatively, it is preferred that the second coating according to (b.2) comprises the first non-zeolitic oxidic support material according to (c.2) at a loading in the range of from 1 to 4 g/in$^3$, more preferably in the range of from 2 to 3 g/in$^3$, more preferably in the range of from 2.5 to 2.8 g/in$^3$.

It is preferred that the second coating according to (b.2) of the system further comprises Rh and a second non-zeolitic oxidic support material, wherein Rh is supported on the second non-zeolitic oxidic support material.

In the case where the second coating according to (b.2) of the system further comprises Rh and a second non-zeolitic oxidic support material, it is preferred that the second coating according to (b.2) of the system comprises Rh at a loading, calculated as elemental Rh, in the range of from 1 to 10 g/ft$^3$, more preferably in the range of from 2 to 8 g/ft$^3$, more preferably in the range of from 3 to 7 g/ft$^3$, more preferably in the range of from 4 to 6 g/ft$^3$.

Further in the case where the second coating according to (b.2) of the system further comprises Rh and a second non-zeolitic oxidic support material, it is preferred that the second non-zeolitic oxidic support material further comprised in the second coating according to (b.2) of the system is different to the first non-zeolitic oxidic support material comprised in the second coating according to (b.2), wherein the second non-zeolitic oxidic support material further comprised in the second coating according to (b.2) more preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, more preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the second coating according to (b.2) of the system further comprises Rh and a second non-zeolitic oxidic support material, it is preferred that the second coating according to (b.2) of the system exhibits a ratio of the weight of Pt, calculated as elemental Pt, to the weight of Rh, calculated as elemental Rh, in the range of from 5:1 to 50:1, more preferably in the range of from 10:1 to 40:1, more preferably in the range of from 15:1 to 33:1, more preferably in the range of from 18:1 to 30:1, more preferably in the range of from 20:1 to 28:1, more preferably in the range of from 21:1 to 27:1, more preferably in the range of from 22.5:1 to 25.8:1, more preferably in the range of from 23.0:1 to 25.3:1, more preferably in the range of from 23.6:1 to 24.8:1, more preferably in the range of from 23.8:1 to 24.6:1, more preferably in the range of from 24.0:1 to 24.4:1. Alternatively, it is preferred that the second coating according to (b.2) exhibits a ratio of the weight of Pt, calculated as elemental Pt, to the weight of Rh, calculated as elemental Rh, in the range of from 15:1 to 30:1, more preferably in the range of from 18:1 to 25:1, more preferably in the range of from 20:1 to 21:1.

Further in the case where the second coating according to (b.2) of the system further comprises Rh and a second non-zeolitic oxidic support material, it is preferred that the second coating according to (b.2) exhibits a ratio of the weight of Pd, calculated as elemental Pd, to the weight of Rh, calculated as elemental Rh, in the range of from 1:1 to 10:1, preferably in the range of from 2:1 to 5:1, more preferably in the range of from 2.5:1 to 3.0:1.

Further in the case where the second coating according to (b.2) of the system further comprises Rh and a second non-zeolitic oxidic support material, it is preferred that the second coating according to (b.2) comprises the second non-zeolitic oxidic support material further comprised in the second coating according to (b.2) at a loading in the range of from 0.1 to 1 g/in$^3$, more preferably in the range of from 0.2 to 0.7 g/in$^3$, more preferably in the range of from 0.3 to 0.5 g/in$^3$, more preferably in the range of from 0.35 to 0.45 g/in$^3$.

It is preferred that the second coating according to (b.2) of the system further comprises a first alkaline earth metal supported on a third non-zeolitic oxidic support material.

In the case where the second coating according to (b.2) of the system further comprises a first alkaline earth metal supported on a third non-zeolitic oxidic support material, it is preferred that the first alkaline earth metal comprises one or more of Mg, Ca, Sr and Ba, more preferably one or more of Mg and Ba, wherein the first alkaline earth metal more preferably comprises, more preferably consists of, Ba.

Further in the case where the second coating according to (b.2) of the system further comprises a first alkaline earth metal supported on a third non-zeolitic oxidic support material, it is preferred that the third non-zeolitic oxidic support material comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, more preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the second coating according to (b.2) of the system further comprises a first alkaline earth metal supported on a third non-zeolitic oxidic support material, it is preferred that the third non-zeolitic oxidic support material comprises the first alkaline earth metal at a loading, calculated as oxide of the first alkaline earth metal, preferably as BaO, in the range of from 0.5 to 5 weight-%, more preferably in the range of from 1.5 to 2.5 weight-%, more preferably in the range of from 1.8 to 2.2 weight-%, based on the weight of the third non-zeolitic oxidic support material.

Further in the case where the second coating according to (b.2) of the system further comprises a first alkaline earth metal supported on a third non-zeolitic oxidic support material, it is preferred that the second coating according to (b.2) comprises the first alkaline earth metal at a loading, calculated as oxide of the first alkaline earth metal, in the range of from 0.01 to 0.15 g/in$^3$, more preferably in the range of from 0.04 to 0.12 g/in$^3$, more preferably in the range of from 0.06 to 0.10 g/in$^3$, more preferably in the range of from 0.07 to 0.09 g/in$^3$.

Further in the case where the second coating according to (b.2) of the system further comprises a first alkaline earth metal supported on a third non-zeolitic oxidic support material, it is preferred that the second coating according to (b.2) comprises the third non-zeolitic oxidic support material at a loading in the range of from 1 to 7 g/in$^3$, more preferably in the range of from 3 to 5 g/in$^3$, more preferably in the range of from 3.7 to 4.3 g/in$^3$, more preferably in the range of from 3.9 to 4.1 g/in$^3$.

It is preferred that the second coating according to (b.2) of the system further comprises a second alkaline earth metal, wherein the second alkaline earth metal preferably comprises one or more of Mg, Ca, Sr and Ba, more preferably one or more of Mg and Ba, wherein the second alkaline earth metal more preferably comprises, more preferably consists of, Mg.

In the case where the second coating according to (b.2) of the system further comprises a second alkaline earth metal, it is preferred that the second coating according to (b.2) comprises the second alkaline earth metal at a loading, calculated as oxide of the second alkaline earth metal, preferably as MgO, in the range of from 0.1 to 0.5 g/in$^3$, more preferably in the range of from 0.20 to 0.40 g/in$^3$, more preferably in the range of from 0.25 to 0.35 g/in$^3$.

It is preferred that the second coating according to (b.2) of the system further comprises $ZrO_2$, more preferably at a loading in the range of from 0.01 to 0.10 g/in$^3$, more preferably in the range of from 0.03 to 0.06 g/in$^3$, more preferably in the range of from 0.04 to 0.06 g/in$^3$.

It is preferred that the second coating according to (b.2) of the system further comprises $CeO_2$, preferably at a loading in the range of from 2 to 4 g/in$^3$, more preferably in the range of from 2.60 to 2.90 g/in$^3$, more preferably in the range of from 2.70 to 2.75 g/in$^3$.

It is preferred that the second coating according to (b.2) of the system comprises from 0.001 to 1 weight-% more preferably from 0.01 to 0.1 weight-%, of a zeolitic material, calculated as zeolitic material as such, wherein the second coating according to (b.2) is more preferably essentially free of a zeolitic material.

It is preferred that from 98 to 100 weight-%, more preferably from 99 to 100 weight-%, more preferably from 99.5 to 100 weight-%, more preferably from 99.9 to 100 weight-%, of the second coating according to (b.2) of the system consist of Pt, Pd, the first non-zeolitic oxidic support material, optionally Rh, optionally the second non-zeolitic oxidic support material, optionally the first alkaline earth metal and the third non-zeolitic oxidic support material, optionally the second alkaline earth metal, and optionally $ZrO_2$, wherein more preferably the second coating according to (b.2) essentially consists of Pt, Pd, the first non-zeolitic oxidic support material, optionally Rh, optionally the second non-zeolitic oxidic support material, optionally the first alkaline earth metal and the third non-zeolitic oxidic support material, optionally the second alkaline earth metal, and optionally $ZrO_2$.

It is preferred that the second catalyst according to (b) of the system comprises the second coating according to (b.2) at a loading in the range of from 0.5 to 8 g/in$^3$, more preferably in the range of from 1 to 7 g/in$^3$, more preferably in the range of from 1.5 to 6.5 g/in$^3$.

It is preferred that the second catalyst according to (b) of the system consists of the second substrate according to (b.1) and the second coating according to (b.2).

It is preferred that the NOx adsorber component and the lean NOx trap component of the system are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

It is preferred that the NOx adsorber component and the lean NOx trap component of the system are directly consecutive components.

It is particularly preferred that no other component for the treatment of the exhaust gas is arranged between the NOx adsorber component and the lean NOx trap component.

It is preferred that the outlet end of the first substrate according to (a.1) and the inlet end of the second substrate according to (b.1) of the system are arranged opposite to each other, wherein the angle between the surface normal of the surface defined by the outlet end of the first substrate and the surface normal of the surface defined by the inlet end of the second substrate is more preferably in the range of from 0 to 5°, more preferably in the range of from 0 to 3°, more preferably in the range of from 0 to 1°.

It is preferred that the first substrate according to (a.1) and the second substrate according to (b.1) of the system together form one single substrate which comprises an inlet end, an outlet end, a substrate axial length extending from the inlet end to the outlet end of the single substrate, and a plurality of passages defined by internal walls of the single substrate extending therethrough, wherein the first coating according to (a.2) is disposed on the surface of the internal walls of the single substrate over at least 25%, more preferably over 25 to 50%, preferably over 40 to 50%, more preferably over 45 to 50%, more preferably over 47.5 to 50%, more preferably over 49 to 50%, of the substrate axial length of the single substrate and the second coating according to (b.2) is disposed on the surface of the internal walls of the single substrate, the surface of the internal walls of the single substrate being at least partially coated with the first coating according to (a.2), over at least 25%, more preferably over 25 to 50%, preferably over 40 to 50%, more preferably over 45 to 50%, more preferably over 47.5 to 50%, more preferably over 49 to 50%, of the substrate axial length of the single substrate, wherein the first coating according to (a.2) is preferably disposed on the surface of the internal walls of the single substrate from the inlet end to the outlet end, wherein the second coating according to (b.2) is preferably disposed on the surface of the internal walls of the single substrate from the outlet end to the inlet end, wherein the first coating according to (a.2) and the second coating according to (b.2) preferably do not overlap. Alternatively, the first coating according to (a.2) and the second coating according to (b.2) may overlap. In particular, it is preferred that in the region where the two coatings overlap the first coating according to (a.2) forms a bottom coat and the second coating according to (b.2) forms a top coat.

In the case where the first substrate according to (a.1) and the second substrate according to (b.1) of the system together form one single substrate, it is preferred that the single substrate comprises one or more cavities, more preferably one or two cavities, more preferably one cavity, wherein each cavity extends from an outer position to an inner position, wherein the outer position is located at the outer surface of the single substrate and the inner position is located within the single substrate, and wherein each cavity preferably extends through one or more of the internal walls of the single substrate.

Preferably, the first substrate (a.1) and the second substrate (b.1) form a single substrate (FIG. 4A), wherein the first coating according to (a.2) of the system is disposed on the surface of the internal walls of the first substrate according to (a.1) over 98 to 100% of the substrate axial length of the first substrate according to (a.1), more preferably over the total substrate axial length of the first substrate according to (a.1), and the second coating according to (b.2) of the system is disposed on the surface of the internal walls of the second substrate according to (b.1) over 98 to 100%, of the substrate axial length of the second substrate according to (b.1), more preferably over the total substrate axial length of the second substrate according to (b.1), and wherein, further, a cavity is located in the single substrate.

Alternatively, it is preferred that the first substrate (a.1) and the second substrate (b.1) form a single substrate (FIG. 4B), wherein the first coating according to (a.2) of the system is disposed on the surface of the internal walls of the first substrate according to (a.1) over 50% or more and less than 100% of the first substrate axial length and that the second coating according to (b.2) of the system is disposed on the surface of the internal walls of the second substrate according to (b.1) over 50% or more and less than 100% of the second substrate axial length, and wherein, further, a cavity is located in the single substrate.

In the case where the first substrate according to (a.1) and the second substrate according to (b.1) of the system together form one single substrate, and wherein the single substrate comprises one or more cavities, it is preferred that the outer position and the inner position define a direction of each cavity, wherein the plurality of passages comprised in the single substrate define a direction of the passages, wherein the plurality of passages preferably define passages which are arranged essentially in parallel to each other, wherein the angle between the direction of each cavity and the direction of the passages is preferably in the range of from 85 to 95°, more preferably in the range of from 88 to 92°, more preferably in the range of from 89 to 91°, wherein the direction of each cavity is more preferably essentially orthogonal to the direction of the passages.

Further in the case where the first substrate according to (a.1) and the second substrate according to (b.1) of the system together form one single substrate, and wherein the single substrate comprises one or more cavities, it is preferred that each cavity has a cavity length, wherein the cavity length is the distance from the outer position on the outer surface of the single substrate to the inner position within the single substrate, wherein the cavity length is more preferably in the range of from 1 to 99%, more preferably in the range of from 10 to 90%, more preferably in the range of from 30 to 70%, more preferably in the range of from 40 to 60%, of the length between the outer position and a postulated further outer position, wherein the postulated further outer position is located at the outer surface of the single substrate where a postulated extended direction of each cavity punctures the outer surface of the single substrate.

Further in the case where the first substrate according to (a.1) and the second substrate according to (b.1) of the system together form one single substrate, and wherein the single substrate comprises one or more cavities, it is preferred that the outer position is located at the outer surface of the single substrate in the range of from 25 to 75%, more preferably in the range of from 40 to 60%, more preferably in the range of from 45 to 55%, more preferably in the range of from 47.5 to 52.5%, more preferably in the range of from 49 to 51%, of the length of the single substrate from the inlet end.

Further in the case where the first substrate according to (a.1) and the second substrate according to (b.1) of the system together form one single substrate, and wherein the single substrate comprises one or more cavities, it is preferred that each cavity comprises a cross section having a surface normal, wherein the angle between the surface normal and the direction of each cavity ty is preferably in the range of from 0 to 5°, more preferably in the range of from 0 to 3°, more preferably in the range of from 0 to 1°, wherein the surface normal and the direction of each cavity are preferably essentially parallel to each other, wherein the direction of each cavity is preferably essentially orthogonal to the cross section.

In the case where each cavity comprises a cross section having a surface normal, it is preferred that the cross section is circular, wherein the cross section preferably has a diameter in the range of from 5 to 55 mm, more preferably in the range of from 10 to 50 mm.

Further in the case where the first substrate according to (a.1) and the second substrate according to (b.1) of the system together form one single substrate, and wherein the single substrate comprises one or more cavities, it is preferred that each cavity is suitable for introducing a reductant, preferably a fuel or a hydrocarbon, into at least a portion of the plurality of the passages comprised in the single substrate.

Further in the case where the first substrate according to (a.1) and the second substrate according to (b.1) of the system together form one single substrate, and wherein the single substrate comprises one or more cavities, it is preferred that the first coating according to (a.2) and the second coating according to (b.2) do not overlap, and wherein each cavity is located between the first coating according to (a.2) and the second coating according to (b.2).

It is preferred that the system further comprises at least one reductant injector, wherein each reductant injector preferably is a hydrocarbon injector, more preferably a fuel injector.

In the case where the system further comprises at least one reductant injector, it is preferred that the at least one reductant injector is arranged between the NOx adsorber component and the lean NOx trap component, more preferably between the first catalyst according to (a) and the second catalyst according to (b), if the system is in accordance with any one of the embodiments disclosed herein wherein the first substrate and the second substrate do not form together one single substrate, or wherein the at least one reductant injector is located in a cavity, if the system is in accordance with any one of the embodiments wherein the first substrate and the second substrate do form together one single substrate and wherein the single substrate comprises one or more cavities.

Thus, it is conceivable according to the present invention that a fuel or hydrocarbon injector is placed between the NOx adsorber component and the lean NOx trap component to allow desulfation (DeSOx) operation of the lean NOx trap, such that the NOx adsorber component is not negatively affected by said desulfation (DeSOx) operation.

Thus, it is particularly preferred that the system further comprises at least one reductant injector, wherein each reductant injector is arranged between the NOx adsorber component and the lean NOx trap component, preferably in the case where the first substrate and the second substrate do not form together one single substrate. Alternatively, it is preferred that the system further comprises at least one reductant injector, wherein each reductant injector is located in a cavity, in the case where wherein the first substrate and the second substrate do form together one single substrate and wherein the single substrate comprises one or more cavities.

It is preferred that the system does not comprise an air injector between the first catalyst according to (a) and the second catalyst according to (b), wherein the system preferably does not comprise an air injector between the NOx adsorber component and the lean NOx trap component, wherein the system preferably does not comprise an air injector in the one or more cavities as defined in the embodiments as disclosed herein above, wherein the system preferably does not comprise an air injector.

It is preferred that the system, in particular in the case where the first substrate and the second substrate do not form together one single substrate, further comprises (c) a gas heating component wherein the gas heating component is arranged downstream of the NOx adsorber component and upstream of the lean NOx trap component.

Preferably, the first coating according to (a.2) of the system is disposed on the surface of the internal walls of the first substrate according to (a.1) over 98 to 100% of the substrate axial length of the first substrate according to (a.1), more preferably over the total substrate axial length of the first substrate according to (a.1), and the second coating according to (b.2) of the system is disposed on the surface of the internal walls of the second substrate according to (b.1) over 98 to 100%, of the substrate axial length of the second substrate according to (b.1), more preferably over the total substrate axial length of the second substrate according to (b.1), wherein an additional component being a gas heating component or a reductant injector is located downstream of the first substrate and upstream of the second substrate (FIG. 5A).

Alternatively, the first coating according to (a.2) of the system is disposed on the surface of the internal walls of the first substrate according to (a.1) over 50% or more and less than 100% of the first substrate axial length and that the second coating according to (b.2) of the system is disposed on the surface of the internal walls of the second substrate according to (b.1) over 50% or more and less than 100% of the second substrate axial length, wherein an additional component being a gas heating component or a reductant injector is located downstream of the first substrate and upstream of the second substrate (FIG. 5B).

In the case where the system further comprises a gas heating component, it is preferred that the NOx adsorber component and the gas heating component are directly consecutive components, and wherein more preferably the gas heating component and the lean NOx trap component are directly consecutive components.

Further in the case where the system further comprises a gas heating component, it is preferred that no other component for the treatment of the exhaust gas is arranged between the NOx adsorber component and the gas heating component, and wherein more preferably no other component for the treatment of the exhaust gas is arranged between the gas heating component and the lean NOx trap component.

Further in the case where the system further comprises a gas heating component, it is preferred that the gas heating component comprises (c.1) a third substrate comprising an inlet end, an outlet end, a substrate axial length extending from the inlet end to the outlet end of the third substrate, and a plurality of passages defined by internal walls of the third substrate extending therethrough;

wherein the inlet end of the third substrate according to (c.1) and the outlet end of the first substrate according to (a.1) are coupled to allow exhaust gas exiting from the passages of the first substrate to enter the passages of the third substrate;

wherein the inlet end of the second substrate according to (b.1) and the outlet end of the third substrate according to (c.1) are coupled to allow exhaust gas exiting from the passages of the third substrate to enter the passages of the second substrate;

wherein the internal walls of the third substrate are thermally conductive to allow heating thereof for heating of exhaust gas flowing through the passages of the third substrate.

Further in the case where the system further comprises a gas heating component, it is preferred that the third substrate according to (c.1) is a flow-through substrate, preferably a metallic flowthrough substrate, more preferably a metallic electrically and/or thermally conductive flowthrough substrate.

Further in the case where the system further comprises a gas heating component, it is preferred that the third substrate according to (c.1) has a cylindrical shape, the diameter of the third substrate preferably being in the range of from 3 to 10 inches, more preferably in the range of from 3.5 to 8 inches, more preferably in the range of from 4 to 6 inches, wherein more preferably, the diameter of the third substrate is in the range of from 90 to 110%, preferably in the range of from 95 to 105%, more preferably in the range of from 98 to 102% of the diameter of the first substrate, the third substrate according to (c.1) preferably having an axial length in the range of from 0.15 to 2 inches, more preferably in the range of from 0.20 to 1.5 inches, more preferably in the range of from 0.30 to 1 inch.

Further in the case where the system further comprises a gas heating component, it is preferred that the third substrate according to (c.1) is an uncoated substrate and the gas heating component according to (c) consists of said third substrate.

Further in the case where the system further comprises a gas heating component, it is preferred that the gas heating component according to (c) further comprises (c.2) a third coating being disposed on the surface of the internal walls of the third substrate over at least 1% of the substrate axial length of the third substrate, wherein the third coating is preferably disposed on the surface of the internal walls of the third substrate from the outlet end to the inlet end of the third substrate, the third coating comprising a fourth non-zeolitic oxidic support material, Pt and Pd, wherein Pt and Pd are both supported on the fourth non-zeolitic oxidic support material;

wherein the fourth non-zeolitic oxidic support material comprises $CeO_2$ and $Al_2O_3$, wherein at least 45 weight-% of the fourth non-zeolitic oxidic support material consist of $Al_2O_3$, calculated as $Al_2O_3$, and wherein at least 10 weight-% of the fourth non-zeolitic oxidic support material consist of $CeO_2$, calculated as $CeO_2$.

In the case where the gas heating component according to (c) further comprises a third coating according to (c.2), it is preferred that the third coating is disposed on the surface of the internal walls of the third substrate over 5 to 100%, preferably over 10 to 90%, more preferably over 20 to 80%, more preferably over 30 to 70%, more preferably over 40 to 60%, of the substrate axial length of the third substrate, wherein the third coating is preferably disposed on the surface of the internal walls of the third substrate from the outlet end to the inlet end of the third substrate.

Further in the case where the gas heating component according to (c) further comprises a third coating according to (c.2), it is preferred that from 45 to 90 weight-%, preferably from 50 to 90 weight-%, more preferably from 51 to 89 weight-%, more preferably from 55 to 85 weight-%, more preferably from 60 to 80 weight-%, more preferably from 65 to 75 weight-%, of the fourth non-zeolitic oxidic support material comprised in the third coating according to (c.2) consist of $Al_2O_3$, calculated as $Al_2O_3$.

Further in the case where the gas heating component according to (c) further comprises a third coating according to (c.2), it is preferred that from 10 to 55 weight-%, preferably from 10 to 50 weight-%, more preferably from 11 to 49 weight-%, more preferably from 15 to 45 weight-%, more preferably from 20 to 40 weight-%, more preferably from 25 to 35 weight-%, of the fourth non-zeolitic oxidic support material comprised in the third coating according to (c.2) consist of $CeO_2$.

Further in the case where the gas heating component according to (c) further comprises a third coating according to (c.2), it is preferred that the fourth non-zeolitic oxidic support material comprised in the third coating according to (c.2) further comprises BaO, wherein preferably from 5 to 20 weight-%, more preferably from 5 to 15 weight-%, more preferably from 5 to 10 weight-%, of the fourth non-zeolitic oxidic support material comprised in the third coating according to (c.2) consist of BaO.

Further in the case where the gas heating component according to (c) of the system further comprises a third coating according to (c.2), it is preferred that from 90 to 100 weight-%, preferably from 95 to 100 weight-%, more preferably from 99 to 100 weight-%, more preferably from 99.9 to 100 weight-%, of the fourth non-zeolitic oxidic support material comprised in the third coating according to (c.2) consist of $CeO_2$, $Al_2O_3$, and optionally BaO. In this connection, it is also conceivable that the fourth non-zeolitic oxidic support material comprised in the third coating according to (c.2) comprises, preferably consists of, a mixed oxide comprising Ce, Al, optionally Ba, and O. Thus, it is conceivable that the fourth non-zeolitic oxidic support material comprised in the third coating according to (c.2) of the system comprises, preferably consists of, one or more of a mixture of ceria, alumina, and optionally BaO, and a mixed oxide of ceria, alumina, and optionally baria.

Further in the case where the gas heating component according to (c) further comprises a third coating according to (c.2), it is preferred that the third coating according to (c.2) comprises Pt at a loading, calculated as elemental Pt, in the range of from 50 to 190 g/ft$^3$, more preferably in the range of from 80 to 160 g/ft$^3$, more preferably in the range of from 100 to 140 g/ft$^3$, more preferably in the range of from 110 to 130 g/ft$^3$.

Further in the case where the gas heating component according to (c) further comprises a third coating according to (c.2), it is preferred that the third coating according to (b.2) comprises Pd at a loading, calculated as elemental Pd, in the range of from 4 to 24 g/ft$^3$, more preferably in the range of from 8 to 20 g/ft$^3$, more preferably in the range of from 10 to 18 g/ft$^3$, more preferably in the range of from 12 to 16 g/ft$^3$.

Further in the case where the gas heating component according to (c) further comprises a third coating according to (c.2), it is preferred that the third coating according to (c.2) exhibits a ratio of the weight of Pt, calculated as elemental Pt, to the weight of Pd, calculated as elemental Pd, in the range of from 2:1 to 20:1, preferably in the range of from 5:1 to 12:1, more preferably in the range of from 7:1 to 10:1, more preferably in the range of from 8:1 to 9:1.

Further in the case where the gas heating component according to (c) further comprises a third coating according to (c.2), it is preferred that the third coating according to (c.2) comprises the fourth non-zeolitic oxidic support material according to (c.2) at a loading in the range of from 0.5 to 5 g/in$^3$, preferably in the range of from 0.75 to 3 g/in$^3$, more preferably in the range of from 1 to 2 g/in$^3$, more preferably in the range of from 1.2 to 1.8 g/in$^3$, more preferably in the range of from 1.4 to 1.6 g/in$^3$. Alternatively, it is preferred that the third coating according to (c.2) comprises the fourth non-zeolitic oxidic support material according to (c.2) at a loading in the range of from 1 to 4 g/in$^3$, more preferably in the range of from 2 to 3 g/in$^3$, more preferably in the range of from 2.5 to 2.8 g/in$^3$.

Further in the case where the gas heating component according to (c) further comprises a third coating according to (c.2), it is preferred that the third coating according to (c.2) further comprises Rh and a fifth non-zeolitic oxidic support material, wherein Rh is supported on the fifth non-zeolitic oxidic support material.

In the case where the third coating according to (c.2) further comprises Rh and a fifth non-zeolitic oxidic support material, it is preferred that the third coating according to (c.2) comprises Rh at a loading, calculated as elemental Rh, in the range of from 1 to 10 g/ft$^3$, more preferably in the range of from 2 to 8 g/ft$^3$, more preferably in the range of from 3 to 7 g/ft$^3$, more preferably in the range of from 4 to 6 g/ft$^3$.

Further in the case where the third coating according to (c.2) further comprises Rh and a fifth non-zeolitic oxidic support material, it is preferred that the fifth non-zeolitic oxidic support material further comprised in the third coating according to (c.2) is different to the fourth non-zeolitic oxidic support material comprised in the third coating according to (c.2), wherein the fifth non-zeolitic oxidic support material further comprised in the third coating according to (c.2) preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the third coating according to (c.2) further comprises Rh and a fifth non-zeolitic oxidic support material, it is preferred that the third coating according to (c.2) exhibits a ratio of the weight of Pt, calculated as elemental Pt, to the weight of Rh, calculated as elemental Rh, in the range of from 5:1 to 50:1, preferably in the range of from 10:1 to 40:1, more preferably in the range of from 15:1 to 33:1, more preferably in the range of from 18:1 to 30:1, more preferably in the range of from 20:1 to 28:1, more preferably in the range of from 21:1 to 27:1, more preferably in the range of from 22.5:1 to 25.8:1, more preferably in the range of from 23.0:1 to 25.3:1, more preferably in the range of from 23.6:1 to 24.8:1, more preferably in the range of from 23.8:1 to 24.6:1, more preferably in the range of from 24.0:1 to 24.4:1. Alternatively, it is preferred that the third coating according to (c.2) exhibits a ratio of the weight of Pt, calculated as elemental Pt, to the weight of Rh, calculated as elemental Rh, in the range of from 15:1 to 30:1, more preferably in the range of from 18:1 to 25:1, more preferably in the range of from 20:1 to 21:1.

Further in the case where the third coating according to (c.2) further comprises Rh and a fifth non-zeolitic oxidic support material, it is preferred that the third coating according to (c.2) exhibits a ratio of the weight of Pd, calculated as elemental Pd, to the weight of Rh, calculated as elemental Rh, in the range of from 1:1 to 10:1, preferably in the range of from 2:1 to 5:1, more preferably in the range of from 2.5:1 to 3.0:1.

Further in the case where the third coating according to (c.2) further comprises Rh and a fifth non-zeolitic oxidic support material, it is preferred that the third coating according to (c.2) comprises the fifth non-zeolitic oxidic support material further comprised in the third coating according to (c.2) at a loading in the range of from 0.1 to 1 g/in$^3$, preferably in the range of from 0.2 to 0.7 g/in$^3$, more preferably in the range of from 0.3 to 0.5 g/in$^3$, more preferably in the range of from 0.35 to 0.45 g/in$^3$.

Further in the case where the gas heating component according to (c) further comprises a third coating according to (c.2), it is preferred that the third coating according to (c.2) further comprises a third alkaline earth metal supported on a sixth non-zeolitic oxidic support material.

In the case where the third coating according to (c.2) further comprises a third alkaline earth metal supported on a sixth non-zeolitic oxidic support material, it is preferred that the third alkaline earth metal comprises one or more of Mg, Ca, Sr and Ba, more preferably one or more of Mg and Ba, wherein the third alkaline earth metal more preferably comprises, more preferably consists of, Ba.

Further in the case where the third coating according to (c.2) further comprises a third alkaline earth metal supported on a sixth non-zeolitic oxidic support material, it is preferred that the sixth non-zeolitic oxidic support material comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the third coating according to (c.2) further comprises a third alkaline earth metal supported on a sixth non-zeolitic oxidic support material, it is preferred that the sixth non-zeolitic oxidic support material comprises the third alkaline earth metal at a loading, calculated as oxide of the third alkaline earth metal, preferably as BaO, in the range of from 0.5 to 5 weight-%, more preferably in the range of from 1.5 to 2.5 weight-%, more preferably in the range of from 1.8 to 2.2 weight-%, based on the weight of the sixth non-zeolitic oxidic support material.

Further in the case where the third coating according to (c.2) further comprises a third alkaline earth metal supported on a sixth non-zeolitic oxidic support material, it is preferred that the third coating according to (c.2) comprises the third alkaline earth metal at a loading, calculated as oxide of the third alkaline earth metal, in the range of from 0.01 to 0.15 g/in$^3$, more preferably in the range of from 0.04 to 0.12 g/in$^3$, more preferably in the range of from 0.06 to 0.10 g/in$^3$, more preferably in the range of from 0.07 to 0.09 g/in$^3$.

Further in the case where the third coating according to (c.2) further comprises a third alkaline earth metal supported on a sixth non-zeolitic oxidic support material, it is preferred that the third coating according to (c.2) comprises the sixth non-zeolitic oxidic support material at a loading in the range of from 1 to 7 g/in$^3$, more preferably in the range of from 3 to 5 g/in$^3$, more preferably in the range of from 3.7 to 4.3 g/in$^3$, more preferably in the range of from 3.9 to 4.1 g/in$^3$.

Further in the case where the gas heating component according to (c) further comprises a third coating according to (c.2), it is preferred that the third coating according to (c.2) further comprises a fourth alkaline earth metal, wherein the fourth alkaline earth metal preferably comprises one or more of Mg, Ca, Sr and Ba, more preferably one or more of Mg and Ba, wherein the fourth alkaline earth metal more preferably comprises, more preferably consists of, Mg.

In the case where the third coating according to (c.2) further comprises a fourth alkaline earth metal, it is preferred that the third coating according to (c.2) comprises the fourth alkaline earth metal at a loading, calculated as oxide of the fourth alkaline earth metal, preferably as MgO, in the range of from 0.1 to 0.5 g/in$^3$, more preferably in the range of from 0.20 to 0.40 g/in$^3$, more preferably in the range of from 0.25 to 0.35 g/in$^3$.

Further in the case where the gas heating component according to (c) further comprises a third coating according to (c.2), it is preferred that the third coating according to (c.2) further comprises $ZrO_2$, more preferably at a loading in the range of from 0.01 to 0.10 g/in$^3$, more preferably in the range of from 0.03 to 0.06 g/in$^3$, more preferably in the range of from 0.04 to 0.06 g/in$^3$.

Further in the case where the gas heating component according to (c) further comprises a third coating according to (c.2), it is preferred that the third coating according to (c.2) further comprises $CeO_2$, more preferably at a loading in the range of from 2 to 4 g/in$^3$, more preferably in the range of from 2.60 to 2.90 g/in$^3$, more preferably in the range of from 2.70 to 2.75 g/in$^3$.

Further in the case where the gas heating component according to (c) further comprises a third coating according to (c.2), it is preferred that the third coating according to (c.2) comprises from 0.001 to 1 weight-% more preferably from 0.01 to 0.1 weight-%, of a zeolitic material, calculated as zeolitic material as such, wherein the third coating according to (c.2) is more preferably essentially free of a zeolitic material.

Further in the case where the gas heating component according to (c) further comprises a third coating according to (c.2), it is preferred that from 98 to 100 weight-%, more preferably from 99 to 100 weight-%, more preferably from 99.5 to 100 weight-%, more preferably from 99.9 to 100 weight-%, of the third coating according to (c.2) consist of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$, wherein more preferably the third coating according to (c.2) essentially consists of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$.

Further in the case where the gas heating component according to (c) further comprises a third coating according to (c.2), it is preferred that the gas heating component according to (c) comprises the third coating according to (c.2) at a loading in the range of from 0.5 to 8 g/in$^3$, more preferably in the range of from 1 to 7 g/in$^3$, more preferably in the range of from 1.5 to 6.5 g/in$^3$.

Further in the case where the gas heating component according to (c) further comprises a third coating according to (c.2), it is preferred that the gas heating component according to (c) consists of the third substrate according to (c.1) and the third coating according to (c.2).

Further in the case where the gas heating component according to (c) further comprises a third coating according to (c.2), it is preferred that the third coating according to (c.2) exhibits essentially the same, more preferably the same chemical and physical characteristics as the second coating according to (b.2).

Further in the case where the gas heating component comprises a third substrate according to (c.1), it is preferred that the outlet end of the third substrate and the inlet end of the second substrate are arranged opposite to each other, wherein the angle between the surface normal of the surface defined by the outlet end of the third substrate and the surface normal of the surface defined by the inlet end of the second substrate is preferably in the range of from 0 to 5°, more preferably in the range of from 0 to 3°, more preferably in the range of from 0 to 1°.

Further in the case where the gas heating component comprises a third substrate according to (c.1), it is preferred that the outlet end of the third substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the third substrate and the inlet end of the second substrate are preferably spaced from one another by one or more spacer means, preferably one or more spacer rods, wherein a given spacer rod is preferably fixed at either the outlet end of the third substrate, or at the inlet end of the second substrate, or at the outlet end of the third substrate as well as at the inlet end of the second substrate, wherein the one or more spacer means, preferably the one or more spacer rods, are preferably electrically insulating.

Further in the case where the gas heating component comprises a third substrate according to (c.1), it is preferred that the system further comprises a jacket surrounding the third substrate according to (c) and the second substrate according to (b), wherein preferably from 95 to 100%, more preferably from 98 to 100%, more preferably from 99 to 100% of the inlet end face of the second substrate and preferably from 95 to 100%, more preferably from 98 to 100%, more preferably from 99 to 100% of the outlet end face of the third substrate are not covered by the jacket, wherein the jacket preferably comprises one or more means for connecting the third substrate to an electrical power supply.

Further, the present invention relates to a process for preparing a system for the treatment of an exhaust gas of a diesel combustion engine according to any one of the embodiments disclosed herein, said process comprising (1) providing a NOx adsorber component and a lean NOx trap component
 wherein the NOx adsorber component is comprised in
 (i) a first catalyst comprising
 (i.1) a first substrate comprising an inlet end, an outlet end, a substrate axial length extending from the inlet end to the outlet end of the first substrate, and a plurality of passages defined by internal walls of the first substrate extending therethrough;
 (i.2) a first coating being said NOx adsorber component, said coating being disposed on the surface of the internal walls of the first substrate over at least 50% of the substrate axial length of the first substrate,
 the first coating comprising a platinum group metal supported on a zeolitic material; and
 wherein the lean NOx trap component is comprised in
 (ii) a second catalyst comprising
 (ii.1) a second substrate comprising an inlet end, an outlet end, a substrate axial length extending from the inlet end to the outlet end of the second substrate, and a plurality of passages defined by internal walls of the second substrate extending therethrough;
 (ii.2) a second coating being said lean NOx trap component, said coating being disposed on the surface of the internal walls of the second substrate over at least 50% of the substrate axial length of the second substrate,
 the second coating comprising Pt, Pd, and a first non-zeolitic oxidic support material, wherein Pt and Pd are both supported on the first non-zeolitic oxidic support material, wherein the first non-zeolitic oxidic support material comprises $CeO_2$ and $Al_2O_3$, wherein at least 45 weight-% of the first non-zeolitic oxidic support material consist of $Al_2O_3$, calculated as $Al_2O_3$, and wherein at least 10 weight-% of the first non-zeolitic oxidic support material consist of $CeO_2$, calculated as $CeO_2$;
(2) arranging the NOx adsorber component upstream of the lean NOx trap component.

It is preferred that the first catalyst according to (i) of the process is prepared by and/or wherein the process further comprises (a) providing the first substrate, and a NOx adsorber mixture comprising water, a source of a platinum group metal and a zeolitic material;
(b) disposing the NOx adsorber mixture obtained in (a) on the surface of the internal walls of the first substrate over at least 50% of the substrate axial length of the first substrate; to obtain a first coating;
(c) optionally calcining of the coated first substrate obtained in (b) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (c), optionally drying of the coated first substrate obtained in (b) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

It is preferred that the first substrate according to (i.1) of the process is a flow-through substrate or a wall flow filter substrate, preferably a flow-through substrate, wherein the flow-through substrate is preferably one or more of a cordierite flow-through substrate and a metallic flowthrough substrate, more preferably a cordierite flow-through substrate, wherein the first substrate according to (i.1) preferably is a monolith, more preferably a honeycomb monolith, wherein the first substrate according to (i.1) more preferably has a volume in the range of from 0.500 to 1.900 l, preferably in the range of from 0.700 to 1.500 l, more preferably in the range of from 0.800 to 1.000 l, more preferably in the range of from 0.900 to 0.950 l, more preferably if the first substrate according to (i.1) is a cordierite flow-through substrate. Alternatively, it is preferred that the first substrate according to (i.1) has a volume in the range of from 0.550 to 0.650 l, more preferably if the first substrate is a metallic flow-through substrate.

It is preferred that the NOx adsorber mixture according to (a) of the process is disposed on the surface of the internal walls of the first substrate according to (i.1) over 50 to 100%, more preferably over 80 to 100%, preferably over 90 to 100%, more preferably over 95 to 100%, more preferably over 98 to 100%, of the substrate axial length of the first substrate according to (i.1), wherein the NOx adsorber mixture according to (a) preferably is disposed on the surface of the internal walls of the first substrate according to (i.1) from the inlet end to the outlet end of the first substrate according to (i.1).

It is preferred that the platinum group metal comprised in the NOx adsorber mixture according to (a) of the process comprises one or more of Pd, Pt, Rh, Ir, Os and Ru, more preferably one or more of Pd, Pt and Rh, more preferably one or more of Pd and Pt, wherein the platinum group metal more preferably comprises, more preferably consists of, Pd.

It is preferred that the zeolitic material comprised in the NOx adsorber mixture according to (a) of the process comprises, preferably consists of, a 10-membered ring pore zeolitic material.

It is preferred that the framework structure of the zeolitic material comprised in the NOx adsorber mixture according to (a) of the process comprises a tetravalent element Y, a trivalent element X and oxygen, wherein Y more preferably comprises, more preferably consists of, one or more of Si, Sn, Ti, Zr and Ge, more preferably Si, and wherein X more preferably comprises, more preferably consists of, one or more of Al, B, In and Ga, more preferably Al, and wherein the framework structure of the zeolitic material comprised in the NOx adsorber mixture according to (a) more preferably exhibits a molar ratio of Y:X, calculated as $YO_2:X_2O_3$, in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 26:1, wherein the framework structure of the zeolitic material comprised in the NOx adsorber mixture according to (a) preferably has a framework type selected from the group consisting of FER, TON, MTT, SZR, MFI, MWW, AEL, HEU, AFO, a mixture of two or more thereof and a mixed type of two or more thereof, more preferably selected from the group consisting of FER, MFI, TON, a mixture of two or more thereof and a mixed type of two or more thereof, more preferably selected from the group consisting of FER and MFI, wherein more preferably the zeolitic material comprised in the NOx adsorber mixture according to (a) has a framework type FER.

It is preferred that providing the NOx adsorber mixture according to (a) of the process comprises supporting the platinum group metal on the zeolitic material, wherein the platinum group metal is preferably supported on the zeolitic material in an amount in the range of from 0.5 to 10 weight-%, more preferably in the range of from 0.75 to 6 weight-%, more preferably in the range of from 1 to 4 weight-%, more preferably in the range of from 1 to 3 weight-%, based on the weight of the platinum group metal and the zeolitic material.

It is preferred that the NOx adsorber mixture obtained in (a) of the process and disposed on the surface of the internal walls of the first substrate comprises from 0.001 to 1 weight-% more preferably from 0.01 to 0.1 weight-%, of $CeO_2$, calculated as $CeO_2$, wherein the NOx adsorber mixture obtained in (a) and disposed on the surface of the internal walls of the first substrate is more preferably essentially free of $CeO_2$.

It is preferred that the second catalyst according to (ii) of the process is prepared by and/or wherein the process further comprises (d) providing the second substrate, and a first lean NOx trap mixture comprising water, a first non-zeolitic oxidic support material, Pt and Pd, wherein Pt and Pd are both supported on the first non-zeolitic oxidic support material;

(e) disposing the first lean NOx trap mixture obtained in (d) on the surface of the internal walls of the second substrate over at least 50% of the substrate axial length of the second substrate; to obtain a second coating;

(f) optionally calcining of the coated second substrate obtained in (e) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (f), optionally drying of the coated second substrate obtained in (e) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

In the case where the second catalyst according to (ii) of the process is prepared by and/or wherein the process further comprises (d), (e), and optionally (f), it is preferred that the second substrate according to (ii.1) is a flow-through substrate or a wall flow filter substrate, preferably a flow-through substrate, wherein the flow-through substrate is preferably one or more of a cordierite flow-through substrate and a metallic flow-through substrate, more preferably a cordierite flow-through substrate or a metallic flow-through substrate, wherein the metallic flow-through substrate preferably is a metallic electrically and/or thermally conductive flow-through substrate, wherein the second substrate according to (ii.1) preferably is a monolith, more preferably a honeycomb monolith, wherein the second substrate according to (ii.1) more preferably has a volume in the range of from 0.400 to 2.100 l, preferably in the range of from 0.500 to 1.900 l, more preferably in the range of from 0.700 to 1.500 l, more preferably in the range of from 0.750 to 1.400 l, more preferably in the range of from 0.800 to 1.000 l, more preferably in the range of from 0.900 to 0.950 l, more preferably if the second substrate according to (ii.1) is a cordierite flow-through substrate. Alternatively, it is preferred that the second substrate according to (ii.1) has a volume in the range of from 0.900 to 3.000 l, more preferably in the range of from 1.500 to 2.500 l, more preferably in the range of from 1.700 to 2.300 l, more preferably in the range of from 1.900 to 2.100 l, more preferably if the second substrate according to (ii.1) is a metallic flow-through substrate.

Further in the case where the second catalyst according to (ii) of the process is prepared by and/or wherein the process further comprises (d), (e), and optionally (f), it is preferred that the first lean NOx trap mixture according to (d) is disposed on the surface of the internal walls of the second substrate according to (ii.1) over 50 to 100%, more preferably over 80 to 100%, preferably over 90 to 100%, more preferably over 95 to 100%, more preferably over 98 to 100%, of the substrate axial length of the second substrate according to (ii.1), wherein the first lean NOx trap mixture according to (d) preferably is disposed on the surface of the internal walls of the second substrate according to (ii.1) from the inlet end to the outlet end of the second substrate according to (ii.1) or from the outlet end to the inlet end of the second substrate according to (ii.1).

Further in the case where the second catalyst according to (ii) of the process is prepared by and/or wherein the process further comprises (d), (e), and optionally (f), it is preferred that from 45 to 90 weight-%, more preferably from 50 to 90 weight-%, more preferably from 55 to 85 weight-%, more preferably from 60 to 80 weight-%, more preferably from 65 to 75 weight-%, of the first non-zeolitic oxidic support material comprised in the first lean NOx trap mixture according to (d) consist of $Al_2O_3$, calculated as $Al_2O_3$.

Further in the case where the second catalyst according to (ii) of the process is prepared by and/or wherein the process further comprises (d), (e), and optionally (f), it is preferred that from 10 to 55 weight-%, more preferably from 10 to 50 weight-%, more preferably from 15 to 45 weight-%, more preferably from 20 to 40 weight-%, more preferably from 25 to 35 weight-%, of the first non-zeolitic oxidic support material comprised in the first lean NOx trap mixture according to (d) of the process consist of $CeO_2$, calculated as $CeO_2$.

Further in the case where the second catalyst according to (ii) of the process is prepared by and/or wherein the process further comprises (d), (e), and optionally (f), it is preferred that the first non-zeolitic oxidic support material comprised in the first lean NOx trap mixture according to (d) further comprises BaO, wherein more preferably from 5 to 20 weight-%, more preferably from 5 to 15 weight-%, more preferably from 5 to 10 weight-%, of the first non-zeolitic oxidic support material comprised in the first lean NOx trap mixture according to (d) consist of BaO.

Further in the case where the second catalyst according to (ii) of the process is prepared by and/or wherein the process further comprises (d), (e), and optionally (f), it is preferred that from 90 to 100 weight-%, more preferably from 95 to 100 weight-%, more preferably from 99 to 100 weight-%, more preferably from 99.9 to 100 weight-%, of the first non-zeolitic oxidic support material comprised in the first lean NOx trap mixture according to (d) consists of $CeO_2$, $Al_2O_3$, and optionally baria. In this connection, it is also conceivable that the first non-zeolitic oxidic support material comprised in the first lean NOx trap mixture according to (d) comprises, preferably consists of, a mixed oxide comprising Ce, Al, optionally Ba, and O. Thus, it is conceivable that the first non-zeolitic oxidic support material comprised in the first lean NOx trap mixture according to (d) comprises, preferably consists of, one or more of a mixture of ceria, alumina, and optionally baria, and a mixed oxide of ceria, alumina, and optionally baria.

Further in the case where the second catalyst according to (ii) of the process is prepared by and/or wherein the process further comprises (d), (e), and optionally (f), it is preferred that the first lean NOx trap mixture according to (d) further comprises Rh and a second non-zeolitic oxidic support material, wherein Rh is supported on the second non-zeolitic oxidic support material.

In the case where the first lean NOx trap mixture according to (d) of the process further comprises Rh and a second non-zeolitic oxidic support material, it is preferred that the second non-zeolitic oxidic support material comprised in the first lean NOx trap mixture according to (d) comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, more preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the second catalyst according to (ii) of the process is prepared by and/or wherein the process further comprises (d), (e), and optionally (f), it is preferred that the first lean NOx trap mixture according to (d) further comprises a first alkaline earth metal supported on a third non-zeolitic oxidic support material, wherein the first alkaline earth metal more preferably comprises one or more of Mg, Ca, Sr and Ba, more preferably one or more of Mg and Ba, wherein the first alkaline earth metal more preferably comprises, more preferably consists of, Ba, wherein the third non-zeolitic oxidic support material preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the second catalyst according to (ii) of the process is prepared by and/or wherein the process further comprises (d), (e), and optionally (f), it is preferred that the first lean NOx trap mixture according to (d) further comprises a second alkaline earth metal, wherein the second alkaline earth metal more preferably comprises one or more of Mg, Ca, Sr and Ba, more preferably one or more of Mg and Ba, wherein the second alkaline earth metal more preferably comprises, more preferably consists of, Mg.

Further in the case where the second catalyst according to (ii) of the process is prepared by and/or wherein the process further comprises (d), (e), and optionally (f), it is preferred that the first lean NOx trap mixture according to (d) further comprises $ZrO_2$.

Further in the case where the second catalyst according to (ii) of the process is prepared by and/or wherein the process further comprises (d), (e), and optionally (f), it is preferred that the first lean NOx trap mixture according to (d) comprises from 0.001 to 1 weight-%, preferably from 0.01 to 0.1 weight-%, of a zeolitic material, calculated as zeolitic material as such, wherein the first lean NOx trap mixture according to (d) is more preferably essentially free of a zeolitic material.

It is preferred that the NOx adsorber component according to (1) and the lean NOx trap component according to (1) of the process are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

It is preferred that the NOx adsorber component according to (1) and the lean NOx trap component according to (1) of the process are arranged in directly consecutive order, wherein preferably no other component for the treatment of the exhaust gas is arranged between the NOx adsorber component and the lean NOx trap component.

It is preferred that the outlet end of the first substrate according to (i.1) and the inlet end of the second substrate according to (ii.1) are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

It is preferred that the first substrate according to (i.1) and the second substrate according to (ii.1) of the process together form one single substrate which comprises an inlet end, an outlet end, a substrate axial length extending from the inlet end to the outlet end of the single substrate, and a plurality of passages defined by internal walls of the single substrate extending therethrough, wherein the NOx adsorber mixture according to (a) is more preferably disposed on the surface of the internal walls of the single substrate over at least 50% of the substrate axial length of the single substrate and the first lean NOx trap mixture according to (d) is preferably disposed on the surface of the internal walls of the single substrate, the surface of the internal walls of the single substrate being at least partially coated with the NOx adsorber mixture according to (a), over at least 50% of the substrate axial length of the single substrate.

In the case where the first substrate according to (i.1) and the second substrate according to (ii.1) of the process together form one single substrate, it is preferred that the process further comprises prior to disposing the NOx adsorber mixture according to (a) and the first lean NOx trap mixture according to (d)

(g) providing one or more cavities, preferably one or two cavities, more preferably one cavity, in the single substrate, preferably by drilling one or more cavities into the one or more internal walls of the single substrate;

wherein each cavity extends from an outer position, wherein the outer position is located at the outer surface of the single substrate, to an inner position, wherein the inner position is located within the single substrate.

In the case where the process further comprises, prior to disposing the NOx adsorber mixture according to (a) and the first lean NOx trap mixture according to (d), providing one or more cavities according to (g), it is preferred that providing one or more cavities according to (g) is performed in a direction, preferably from the outer position to the inner position, comprising an angle between said direction and the direction of the passages, in the range of from 85 to 95°, more preferably in the range of from 88 to 92°, more preferably in the range of from 89 to 91°, wherein the direction of the cavity is more preferably essentially orthogonal to the direction of the passages, wherein the direction of the passages is preferably defined by the plurality of passages comprised in the single substrate, wherein the plurality of passages preferably define passages which are arranged essentially in parallel to each other, Further in the case where the process further comprises, prior to disposing the NOx adsorber mixture according to (a) and the first lean NOx trap mixture according to (d), providing one or more cavities according to (g), it is preferred that providing one or more cavities according to (g) is performed in a direction, preferably from the outer position to the inner position, over a distance from the outer position on the surface of the single substrate to the inner position within the single substrate, in the range of from 1 to 99%, preferably in the range of from 10 to 90%, more preferably in the range of from 30 to 70%, more preferably in the range of from 40 to 60%, of the distance between the outer position and a postulated further outer position, wherein the postulated further outer position is located at the outer surface of the single substrate where a postulated extended direction of the cavity punctures the outer surface of the single substrate.

Further in the case where the process further comprises, prior to disposing the NOx adsorber mixture according to (a) and the first lean NOx trap mixture according to (d), providing one or more cavities according to (g), it is preferred that providing one or more cavities according to (g) is performed from an outer position located at the outer surface of the single substrate in the range of from 25 to 75%, preferably in the range of from 40 to 60%, more preferably in the range of from 45 to 55%, more preferably in the range of from 47.5 to 52.5%, more preferably in the range of from 49 to 51%, of the length of the single substrate from the inlet end.

Further in the case where the process further comprises, prior to disposing the NOx adsorber mixture according to (a) and the first lean NOx trap mixture according to (d), providing one or more cavities according to (g), it is preferred that each cavity comprises a cross section having a surface normal, wherein the angle between the surface normal and the direction of the cavity is preferably in the range of from 0 to 5°, more preferably in the range of from 0 to 3°, more preferably in the range of from 0 to 1°, wherein the surface normal and the direction of the cavity are preferably essentially parallel to each other, wherein the direction of the cavity is preferably essentially orthogonal to the cross section.

In the case where each cavity comprises a cross section having a surface normal, it is preferred that the cross section is circular, wherein the cross section preferably has a diameter in the range of from 5 to 55 mm, preferably in the range of from 10 to 55 mm.

Further in the case where the process further comprises, prior to disposing the NOx adsorber mixture according to (a) and the first lean NOx trap mixture according to (d), providing one or more cavities according to (g), it is preferred that each cavity is suitable for introducing a reductant, preferably a fuel or a hydrocarbon, into at least a portion of the plurality of the passages comprised in the single substrate.

Further in the case where the process further comprises, prior to disposing the NOx adsorber mixture according to (a) and the first lean NOx trap mixture according to (d), providing one or more cavities according to (g), it is preferred that the first coating according to (a.2) and the second coating according to (b.2) do not overlap, and wherein at least one of the one or more cavities is located between the first coating according to (a.2) and the second coating according to (b.2), wherein preferably all of the one or more cavities are located between the first coating according to (a.2) and the second coating according to (b.2).

It is preferred that the process further comprises (h) providing at least one reductant injector, wherein each reductant injector preferably is a hydrocarbon injector, more preferably a fuel injector, wherein each reductant injector is arranged upstream of the lean NOx trap component, wherein each reductant injector is preferably arranged between the NOx adsorber component and the lean NOx trap component, more preferably between the first catalyst according to (a) and the second catalyst according to (b), wherein the process is preferably in accordance with any one of the embodiments disclosed herein wherein the first substrate and the second substrate do not form together one single substrate, or (k) providing at least one reductant injector into a cavity provided according to (g), wherein each reductant injector preferably is a hydrocarbon injector, more preferably a fuel injector, wherein the process is preferably in accordance with any one of the embodiments disclosed herein wherein the first substrate and the second substrate together form one single substrate.

It is preferred that no air injector is arranged between the first catalyst according to (i) and the second catalyst according to (ii), wherein more preferably no air injector is arranged between the NOx adsorber component and the lean NOx trap component, wherein more preferably no air injector is provided.

It is preferred that the process further comprises (3) providing a gas heating component (4) arranging the gas heating component downstream of the NOx adsorber component and upstream of the lean NOx trap component.

In the case where the process further comprises (3) and (4), it is preferred that the NOx adsorber component and the gas heating component are arranged in directly consecutive order, and wherein preferably the gas heating component and the lean NOx trap component are arranged in directly consecutive order.

Further in the case where the process further comprises (3) and (4), it is preferred that no other component for the treatment of the exhaust gas is arranged between the NOx adsorber component and the gas heating component, and wherein preferably no other component for the treatment of the exhaust gas is arranged between the gas heating component and the lean NOx trap component.

Further in the case where the process further comprises (3) and (4), it is preferred that providing the gas heating component according to (3) comprises (iii.1) providing a third substrate comprising an inlet end, an outlet end, a substrate axial length extending from the inlet end to the outlet end of the third substrate, and a plurality of passages defined by internal walls of the third substrate extending therethrough;

coupling the inlet end of the third substrate according to (iii.1) with the outlet end of the first substrate according to (i.1) to allow exhaust gas exiting from the passages of the first substrate to enter the passages of the third substrate; and coupling the inlet end of the second substrate according to (ii.1) with the outlet end of the third substrate according to (iii.1) to allow exhaust gas exiting from the passages of the third substrate to enter the passages of the second substrate;

wherein the internal walls of the third substrate are thermally conductive to allow heating thereof for heating of exhaust gas flowing through the passages of the third substrate.

In the case where providing the gas heating component according to (3) comprises (iii.1), it is preferred that the third substrate provided according to (iii.1) is a flow-through substrate, preferably a metallic flow-through substrate, more preferably a metallic electrically and/or thermally conductive flow-through substrate.

Further in the case where providing the gas heating component according to (3) comprises (iii.1), it is preferred that the third substrate provided according to (iii.1) has a cylindrical shape, the diameter of the third substrate preferably being in the range of from 3 to 10 inches, more preferably in the range of from 3.5 to 8 inches, more preferably in the range of from 4 to 6 inches, wherein more preferably, the diameter of the third substrate is in the range of from 90 to 110%, preferably in the range of from 95 to 105%, more preferably in the range of from 98 to 102% of the diameter of the first substrate, the third substrate provided according to (iii.1) preferably having an axial length in the range of from 0.15 to 2 inches, more preferably in the range of from 0.20 to 1.5 inches, more preferably in the range of from 0.30 to 1 inch.

Further in the case where providing the gas heating component according to (3) comprises (iii.1), it is preferred that the gas heating component provided according to (3) consists of the third substrate according to (iii.1), said substrate being an uncoated substrate.

Further in the case where providing the gas heating component according to (3) comprises (iii.1), it is preferred that the process further comprises (iii.2) disposing a second lean NOx trap mixture on the surface of the internal walls of the third substrate provided according to (3) over at least 1% of the substrate axial length of the third substrate; to obtain a third coating;

wherein the second lean NOx trap mixture is preferably disposed on the surface of the internal walls of the third substrate from the outlet end to the inlet end of the third substrate, the second lean NOx trap mixture comprising a fourth non-zeolitic oxidic support material, Pt and Pd, wherein Pt and Pd are both supported on the fourth non-zeolitic oxidic support material;

wherein the fourth non-zeolitic oxidic support material comprises $CeO_2$ and $Al_2O_3$, wherein at least 45 weight-% of the fourth non-zeolitic oxidic support material consist of $Al_2O_3$, calculated as $Al_2O_3$, and wherein at least 10 weight-% of the fourth non-zeolitic oxidic support material consist of $CeO_2$, calculated as $CeO_2$;

(iii.3) optionally calcining of the coated third substrate obtained in (iii.1) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (iii.2), optionally drying of the coated second substrate obtained in (iii.1) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

In the case where the process further comprises (iii.2) and optionally (iii.3), it is preferred that the second lean NOx trap mixture is disposed according to (iii.2) on the surface of the internal walls of the third substrate over 5 to 100%, more preferably over 10 to 90%, more preferably over 20 to 80%, more preferably over 30 to 70%, more preferably over 40 to 60%, of the substrate axial length of the third substrate, wherein disposing the third coating is preferably performed on the surface of the internal walls of the third substrate from the outlet end to the inlet end of the third substrate.

Further in the case where the process further comprises (iii.2) and optionally (iii.3), it is preferred that from 45 to 90 weight-%, more preferably from 50 to 90 weight-%, more preferably from 51 to 89 weight-%, more preferably from 55 to 85 weight-%, more preferably from 60 to 80 weight-%, more preferably from 65 to 75 weight-%, of the fourth non-zeolitic oxidic support material comprised in the second lean NOx trap mixture consist of $Al_2O_3$, calculated as $Al_2O_3$.

Further in the case where the process further comprises (iii.2) and optionally (iii.3), it is preferred that from 10 to 55 weight-%, more preferably from 10 to 50 weight-%, more preferably from 11 to 49 weight-%, more preferably from 15 to 45 weight-%, more preferably from 20 to 40 weight-%, more preferably from 25 to 35 weight-%, of the fourth non-zeolitic oxidic support material comprised in the second lean NOx trap mixture consist of $CeO_2$.

Further in the case where the process further comprises (iii.2) and optionally (iii.3), it is preferred that the fourth non-zeolitic oxidic support material comprised in the second lean NOx trap mixture further comprises BaO, wherein more preferably from 5 to 20 weight-%, more preferably from 5 to 15 weight-%, more preferably from 5 to 10 weight-%, of the fourth non-zeolitic oxidic support material comprised in the second lean NOx trap mixture consist of BaO.

Further in the case where the process further comprises (iii.2) and optionally (iii.3), it is preferred that from 90 to 100 weight-%, more preferably from 95 to 100 weight-%, more preferably from 99 to 100 weight-%, more preferably from 99.9 to 100 weight-%, of the fourth non-zeolitic oxidic support material comprised in the second lean NOx trap mixture consist of $CeO_2$, $Al_2O_3$, and BaO. In this connection, it is also conceivable that the fourth non-zeolitic oxidic support material comprised in the second lean NOx trap mixture comprises, preferably consists of, a mixed oxide comprising Ce, Al, optionally Ba, and O. Thus, it is conceivable that the fourth non-zeolitic oxidic support material comprised in the second lean NOx trap mixture comprises, preferably consists of, one or more of a mixture of ceria, alumina, and optionally baria, and a mixed oxide of ceria, alumina, and optionally baria.

Further in the case where the process further comprises (iii.2) and optionally (iii.3), it is preferred that the second lean NOx trap mixture further comprises Rh and a fifth non-zeolitic oxidic support material, wherein Rh is supported on the fifth non-zeolitic oxidic support material.

In the case where the second lean NOx trap mixture further comprises Rh and a fifth non-zeolitic oxidic support material, it is preferred that the fifth non-zeolitic oxidic support material further comprised in the second lean NOx trap mixture is different to the fourth non-zeolitic oxidic support material comprised in the second lean NOx trap mixture, wherein the fifth non-zeolitic oxidic support material further comprised in the second lean NOx trap mixture more preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the process further comprises (iii.2) and optionally (iii.3), it is preferred that the second lean NOx trap mixture further comprises a third alkaline earth metal supported on a sixth non-zeolitic oxidic support material.

In the case where the second lean NOx trap mixture further comprises a third alkaline earth metal supported on a sixth non-zeolitic oxidic support material, it is preferred that the third alkaline earth metal comprised in the second lean NOx trap mixture comprises one or more of Mg, Ca, Sr and Ba, more preferably one or more of Mg and Ba, wherein the third alkaline earth metal more preferably comprises, more preferably consists of, Ba.

Further in the case where the second lean NOx trap mixture further comprises a third alkaline earth metal supported on a sixth non-zeolitic oxidic support material, it is preferred that the sixth non-zeolitic oxidic support material comprised in the second lean NOx trap mixture comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, more preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

Further in the case where the second lean NOx trap mixture further comprises a third alkaline earth metal supported on a sixth non-zeolitic oxidic support material, it is preferred that the sixth non-zeolitic oxidic support material comprised in the second lean NOx trap mixture comprises the third alkaline earth metal at a loading, calculated as oxide of the third alkaline earth metal, preferably as BaO, in the range of from 0.5 to 5 weight-%, more preferably in the range of from 1.5 to 2.5 weight-%, more preferably in the range of from 1.8 to 2.2 weight-%, based on the weight of the sixth non-zeolitic oxidic support material.

Further in the case where the process further comprises (iii.2) and optionally (iii.3), it is preferred that the second lean NOx trap mixture further comprises a fourth alkaline earth metal, wherein the fourth alkaline earth metal more preferably comprises one or more of Mg, Ca, Sr and Ba, more preferably one or more of Mg and Ba, wherein the fourth alkaline earth metal more preferably comprises, more preferably consists of, Mg.

Further in the case where the process further comprises (iii.2) and optionally (iii.3), it is preferred that the second lean NOx trap mixture comprises from 0.001 to 1 weight-% more preferably from 0.01 to 0.1 weight-%, of a zeolitic material, calculated as zeolitic material as such, wherein the second lean NOx trap mixture is more preferably essentially free of a zeolitic material.

Further in the case where the process further comprises (iii.2) and optionally (iii.3), it is preferred that from 98 to 100 weight-%, more preferably from 99 to 100 weight-%, more preferably from 99.5 to 100 weight-%, more preferably from 99.9 to 100 weight-%, of the second lean NOx trap mixture consist of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$, wherein more preferably the second lean NOx trap mixture essentially consists of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$.

Further in the case where providing the gas heating component according to (3) comprises (iii.1), it is preferred that the outlet end of the third substrate and the inlet end of the second substrate are arranged opposite to each other, wherein the angle between the surface normal of the surface defined by the outlet end of the third substrate and the surface normal of the surface defined by the inlet end of the second substrate is preferably in the range of from 0 to 5°, more preferably in the range of from 0 to 3°, more preferably in the range of from 0 to 1°.

Further in the case where providing the gas heating component according to (3) comprises (iii.1), it is preferred that the outlet end of the third substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the third substrate and the inlet end of the second substrate are preferably spaced from one another by one or more spacer means, preferably one or more spacer rods, wherein a given spacer rod is preferably fixed at either the outlet end of the third substrate, or at the inlet end of the second substrate, or at the outlet end of the third substrate as well as at the inlet end of the second substrate, wherein the one or more spacer means, preferably the one or more spacer rods, are preferably electrically insulating.

Further in the case where providing the gas heating component according to (3) comprises (iii.1), it is preferred that the process further comprises (I) mounting a jacket around the third substrate according to (iii.1) and the second substrate according to (ii.1), wherein preferably from 95 to 100%, more preferably from 98 to 100%, more preferably from 99 to 100% of the inlet end face of the second substrate and preferably from 95 to 100%, more preferably from 98 to 100%, more preferably from 99 to 100% of the outlet end face of the third substrate are not covered by the jacket, wherein the jacket preferably comprises one or more means for connecting the third substrate to an electrical power supply.

Yet further, the present invention relates to a system for the treatment of an exhaust gas of a diesel combustion engine, preferably a system for the treatment of an exhaust gas of a diesel combustion engine according to any one of the embodiments disclosed herein, obtainable or obtained by a process according to any one of the embodiments disclosed herein.

Yet further, the present invention relates to a method for the treatment of an exhaust gas of a diesel combustion engine, comprising providing an exhaust gas from a diesel combustion engine and passing said exhaust gas through a system according to any one of the embodiments disclosed herein.

It is preferred that the system through which the exhaust gas from a diesel combustion engine is passed comprises a fuel injector, wherein a fuel is injected through the fuel injector into the exhaust gas passed through said system.

Yet further, the present invention relates to a use of a system according to any one of the embodiments disclosed herein for treating an exhaust gas of a diesel combustion engine, said use particularly comprising passing said exhaust gas through said system.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments 1 to 4", every embodiment in this range is meant to be explicitly disclosed for the skilled person, i.e. the wording of this term is to be understood by the skilled person as being synonymous to "any one of embodiments 1, 2, 3, and 4".

Further, it is explicitly noted that the following set of embodiments is not the set of claims determining the extent of protection, but represents a suitably structured part of the description directed to general and preferred aspects of the present invention.

1. A system for the treatment of an exhaust gas of a diesel combustion engine, the system comprising a NOx adsorber component and a lean NOx trap component, wherein the NOx adsorber component is comprised in
   (a) a first catalyst comprising
   (a.1) a first substrate comprising an inlet end, an outlet end, a substrate axial length extending from the inlet end to the outlet end of the first substrate, and a plurality of passages defined by internal walls of the first substrate extending therethrough;
   (a.2) a first coating being said NOx adsorber component, said coating being disposed on the surface of the internal walls of the first substrate over at least 50% of the substrate axial length of the first substrate,
   the first coating comprising a platinum group metal supported on a zeolitic material; and
   wherein the lean NOx trap component is comprised in
   (b) a second catalyst comprising
   (b.1) a second substrate comprising an inlet end, an outlet end, a substrate axial length extending from the inlet end to the outlet end of the second substrate, and a plurality of passages defined by internal walls of the second substrate extending therethrough;
   (b.2) a second coating being said lean NOx trap component, said coating being disposed on the surface of the internal walls of the second substrate over at least 50% of the substrate axial length of the second substrate,
   the second coating comprising
   a first non-zeolitic oxidic support material, Pt and Pd, wherein Pt and Pd are both supported on the first non-zeolitic oxidic support material;
   wherein the first non-zeolitic oxidic support material comprises $CeO_2$ and $Al_2O_3$,
   wherein at least 45 weight-% of the first non-zeolitic oxidic support material consist of $Al_2O_3$, calculated as $Al_2O_3$, and wherein at least 10 weight-% of the first non-zeolitic oxidic support material consist of $CeO_2$, calculated as $CeO_2$, wherein in said system the NOx adsorber component is arranged upstream of the lean NOx trap component.

2. The system of embodiment 1, wherein the first substrate according to (a.1) is a flowthrough substrate or a wall flow filter substrate, preferably a flow-through substrate, wherein the flow-through substrate is preferably one or more of a cordierite flow-through substrate and a metallic flow-through substrate, more preferably a cordierite flow-through substrate.
3. The system of embodiment 1 or 2, wherein the first substrate according to (a.1) is a monolith, preferably a honeycomb monolith, wherein the first substrate according to (a.1) more preferably has a volume in the range of from 0.500 to 1.900 l,
   more preferably in the range of from 0.700 to 1.500 l, more preferably in the range of from 0.800 to 1.000 l, more preferably in the range of from 0.900 to 0.950 l, or
   more preferably in the range of from 0.550 to 0.650 l.
4. The system of any one of embodiments 1 to 3, wherein the first coating according to (a.2) is disposed on the surface of the internal walls of the first substrate according to (a.1) over 50 to 100%, preferably over 80 to 100%, more preferably over 90 to 100%, more preferably over 95 to 100%, more preferably over 98 to 100%, of the substrate axial length of the first substrate according to (a.1), wherein the first coating according to (a.2) preferably is disposed on the surface of the internal walls of the first substrate according to (a.1) from the inlet end to the outlet end of the first substrate according to (a.1).
5. The system of any one of embodiments 1 to 4, wherein the platinum group metal comprised in the first coating according to (a.2) comprises one or more of Pd, Pt, Rh, Ir, Os and Ru, preferably one or more of Pd, Pt and Rh, more preferably one or more of Pd and Pt, wherein the platinum group metal more preferably comprises, more preferably consists of, Pd.
6. The system of any one of embodiments 1 to 5, wherein the zeolitic material comprised in the first coating according to (a.2) comprises, preferably consists of, a 10-membered ring pore zeolitic material.
7. The system of any one of embodiments 1 to 6, wherein the framework structure of the zeolitic material comprised in the first coating according to (a.2) comprises a tetravalent element Y, a trivalent element X and oxygen, wherein Y preferably comprises, more preferably consists of, one or more of Si, Sn, Ti, Zr and Ge, more preferably Si, and wherein X preferably comprises, more preferably consists of, one or more of Al, B, In and Ga, more preferably Al.
8. The system of any one of embodiments 1 to 7, wherein the zeolitic material comprised in the first coating according to (a.2) exhibits a molar ratio of Y:X, calculated as $YO_2:X_2O_3$, in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 26:1.
9. The system of any one of embodiments 1 to 8, wherein the zeolitic material comprised in the first coating according to (a.2) has a framework type selected from the group consisting of FER, TON, MTT, SZR, MFI, MWW, AEL, HEU, AFO, a mixture of two or more thereof and a mixed type of two or more thereof, more preferably selected from the group consisting of FER, MFI, TON, a mixture of two or more thereof and a mixed type of two or more thereof, more preferably selected from the group consisting of FER and MFI, wherein more preferably the zeolitic material according to (a.2) has a framework type FER.
10. The system of any one of embodiments 1 to 9, wherein the platinum group metal comprised in the first coating according to (a.2) is comprised in the zeolitic material according to (a.2), preferably in an amount in the range of from 0.5 to 10 weight-%, more preferably in the range of from 0.75 to 6 weight-%, more preferably in the range of from 1 to 4 weight-%, more preferably in the range of from 1 to 3 weight-%, based on the weight of the platinum group metal and the zeolitic material, both comprised in the first coating according to (a.2).
11. The system of any one of embodiments 1 to 10, wherein the first coating according to (a.2) comprises the platinum group metal according to (a.2), preferably Pd, at a loading, calculated as elemental platinum group metal, more preferably as elemental Pd, in the range of from 80 to 200 g/ft$^3$, more preferably in the range of from 100 to 180 g/ft$^3$, more preferably in the range of from 120 to 160 g/ft$^3$, more preferably in the range of from 130 to 150 g/ft$^3$.
12. The system of any one of embodiments 1 to 11, wherein the first coating according to (a.2) comprises from 0.001 to 1 weight-% preferably from 0.01 to 0.1 weight-%, of $CeO_2$, calculated as $CeO_2$, wherein the first coating according to (a.2) is more preferably essentially free of $CeO_2$, and/or
   wherein the first coating according to (a.2) further comprises $ZrO_2$, preferably at a loading in the range of from 0.11 to 0.20 g/in$^3$, more preferably in the range of from 0.13 to 0.17 g/in$^3$, more preferably in the range of from 0.14 to 0.16 g/in$^3$.
13. The system of any one of embodiments 1 to 12, wherein from 98 to 100 weight-%, preferably from 99 to 100 weight-%, more preferably from 99.5 to 100 weight-%, more preferably from 99.9 to 100 weight-%, of the first coating according to (a.2) consist of the platinum group metal according to (a.2) and the zeolitic material according to (a.2), wherein more preferably the first coating according to (a.2) essentially consists of the platinum group metal according to (a.2) and the zeolitic material according to (a.2).
14. The system of any one of embodiments 1 to 13, wherein the first catalyst according to (a) comprises the first coating according to (a.2) at a loading in the range of from 0.5 to 8 g/in$^3$, preferably in the range of from 1 to 5 g/in$^3$, more preferably in the range of from 1.5 to 4.5 g/in$^3$, more preferably in the range of from 2 to 4 g/in$^3$.
15. The system of any one of embodiments 1 to 14, wherein the first catalyst according to (a) consists of the first substrate according to (a.1) and the first coating according to (a.2).
16. The system of any one of embodiments 1 to 15, wherein the second substrate according to (b.1) is a flow-through substrate or a wall flow filter substrate, preferably a flow-through substrate, wherein the flow-through substrate is preferably one or more of a cordierite flow-through substrate and a metallic flow-through substrate, more preferably a cordierite flow-through substrate or a metallic flow-through substrate, wherein the metallic flowthrough substrate preferably is a metallic electrically and/or thermally conductive flow-through substrate.

17. The system of any one of embodiments 1 to 16, wherein the second substrate according to (b.1) is a monolith, preferably a honeycomb monolith, wherein the second substrate according to (b.1) more preferably has a volume in the range of from 0.400 to 2.100 l, preferably in the range of from 0.500 to 1.900 l, more preferably in the range of from 0.700 to 1.500 l, more preferably in the range of from 0.750 to 1.400 l, more preferably in the range of from 0.800 to 1.000 l, more preferably in the range of from 0.900 to 0.950 l, or wherein the second substrate according to (b.1) more preferably has a volume in the range of from 0.900 to 3.000 l, preferably in the range of from 1.500 to 2.500 l, more preferably in the range of from 1.700 to 2.300 l, more preferably in the range of from 1.900 to 2.100 l.
18. The system of any one of embodiments 1 to 17, wherein the second coating according to (b.2) is disposed on the surface of the internal walls of the second substrate according to (b.1) over 50 to 100%, preferably over 80 to 100%, more preferably over 90 to 100%, more preferably over 95 to 100%, more preferably over 98 to 100%, of the substrate axial length of the second substrate according to (b.1), wherein the second coating according to (b.2) preferably is disposed on the surface of the internal walls of the second substrate according to (b.1) from the inlet end to the outlet end of the second substrate according to (b.1) or from the outlet end to the inlet end of the second substrate according to (b.1).
19. The system of any one of embodiments 1 to 18, wherein from 45 to 90 weight-%, preferably from 50 to 90 weight-%, more preferably from 51 to 89 weight-%, more preferably from 55 to 85 weight-%, more preferably from 60 to 80 weight-%, more preferably from 65 to 75 weight-%, of the first non-zeolitic oxidic support material comprised in the second coating according to (b.2) consist of $Al_2O_3$, calculated as $Al_2O_3$.
20. The system of any one of embodiments 1 to 19, wherein from 10 to 55 weight-%, preferably from 10 to 50 weight-%, more preferably from 11 to 49 weight-%, more preferably from 15 to 45 weight-%, more preferably from 20 to 40 weight-%, more preferably from 25 to 35 weight-%, of the first non-zeolitic oxidic support material comprised in the second coating according to (b.2) consist of $CeO_2$, and/or
    wherein the first non-zeolitic oxidic support material comprised in the second coating according to (b.2) further comprises BaO, wherein preferably from 5 to 20 weight-%, more preferably from 5 to 15 weight-%, more preferably from 5 to 10 weight-%, of the first non-zeolitic oxidic support material comprised in the second coating according to (b.2) consist of BaO.
21. The system of any one of embodiments 1 to 20, wherein from 90 to 100 weight-%, preferably from 95 to 100 weight-%, more preferably from 99 to 100 weight-%, more preferably from 99.9 to 100 weight-%, of the first non-zeolitic oxidic support material comprised in the second coating according to (b.2) consist of $CeO_2$, $Al_2O_3$ and optionally BaO.
22. The system of any one of embodiments 1 to 21, wherein the second coating according to (b.2) comprises Pt at a loading, calculated as elemental Pt, in the range of from 50 to 190 g/ft$^3$, more preferably in the range of from 80 to 160 g/ft$^3$, more preferably in the range of from 100 to 140 g/ft$^3$, more preferably in the range of from 110 to 130 g/ft$^3$.
23. The system of any one of embodiments 1 to 22, wherein the second coating according to (b.2) comprises Pd at a loading, calculated as elemental Pd, in the range of from 4 to 24 g/ft$^3$, more preferably in the range of from 8 to 20 g/ft$^3$, more preferably in the range of from 10 to 18 g/ft$^3$, more preferably in the range of from 12 to 16 g/ft$^3$.
24. The system of any one of embodiments 1 to 23, wherein the second coating according to (b.2) exhibits a ratio of the weight of Pt, calculated as elemental Pt, to the weight of Pd, calculated as elemental Pd, in the range of from 2:1 to 20:1, preferably in the range of from 5:1 to 12:1, more preferably in the range of from 7:1 to 10:1, more preferably in the range of from 8:1 to 9:1.
25. The system of any one of embodiments 1 to 24, wherein the second coating according to (b.2) comprises the first non-zeolitic oxidic support material according to (b.2) at a loading in the range of from 0.5 to 5 g/in$^3$,
    preferably in the range of from 0.75 to 3 g/in$^3$, more preferably in the range of from 1 to 2 g/in$^3$, more preferably in the range of from 1.2 to 1.8 g/in$^3$, more preferably in the range of from 1.4 to 1.6 g/in$^3$, or
    preferably in the range of from 1 to 4 g/in$^3$, more preferably in the range of from 2 to 3 g/in$^3$, more preferably in the range of from 2.5 to 2.8 g/in$^3$.
26. The system of any one of embodiments 1 to 25, wherein the second coating according to (b.2) further comprises Rh and a second non-zeolitic oxidic support material, wherein Rh is supported on the second non-zeolitic oxidic support material.
27. The system of embodiment 26, wherein the second coating according to (b.2) comprises Rh at a loading, calculated as elemental Rh, in the range of from 1 to 10 g/ft$^3$, more preferably in the range of from 2 to 8 g/ft$^3$, more preferably in the range of from 3 to 7 g/ft$^3$, more preferably in the range of from 4 to 6 g/ft$^3$.
28. The system of embodiment 26 or 27, wherein the second non-zeolitic oxidic support material further comprised in the second coating according to (b.2) is different to the first non-zeolitic oxidic support material comprised in the second coating according to (b.2), wherein the second non-zeolitic oxidic support material further comprised in the second coating according to (b.2) preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.
29. The system of any one of embodiments 26 to 28, wherein the second coating according to (b.2) exhibits a ratio of the weight of Pt, calculated as elemental Pt, to the weight of Rh, calculated as elemental Rh, in the range of from 5:1 to 50:1, preferably in the range of from 10:1 to 40:1,
    more preferably in the range of from 15:1 to 33:1, more preferably in the range of from 18:1 to 30:1, more preferably in the range of from 20:1 to 28:1, more preferably in the range of from 21:1 to 27:1, more preferably in the range of from 22.5:1 to 25.8:1, more preferably in the range of from 23.0:1 to 25.3:1, more preferably in the range of from 23.6:1 to 24.8:1, more preferably in the range of from 23.8:1 to 24.6:1, more preferably in the range of from 24.0:1 to 24.4:1, or more preferably in the range of from 15:1 to 30:1, more preferably in the range of from 18:1 to 25:1, more preferably in the range of from 20:1 to 21:1.

30. The system of any one of embodiments 26 to 29, wherein the second coating according to (b.2) exhibits a ratio of the weight of Pd, calculated as elemental Pd, to the weight of Rh, calculated as elemental Rh, in the range of from 1:1 to 10:1, preferably in the range of from 2:1 to 5:1, more preferably in the range of from 2.5:1 to 3.0:1.

31. The system of any one of embodiments 26 to 30, wherein the second coating according to (b.2) comprises the second non-zeolitic oxidic support material further comprised in the second coating according to (b.2) at a loading in the range of from 0.1 to 1 g/in$^3$, preferably in the range of from 0.2 to 0.7 g/in$^3$, more preferably in the range of from 0.3 to 0.5 g/in$^3$, more preferably in the range of from 0.35 to 0.45 g/in$^3$.

32. The system of any one of embodiments 1 to 31, wherein the second coating according to (b.2) further comprises a first alkaline earth metal supported on a third non-zeolitic oxidic support material.

33. The system of embodiment 32, wherein the first alkaline earth metal comprises one or more of Mg, Ca, Sr and Ba, more preferably one or more of Mg and Ba, wherein the first alkaline earth metal more preferably comprises, more preferably consists of, Ba.

34. The system of embodiment 32 or 33, wherein the third non-zeolitic oxidic support material comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

35. The system of any one of embodiments 32 to 34, wherein the third non-zeolitic oxidic support material comprises the first alkaline earth metal at a loading, calculated as oxide of the first alkaline earth metal, preferably as BaO, in the range of from 0.5 to 5 weight-%, preferably in the range of from 1.5 to 2.5 weight-%, more preferably in the range of from 1.8 to 2.2 weight-%, based on the weight of the third non-zeolitic oxidic support material.

36. The system of any one of embodiments 32 to 35, wherein the second coating according to (b.2) comprises the first alkaline earth metal at a loading, calculated as oxide of the first alkaline earth metal, in the range of from 0.01 to 0.15 g/in$^3$, preferably in the range of from 0.04 to 0.12 g/in$^3$, more preferably in the range of from 0.06 to 0.10 g/in$^3$, more preferably in the range of from 0.07 to 0.09 g/in$^3$.

37. The system of any one of embodiments 32 to 36, wherein the second coating according to (b.2) comprises the third non-zeolitic oxidic support material at a loading in the range of from 1 to 7 g/in$^3$, preferably in the range of from 3 to 5 g/in$^3$, more preferably in the range of from 3.7 to 4.3 g/in$^3$, more preferably in the range of from 3.9 to 4.1 g/in$^3$.

38. The system of any one of embodiments 1 to 37, wherein the second coating according to (b.2) further comprises a second alkaline earth metal, wherein the second alkaline earth metal preferably comprises one or more of Mg, Ca, Sr and Ba, more preferably one or more of Mg and Ba, wherein the second alkaline earth metal more preferably comprises, more preferably consists of, Mg.

39. The system of embodiment 38, wherein the second coating according to (b.2) comprises the second alkaline earth metal at a loading, calculated as oxide of the second alkaline earth metal, preferably as MgO, in the range of from 0.1 to 0.5 g/in$^3$, more preferably in the range of from 0.20 to 0.40 g/in$^3$, more preferably in the range of from 0.25 to 0.35 g/in$^3$.

40. The system of any one of embodiments 1 to 39, wherein the second coating according to (b.2) further comprises $ZrO_2$, preferably at a loading in the range of from 0.01 to 0.10 g/in$^3$, more preferably in the range of from 0.03 to 0.06 g/in$^3$, more preferably in the range of from 0.04 to 0.06 g/in$^3$, and/or wherein the second coating according to (b.2) further comprises $CeO_2$, preferably at a loading in the range of from 2 to 4 g/in$^3$, more preferably in the range of from 2.60 to 2.90 g/in$^3$, more preferably in the range of from 2.70 to 2.75 g/in$^3$.

41. The system of any one of embodiments 1 to 40, wherein the second coating according to (b.2) comprises from 0.001 to 1 weight-% preferably from 0.01 to 0.1 weight-%, of a zeolitic material, calculated as zeolitic material as such, wherein the second coating according to (b.2) is more preferably essentially free of a zeolitic material.

42. The system of any one of embodiments 1 to 41, wherein from 98 to 100 weight-%, preferably from 99 to 100 weight-%, more preferably from 99.5 to 100 weight-%, more preferably from 99.9 to 100 weight-%, of the second coating according to (b.2) consist of Pt, Pd, the first non-zeolitic oxidic support material, optionally Rh, optionally the second non-zeolitic oxidic support material, optionally the first alkaline earth metal and the third non-zeolitic oxidic support material, optionally the second alkaline earth metal, and optionally $ZrO_2$, wherein more preferably the second coating according to (b.2) essentially consists of Pt, Pd, the first non-zeolitic oxidic support material, optionally Rh, optionally the second non-zeolitic oxidic support material, optionally the first alkaline earth metal and the third non-zeolitic oxidic support material, optionally the second alkaline earth metal, and optionally $ZrO_2$.

43. The system of any one of embodiments 1 to 42, wherein the second catalyst according to (b) comprises the second coating according to (b.2) at a loading in the range of from 0.5 to 8 g/in$^3$, preferably in the range of from 1 to 7 g/in$^3$, more preferably in the range of from 1.5 to 6.5 g/in$^3$.

44. The system of any one of embodiments 1 to 43, wherein the second catalyst according to (b) consists of the second substrate according to (b.1) and the second coating according to (b.2).

45. The system of any one of embodiments 1 to 44, wherein the NOx adsorber component and the lean NOx trap component are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

46. The system of any one of embodiments 1 to 45, wherein the NOx adsorber component and the lean NOx trap component are directly consecutive components.

47. The system of embodiment 46, wherein no other component for the treatment of the exhaust gas is arranged between the NOx adsorber component and the lean NOx trap component.

48. The system of any one of embodiments 1 to 47, wherein the outlet end of the first substrate according to (a.1) and the inlet end of the second substrate according to (b.1) are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

49. The system of any one of embodiments 1 to 45, wherein the first substrate according to (a.1) and the second substrate according to (b.1) together form one single substrate which comprises an inlet end, an outlet end, a substrate axial length extending from the inlet end to the outlet end of the single substrate, and a plurality of passages defined by internal walls of the single substrate extending therethrough, wherein the first coating according to (a.2) is disposed on the surface of the internal walls of the single substrate over at least 25%, preferably over 25 to 50%, preferably over 40 to 50%, more preferably over 45 to 50%, more preferably over 47.5 to 50%, more preferably over 49 to 50%, of the substrate axial length of the single substrate and the second coating according to (b.2) is disposed on the surface of the internal walls of the single substrate, the surface of the internal walls of the single substrate being at least partially coated with the first coating according to (a.2), over at least 25%, preferably over 25 to 50%, preferably over 40 to 50%, more preferably over 45 to 50%, more preferably over 47.5 to 50%, more preferably over 49 to 50%, of the substrate axial length of the single substrate, wherein the first coating according to (a.2) is preferably disposed on the surface of the internal walls of the single substrate from the inlet end to the outlet end, wherein the second coating according to (b.2) is preferably disposed on the surface of the internal walls of the single substrate from the outlet end to the inlet end, wherein the first coating according to (a.2) and the second coating according to (b.2) preferably do not overlap.

50. The system of embodiment 49, wherein the single substrate comprises one or more cavities, preferably one or two cavities, more preferably one cavity, wherein each cavity extends from an outer position to an inner position, wherein the outer position is located at the outer surface of the single substrate and the inner position is located within the single substrate, and wherein each cavity preferably extends through one or more of the internal walls of the single substrate.

51. The system of embodiment 50, wherein the outer position and the inner position define a direction of each cavity, wherein the plurality of passages comprised in the single substrate define a direction of the passages, wherein the plurality of passages preferably define passages which are arranged essentially in parallel to each other, wherein the angle between the direction of each cavity and the direction of the passages is preferably in the range of from 85 to 95°, more preferably in the range of from 88 to 92°, more preferably in the range of from 89 to 91°, wherein the direction of each cavity is more preferably essentially orthogonal to the direction of the passages.

52. The system of embodiment 50 or 51, wherein each cavity has a cavity length, wherein the cavity length is the distance from the outer position on the outer surface of the single substrate to the inner position within the single substrate, wherein the cavity length is preferably in the range of from 1 to 99%, preferably in the range of from 10 to 90%, more preferably in the range of from 30 to 70%, more preferably in the range of from 40 to 60%, of the length between the outer position and a postulated further outer position, wherein the postulated further outer position is located at the outer surface of the single substrate where a postulated extended direction of each cavity punctures the outer surface of the single substrate.

53. The system of any one of embodiment 50 to 52, wherein the outer position is located at the outer surface of the single substrate in the range of from 25 to 75%, preferably in the range of from 40 to 60%, more preferably in the range of from 45 to 55%, more preferably in the range of from 47.5 to 52.5%, more preferably in the range of from 49 to 51%, of the length of the single substrate from the inlet end.

54. The system of any one of embodiments 50 to 53, wherein each cavity comprises a cross section having a surface normal, wherein the angle between the surface normal and the direction of each cavity is preferably in the range of from 0 to 5°, more preferably in the range of from 0 to 3°, more preferably in the range of from 0 to 1°, wherein the surface normal and the direction of each cavity are preferably essentially parallel to each other, wherein the direction of each cavity is preferably essentially orthogonal to the cross section.

55. The system of embodiment 54, wherein the cross section is circular, wherein the cross section preferably has a diameter in the range of from 5 to 55 mm, preferably in the range of from 10 to 50 mm.

56. The system of any one of embodiments 50 to 55, wherein each cavity is suitable for introducing a reductant, preferably a fuel or a hydrocarbon, into at least a portion of the plurality of the passages comprised in the single substrate.

57. The system of any one of embodiments 50 to 56, wherein the first coating according to (a.2) and the second coating according to (b.2) do not overlap, and wherein each cavity is located between the first coating according to (a.2) and the second coating according to (b.2).

58. The system of any one of embodiments 1 to 57, further comprising at least one reductant injector, wherein each reductant injector preferably is a hydrocarbon injector, more preferably a fuel injector.

59. The system of embodiment 58, wherein the at least one reductant injector is arranged between the NOx adsorber component and the lean NOx trap component, more preferably between the first catalyst according to (a) and the second catalyst according to (b), if the system is in accordance with any one of embodiments 1 to 45, or wherein the at least one reductant injector is located in a cavity, if the system is in accordance with any one of embodiments 51 to 57.

60. The system of any one of embodiments 1 to 59, wherein the system does not comprise an air injector between the first catalyst according to (a) and the second catalyst according to (b), wherein the system preferably does not comprise an air injector between the NOx adsorber component and the lean NOx trap component, wherein the system preferably does not comprise an air injector in the one or more cavities as defined in embodiments 51 to 59, wherein the system preferably does not comprise an air injector.

61. The system of any one of embodiments 1 to 45 and 60, further comprising
(c) a gas heating component
wherein the gas heating component is arranged downstream of the NOx adsorber component and upstream of the lean NOx trap component.

62. The system of embodiment 61, wherein the NOx adsorber component and the gas heating component are directly consecutive components, and wherein preferably the gas heating component and the lean NOx trap component are directly consecutive components.

63. The system of embodiment 61 or 62, wherein no other component for the treatment of the exhaust gas is arranged between the NOx adsorber component and the gas heating component, and wherein preferably no other component for the treatment of the exhaust gas is arranged between the gas heating component and the lean NOx trap component.

64. The system of any one of embodiments 61 to 63, wherein the gas heating component comprises
(c.1) a third substrate comprising an inlet end, an outlet end, a substrate axial length extending from the inlet end to the outlet end of the third substrate, and a plurality of passages defined by internal walls of the third substrate extending therethrough;
wherein the inlet end of the third substrate according to (c.1) and the outlet end of the first substrate according to (a.1) are coupled to allow exhaust gas exiting from the passages of the first substrate to enter the passages of the third substrate;
wherein the inlet end of the second substrate according to (b.1) and the outlet end of the third substrate according to (c.1) are coupled to allow exhaust gas exiting from the passages of the third substrate to enter the passages of the second substrate;
wherein the internal walls of the third substrate are thermally conductive to allow heating thereof for heating of exhaust gas flowing through the passages of the third substrate.

65. The system of any one of embodiments 61 to 64, wherein the third substrate according to (c.1) is a flow-through substrate, preferably a metallic flow-through substrate, more preferably a metallic electrically and/or thermally conductive flow-through substrate.

66. The system of any one of embodiments 61 to 65, wherein the third substrate according to (c.1) has a cylindrical shape, the diameter of the third substrate preferably being in the range of from 3 to 10 inches, more preferably in the range of from 3.5 to 8 inches, more preferably in the range of from 4 to 6 inches, wherein more preferably, the diameter of the third substrate is in the range of from 90 to 110%, preferably in the range of from 95 to 105%, more preferably in the range of from 98 to 102% of the diameter of the first substrate, the third substrate according to (c.1) preferably having an axial length in the range of from 0.15 to 2 inches, more preferably in the range of from 0.20 to 1.5 inches, more preferably in the range of from 0.30 to 1 inch.

67. The system of any one of embodiments 61 to 66, wherein the third substrate according to (c.1) is an uncoated substrate and the gas heating component according to (c) consists of said third substrate.

68. The system of any one of embodiments 61 to 67, wherein the gas heating component according to (c) further comprises
(c.2) a third coating being disposed on the surface of the internal walls of the third substrate over at least 1% of the substrate axial length of the third substrate, wherein the third coating is preferably disposed on the surface of the internal walls of the third substrate from the outlet end to the inlet end of the third substrate, the third coating comprising
a fourth non-zeolitic oxidic support material, Pt and Pd,
wherein Pt and Pd are both supported on the fourth non-zeolitic oxidic support material;
wherein the fourth non-zeolitic oxidic support material comprises $CeO_2$ and $Al_2O_3$, wherein at least 45 weight-% of the fourth non-zeolitic oxidic support material consist of $Al_2O_3$, calculated as $Al_2O_3$, and wherein at least 10 weight-% of the fourth non-zeolitic oxidic support material consist of $CeO_2$, calculated as $CeO_2$.

69. The system of embodiment 68, wherein the third coating is disposed on the surface of the internal walls of the third substrate over 5 to 100%, preferably over 10 to 90%, more preferably over 20 to 80%, more preferably over 30 to 70%, more preferably over 40 to 60%, of the substrate axial length of the third substrate, wherein the third coating is preferably disposed on the surface of the internal walls of the third substrate from the outlet end to the inlet end of the third substrate.

70. The system of embodiment 68 or 69, wherein from 45 to 90 weight-%, preferably from 50 to 90 weight-%, more preferably from 51 to 89 weight-%, more preferably from 55 to 85 weight-%, more preferably from 60 to 80 weight-%, more preferably from 65 to 75 weight-%, of the fourth non-zeolitic oxidic support material consist of $Al_2O_3$, calculated as $Al_2O_3$.

71. The system of any one of embodiments 68 to 70, wherein from 10 to 55 weight-%, preferably from 10 to 50 weight-%, more preferably from 11 to 49 weight-%, more preferably from 15 to 45 weight-%, more preferably from 20 to 40 weight-%, more preferably from 25 to 35 weight-%, of the fourth non-zeolitic oxidic support material consist of $CeO_2$, and/or wherein the fourth non-zeolitic oxidic support material comprised in the third coating according to (c.2) further comprises BaO, wherein preferably from 5 to 20 weight-%, more preferably from 5 to 15 weight-%, more preferably from 5 to 10 weight-%, of the fourth non-zeolitic oxidic support material comprised in the third coating according to (c.2) consist of BaO.

72. The system of any one of embodiments 68 to 71, wherein from 90 to 100 weight-%, preferably from 95 to 100 weight-%, more preferably from 99 to 100 weight-%, more preferably from 99.9 to 100 weight-%, of the fourth non-zeolitic oxidic support material comprised in the third coating according to (c.2) consist of $CeO_2$, $Al_2O_3$, and optionally BaO.

73. The system of any one of embodiments 68 to 72, wherein the third coating according to (c.2) comprises Pt at a loading, calculated as elemental Pt, in the range of from 50 to 190 g/ft$^3$, more preferably in the range of from 80 to 160 g/ft$^3$, more preferably in the range of from 100 to 140 g/ft$^3$, more preferably in the range of from 110 to 130 g/ft$^3$.
74. The system of any one of embodiments 68 to 73, wherein the third coating according to (b.2) comprises Pd at a loading, calculated as elemental Pd, in the range of from 4 to 24 g/ft$^3$, more preferably in the range of from 8 to 20 g/ft$^3$, more preferably in the range of from 10 to 18 g/ft$^3$, more preferably in the range of from 12 to 16 g/ft$^3$.
75. The system of any one of embodiments 68 to 74, wherein the third coating according to (c.2) exhibits a ratio of the weight of Pt, calculated as elemental Pt, to the weight of Pd, calculated as elemental Pd, in the range of from 2:1 to 20:1, preferably in the range of from 5:1 to 12:1, more preferably in the range of from 7:1 to 10:1, more preferably in the range of from 8:1 to 9:1.
76. The system of any one of embodiments 68 to 75, wherein the third coating according to (c.2) comprises the fourth non-zeolitic oxidic support material according to (c.2) at a loading in the range of from 0.5 to 5 g/in$^3$,
    preferably in the range of from 0.75 to 3 g/in$^3$, more preferably in the range of from 1 to 2 g/in$^3$, more preferably in the range of from 1.2 to 1.8 g/in$^3$, more preferably in the range of from 1.4 to 1.6 g/in$^3$, or
    preferably in the range of from 1 to 4 g/in$^3$, more preferably in the range of from 2 to 3 g/in$^3$, more preferably in the range of from 2.5 to 2.8 g/in$^3$.
77. The system of any one of embodiments 68 to 76, wherein the third coating according to (c.2) further comprises Rh and a fifth non-zeolitic oxidic support material, wherein Rh is supported on the fifth non-zeolitic oxidic support material.
78. The system of embodiment 77, wherein the third coating according to (c.2) comprises Rh at a loading, calculated as elemental Rh, in the range of from 1 to 10 g/ft$^3$, more preferably in the range of from 2 to 8 g/ft$^3$, more preferably in the range of from 3 to 7 g/ft$^3$, more preferably in the range of from 4 to 6 g/ft$^3$.
79. The system of embodiment 77 or 78, wherein the fifth non-zeolitic oxidic support material further comprised in the third coating according to (c.2) is different to the fourth non-zeolitic oxidic support material comprised in the third coating according to (c.2), wherein the fifth non-zeolitic oxidic support material further comprised in the third coating according to (c.2) preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.
80. The system of any one of embodiments 77 to 79, wherein the third coating according to (c.2) exhibits a ratio of the weight of Pt, calculated as elemental Pt, to the weight of Rh, calculated as elemental Rh, in the range of from 5:1 to 50:1, preferably in the range of from 10:1 to 40:1,
    more preferably in the range of from 15:1 to 33:1, more preferably in the range of from 18:1 to 30:1, more preferably in the range of from 20:1 to 28:1, more preferably in the range of from 21:1 to 27:1, more preferably in the range of from 22.5:1 to 25.8:1, more preferably in the range of from 23.0:1 to 25.3:1, more preferably in the range of from 23.6:1 to 24.8:1, more preferably in the range of from 23.8:1 to 24.6:1, more preferably in the range of from 24.0:1 to 24.4:1, or
    more preferably in the range of from 15:1 to 30:1, more preferably in the range of from 18:1 to 25:1, more preferably in the range of from 20:1 to 21:1.
81. The system of any one of embodiments 77 to 80, wherein the third coating according to (c.2) exhibits a ratio of the weight of Pd, calculated as elemental Pd, to the weight of Rh, calculated as elemental Rh, in the range of from 1:1 to 10:1, preferably in the range of from 2:1 to 5:1, more preferably in the range of from 2.5:1 to 3.0:1.
82. The system of any one of embodiments 77 to 81, wherein the third coating according to (c.2) comprises the fifth non-zeolitic oxidic support material further comprised in the third coating according to (c.2) at a loading in the range of from 0.1 to 1 g/in$^3$, preferably in the range of from 0.2 to 0.7 g/in$^3$, more preferably in the range of from 0.3 to 0.5 g/in$^3$, more preferably in the range of from 0.35 to 0.45 g/in$^3$.
83. The system of any one of embodiments 68 to 82, wherein the third coating according to (c.2) further comprises a third alkaline earth metal supported on a sixth non-zeolitic oxidic support material.
84. The system of embodiment 83, wherein the third alkaline earth metal comprises one or more of Mg, Ca, Sr and Ba, more preferably one or more of Mg and Ba, wherein the third alkaline earth metal more preferably comprises, more preferably consists of, Ba.
85. The system of embodiment 83 or 84, wherein the sixth non-zeolitic oxidic support material comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.
86. The system of any one of embodiments 83 to 85, wherein the sixth non-zeolitic oxidic support material comprises the third alkaline earth metal at a loading, calculated as oxide of the third alkaline earth metal, preferably as BaO, in the range of from 0.5 to 5 weight-%, preferably in the range of from 1.5 to 2.5 weight-%, more preferably in the range of from 1.8 to 2.2 weight-%, based on the weight of the sixth non-zeolitic oxidic support material.
87. The system of any one of embodiments 83 to 86, wherein the third coating according to (c.2) comprises the third alkaline earth metal at a loading, calculated as oxide of the third alkaline earth metal, in the range of from 0.01 to 0.15 g/in$^3$, preferably in the range of from 0.04 to 0.12 g/in$^3$, more preferably in the range of from 0.06 to 0.10 g/in$^3$, more preferably in the range of from 0.07 to 0.09 g/in$^3$.

88. The system of any one of embodiments 83 to 87, wherein the third coating according to (c.2) comprises the sixth non-zeolitic oxidic support material at a loading in the range of from 1 to 7 g/in$^3$, preferably in the range of from 3 to 5 g/in$^3$, more preferably in the range of from 3.7 to 4.3 g/in$^3$, more preferably in the range of from 3.9 to 4.1 g/in$^3$.

89. The system of any one of embodiments 68 to 88, wherein the third coating according to (c.2) further comprises a fourth alkaline earth metal, wherein the fourth alkaline earth metal preferably comprises one or more of Mg, Ca, Sr and Ba, more preferably one or more of Mg and Ba, wherein the fourth alkaline earth metal more preferably comprises, more preferably consists of, Mg.

90. The system of embodiment 89, wherein the third coating according to (c.2) comprises the fourth alkaline earth metal at a loading, calculated as oxide of the fourth alkaline earth metal, preferably as MgO, in the range of from 0.1 to 0.5 g/in$^3$, more preferably in the range of from 0.20 to 0.40 g/in$^3$, more preferably in the range of from 0.25 to 0.35 g/in$^3$.

91. The system of any one of embodiments 68 to 90, wherein the third coating according to (c.2) further comprises $ZrO_2$, preferably at a loading in the range of from 0.01 to 0.10 g/in$^3$, more preferably in the range of from 0.03 to 0.06 g/in$^3$, more preferably in the range of from 0.04 to 0.06 g/in$^3$, and/or
   wherein the third coating according to (c.2) further comprises $CeO_2$, preferably at a loading in the range of from 2 to 4 g/in$^3$, more preferably in the range of from 2.60 to 2.90 g/in$^3$, more preferably in the range of from 2.70 to 2.75 g/in$^3$.

92. The system of any one of embodiments 68 to 91, wherein the third coating according to (c.2) comprises from 0.001 to 1 weight-% preferably from 0.01 to 0.1 weight-%, of a zeolitic material, calculated as zeolitic material as such, wherein the third coating according to (c.2) is more preferably essentially free of a zeolitic material.

93. The system of any one of embodiments 68 to 92, wherein from 98 to 100 weight-%, preferably from 99 to 100 weight-%, more preferably from 99.5 to 100 weight-%, more preferably from 99.9 to 100 weight-%, of the third coating according to (c.2) consist of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$, wherein more preferably the third coating according to (c.2) essentially consists of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$.

94. The system of any one of embodiments 68 to 93, wherein the gas heating component according to (c) comprises the third coating according to (c.2) at a loading in the range of from 0.5 to 8 g/in$^3$, preferably in the range of from 1 to 7 g/in$^3$, more preferably in the range of from 1.5 to 6.5 g/in$^3$.

95. The system of any one of embodiments 68 to 94, wherein the gas heating component according to (c) consists of the third substrate according to (c.1) and the third coating according to (c.2).

96. The system of any one of embodiments 68 to 95, wherein the third coating according to (c.2) exhibits essentially the same, preferably the same chemical and physical characteristics as the second coating according to (b.2).

97. The system of any one of embodiments 64 to 96, wherein the outlet end of the third substrate and the inlet end of the second substrate are arranged opposite to each other, wherein the angle between the surface normal of the surface defined by the outlet end of the third substrate and the surface normal of the surface defined by the inlet end of the second substrate is preferably in the range of from 0 to 5°, more preferably in the range of from 0 to 3°, more preferably in the range of from 0 to 1°.

98. The system of any one of embodiments 64 to 97, wherein the outlet end of the third substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the third substrate and the inlet end of the second substrate are preferably spaced from one another by one or more spacer means, preferably one or more spacer rods, wherein a given spacer rod is preferably fixed at either the outlet end of the third substrate, or at the inlet end of the second substrate, or at the outlet end of the third substrate as well as at the inlet end of the second substrate, wherein the one or more spacer means, preferably the one or more spacer rods, are preferably electrically insulating.

99. The system of any one of embodiments 64 to 98, further comprising a jacket surrounding the third substrate according to (c) and the second substrate according to (b), wherein preferably from 95 to 100%, more preferably from 98 to 100%, more preferably from 99 to 100% of the inlet end face of the second substrate and preferably from 95 to 100%, more preferably from 98 to 100%, more preferably from 99 to 100% of the outlet end face of the third substrate are not covered by the jacket, wherein the jacket preferably comprises one or more means for connecting the third substrate to an electrical power supply.

100. A process for preparing a system for the treatment of an exhaust gas of a diesel combustion engine according to any one of embodiments 1 to 99, said process comprising
   (1) providing a NOx adsorber component and a lean NOx trap component
      wherein the NOx adsorber component is comprised in
      (i) a first catalyst comprising
      (i.1) a first substrate comprising an inlet end, an outlet end, a substrate axial length extending from the inlet end to the outlet end of the first substrate, and a plurality of passages defined by internal walls of the first substrate extending therethrough;
      (i.2) a first coating being said NOx adsorber component, said coating being disposed on the surface of the internal walls of the first substrate over at least 50% of the substrate axial length of the first substrate, the first coating comprising a platinum group metal supported on a zeolitic material; and wherein the lean NOx trap component is comprised in (ii) a second catalyst comprising (ii.1) a second substrate comprising an inlet end, an outlet end, a substrate axial length extending from the inlet end to the outlet end of the second substrate, and a plurality of passages defined by internal walls of the second substrate extending therethrough;

(ii.2) a second coating being said lean NOx trap component, said coating being disposed on the surface of the internal walls of the second substrate over at least 50% of the substrate axial length of the second substrate, the second coating comprising Pt, Pd, and a first non-zeolitic oxidic support material, wherein Pt and Pd are both supported on the first non-zeolitic oxidic support material, wherein the first non-zeolitic oxidic support material comprises $CeO_2$ and $Al_2O_3$, wherein at least 45 weight-% of the first non-zeolitic oxidic support material consist of $Al_2O_3$, calculated as $Al_2O_3$, and wherein at least 10 weight-% of the first non-zeolitic oxidic support material consist of $CeO_2$, calculated as $CeO_2$;

(2) arranging the NOx adsorber component upstream of the lean NOx trap component.

101. The process of embodiment 100, wherein the first catalyst according to (i) is prepared by and/or wherein the process further comprises (a) providing the first substrate, and a NOx adsorber mixture comprising water, a source of a platinum group metal and a zeolitic material;

(b) disposing the NOx adsorber mixture obtained in (a) on the surface of the internal walls of the first substrate over at least 50% of the substrate axial length of the first substrate; to obtain a first coating;

(c) optionally calcining of the coated first substrate obtained in (b) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (c), optionally drying of the coated first substrate obtained in (b) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

102. The process of embodiment 100 or 101, wherein the first substrate according to (i.1) is a flow-through substrate or a wall flow filter substrate, preferably a flow-through substrate, wherein the flow-through substrate is preferably one or more of a cordierite flow-through substrate and a metallic flow-through substrate, more preferably a cordierite flow-through substrate, wherein the first substrate according to (i.1) preferably is a monolith, more preferably a honeycomb monolith, wherein the first substrate according to (i.1) more preferably has a volume in the range of from 0.500 to 1.900 l, preferably in the range of from 0.700 to 1.500 l, more preferably in the range of from 0.800 to 1.000 l, more preferably in the range of from 0.900 to 0.950 l, wherein the first substrate according to (i.1) preferably is a cordierite flow-through substrate, or preferably in the range of from 0.550 to 0.650 l, wherein the first substrate according to (a.1) preferably is a metallic flow-through substrate.

103. The process of embodiment 101 or 102, wherein the NOx adsorber mixture according to (a) is disposed on the surface of the internal walls of the first substrate according to (i.1) over 50 to 100%, preferably over 80 to 100%, preferably over 90 to 100%, more preferably over 95 to 100%, more preferably over 98 to 100%, of the substrate axial length of the first substrate according to (i.1), wherein the NOx adsorber mixture according to (a) preferably is disposed on the surface of the internal walls of the first substrate according to (i.1) from the inlet end to the outlet end of the first substrate according to (i.1).

104. The process of any one of embodiments 101 to 103, wherein the platinum group metal comprised in the NOx adsorber mixture according to (a) comprises one or more of Pd, Pt, Rh, Ir, Os and Ru, preferably one or more of Pd, Pt and Rh, more preferably one or more of Pd and Pt, wherein the platinum group metal more preferably comprises, more preferably consists of, Pd.

105. The process of any one of embodiments 101 to 104, wherein the zeolitic material comprised in the NOx adsorber mixture according to (a) comprises, preferably consists of, a 10-membered ring pore zeolitic material.

106. The process of any one of embodiments 101 to 105, wherein the framework structure of the zeolitic material comprised in the NOx adsorber mixture according to (a) comprises a tetravalent element Y, a trivalent element X and oxygen, wherein Y preferably comprises, more preferably consists of, one or more of Si, Sn, Ti, Zr and Ge, more preferably Si, and wherein X preferably comprises, more preferably consists of, one or more of Al, B, In and Ga, more preferably Al, and wherein the framework structure of the zeolitic material comprised in the NOx adsorber mixture according to (a) more preferably exhibits a molar ratio of Y:X, calculated as $YO_2:X_2O_3$, in the range of from 2:1 to 100:1, more preferably in the range of from 10:1 to 55:1, more preferably in the range of from 12:1 to 40:1, more preferably in the range of from 15:1 to 28:1, more preferably in the range of from 18:1 to 26:1, wherein the framework structure of the zeolitic material comprised in the NOx adsorber mixture according to (a) preferably has a framework type selected from the group consisting of FER, TON, MTT, SZR, MFI, MWW, AEL, HEU, AFO, a mixture of two or more thereof and a mixed type of two or more thereof, more preferably selected from the group consisting of FER, MFI, TON, a mixture of two or more thereof and a mixed type of two or more thereof, more preferably selected from the group consisting of FER and MFI, wherein more preferably the zeolitic material comprised in the NOx adsorber mixture according to (a) has a framework type FER.

107. The process of any one of embodiments 101 to 106, wherein providing the NOx adsorber mixture according to (a) comprises supporting the platinum group metal on the zeolitic material, wherein the platinum group metal is preferably supported on the zeolitic material in an amount in the range of from 0.5 to 10 weight-%, more preferably in the range of from 0.75 to 6 weight-%, more preferably in the range of from 1 to 4 weight-%, more preferably in the range of from 1 to 3 weight-%, based on the weight of the platinum group metal and the zeolitic material.

108. The process of any one of embodiments 101 to 107, wherein the NOx adsorber mixture obtained in (a) and disposed on the surface of the internal walls of the first substrate comprises from 0.001 to 1 weight-% preferably from 0.01 to 0.1 weight-%, of $CeO_2$, calculated as $CeO_2$, wherein the NOx adsorber mixture obtained in (a) and disposed on the surface of the internal walls of the first substrate is more preferably essentially free of $CeO_2$.

109. The process of any one of embodiments 100 to 108, wherein the second catalyst according to (ii) is prepared by and/or wherein the process further comprises (d) providing the second substrate, and a first lean NOx trap mixture comprising water, a first non-zeolitic oxidic support material, Pt and Pd, wherein Pt and Pd are both supported on the first non-zeolitic oxidic support material;

(e) disposing the first lean NOx trap mixture obtained in (d) on the surface of the internal walls of the second substrate over at least 50% of the substrate axial length of the second substrate; to obtain a second coating;

(f) optionally calcining of the coated second substrate obtained in (e) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (f), optionally drying of the coated second substrate obtained in (e) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

110. The process of embodiment 109, wherein the second substrate according to (ii.1) is a flow-through substrate or a wall flow filter substrate, preferably a flow-through substrate, wherein the flow-through substrate is preferably one or more of a cordierite flow-through substrate and a metallic flow-through substrate, more preferably a cordierite flow-through substrate or a metallic flow-through substrate, wherein the metallic flow-through substrate preferably is a metallic electrically and/or thermally conductive flow-through substrate, wherein the second substrate according to (ii.1) preferably is a monolith, more preferably a honeycomb monolith, wherein the second substrate according to (ii.1) more preferably has a volume in the range of from 0.400 to 2.100 l, preferably in the range of from 0.500 to 1.900 l, more preferably in the range of from 0.700 to 1.500 l, more preferably in the range of from 0.800 to 1.000 l, more preferably in the range of from 0.900 to 0.950 l, or wherein the second substrate according to (b.1) more preferably has a volume in the range of from 0.900 to 3.000 l, preferably in the range of from 1.500 to 2.500 l, more preferably in the range of from 1.700 to 2.300 l, more preferably in the range of from 1.900 to 2.100 l.

111. The process of embodiment 109 or 110, wherein the first lean NOx trap mixture according to (d) is disposed on the surface of the internal walls of the second substrate according to (ii.1) over 50 to 100%, preferably over 80 to 100%, preferably over 90 to 100%, more preferably over 95 to 100%, more preferably over 98 to 100%, of the substrate axial length of the second substrate according to (ii.1), wherein the first lean NOx trap mixture according to (d) preferably is disposed on the surface of the internal walls of the second substrate according to (ii.1) from the inlet end to the outlet end of the second substrate according to (ii.1) or from the outlet end to the inlet end of the second substrate according to (ii.1).

112. The process of any one of embodiments 109 to 111, wherein from 45 to 90 weight-%, preferably from 50 to 90 weight-%, more preferably from 55 to 85 weight-%, more preferably from 60 to 80 weight-%, more preferably from 65 to 75 weight-%, of the first non-zeolitic oxidic support material comprised in the first lean NOx trap mixture according to (d) consist of $Al_2O_3$, calculated as $Al_2O_3$.

113. The process of any one of embodiments 109 to 112, wherein from 10 to 55 weight-%, preferably from 10 to 50 weight-%, more preferably from 15 to 45 weight-%, more preferably from 20 to 40 weight-%, more preferably from 25 to 35 weight-%, of the first non-zeolitic oxidic support material comprised in the first lean NOx trap mixture according to (d) consist of $CeO_2$, calculated as $CeO_2$, and/or wherein the first non-zeolitic oxidic support material comprised in the first lean NOx trap mixture according to (d) further comprises BaO, wherein preferably from 5 to 20 weight-%, more preferably from 5 to 15 weight-%, more preferably from 5 to 10 weight-%, of the first non-zeolitic oxidic support material comprised in the first lean NOx trap mixture according to (d) consist of BaO.

114. The process of any one of embodiments 109 to 113, wherein from 90 to 100 weight-%, preferably from 95 to 100 weight-%, more preferably from 99 to 100 weight-%, more preferably from 99.9 to 100 weight-%, of the first non-zeolitic oxidic support material comprised in the first lean NOx trap mixture according to (d) consists of $CeO_2$, $Al_2O_3$, and optionally BaO.

115. The process of any one of embodiments 109 to 114, wherein the first lean NOx trap mixture according to (d) further comprises Rh and a second non-zeolitic oxidic support material, wherein Rh is supported on the second non-zeolitic oxidic support material.

116. The process of embodiment 115, wherein the second non-zeolitic oxidic support material comprised in the first lean NOx trap mixture according to (d) comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

117. The process of any one of embodiments 109 to 116, wherein the first lean NOx trap mixture according to (d) further comprises a first alkaline earth metal supported on a third non-zeolitic oxidic support material, wherein the first alkaline earth metal preferably comprises one or more of Mg, Ca, Sr and Ba, more preferably one or more of Mg and Ba, wherein the first alkaline earth metal more preferably comprises, more preferably consists of, Ba, wherein the third non-zeolitic oxidic support material preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

118. The process of any one of embodiments 109 to 117, wherein the first lean NOx trap mixture according to (d) further comprises a second alkaline earth metal, wherein the second alkaline earth metal preferably comprises one or more of Mg, Ca, Sr and Ba, more preferably one or more of Mg and Ba, wherein the second alkaline earth metal more preferably comprises, more preferably consists of, Mg.

119. The process of any one of embodiments 109 to 118, wherein the first lean NOx trap mixture according to (d) further comprises $ZrO_2$.

120. The process of any one of embodiments 109 to 119, wherein the first lean NOx trap mixture according to (d) comprises from 0.001 to 1 weight-%, preferably from 0.01 to 0.1 weight-%, of a zeolitic material, calculated as zeolitic material as such, wherein the first lean NOx trap mixture according to (d) is more preferably essentially free of a zeolitic material.

121. The process of any one of embodiments 100 to 120, wherein the NOx adsorber component according to (1) and the lean NOx trap component according to (1) are arranged in a conduit for the exhaust gas, preferably in sequential order, the upstream end of said conduit preferably designed to be arranged downstream of a diesel combustion engine, wherein more preferably, the upstream end of said conduit is arranged downstream of a diesel combustion engine.

122. The process of any one of embodiments 100 to 121, wherein the NOx adsorber component according to (1) and the lean NOx trap component according to (1) are arranged in directly consecutive order, wherein preferably no other component for the treatment of the exhaust gas is arranged between the NOx adsorber component and the lean NOx trap component.

123. The process of any one of embodiments 100 to 122, wherein the outlet end of the first substrate according to (i.1) and the inlet end of the second substrate according to (ii.1) are arranged opposite to each other, wherein the angle between the surface normal of the surface defined by the outlet end of the first substrate and the surface normal of the surface defined by the inlet end of the second substrate is preferably in the range of from 0 to 5°, more preferably in the range of from 0 to 3°, more preferably in the range of from 0 to 1°.

124. The process of any one of embodiments 100 to 123, wherein the first substrate according to (i.1) and the second substrate according to (ii.1) together form one single substrate which comprises an inlet end, an outlet end, a substrate axial length extending from the inlet end to the outlet end of the single substrate, and a plurality of passages defined by internal walls of the single substrate extending therethrough, wherein the NOx adsorber mixture according to (a) is preferably disposed on the surface of the internal walls of the single substrate over at least 50% of the substrate axial length of the single substrate and the first lean NOx trap mixture according to (d) is preferably disposed on the surface of the internal walls of the single substrate, the surface of the internal walls of the single substrate being at least partially coated with the NOx adsorber mixture according to (a), over at least 50% of the substrate axial length of the single substrate.

125. The process of embodiment 124, further comprising prior to disposing the NOx adsorber mixture according to (a) and the first lean NOx trap mixture according to (d)

(g) providing one or more cavities in the single substrate, preferably by drilling one or more cavities into the one or more internal walls of the single substrate;

wherein each cavity extends from an outer position, wherein the outer position is located at the outer surface of the single substrate, to an inner position, wherein the inner position is located within the single substrate.

126. The process of embodiment 125, wherein providing one or more cavities according to (g) is performed in a direction, preferably from the outer position to the inner position, comprising an angle between said direction and the direction of the passages, in the range of from 85 to 95°, more preferably in the range of from 88 to 92°, more preferably in the range of from 89 to 91°, wherein the direction of the cavity is more preferably essentially orthogonal to the direction of the passages, wherein the direction of the passages is preferably defined by the plurality of passages comprised in the single substrate, wherein the plurality of passages preferably define passages which are arranged essentially in parallel to each other, 127. The process of embodiment 125 or 126, wherein providing one or more cavities according to (g) is performed in a direction, preferably from the outer position to the inner position, over a distance from the outer position on the surface of the single substrate to the inner position within the single substrate, in the range of from 1 to 99%, preferably in the range of from 10 to 90%, more preferably in the range of from 30 to 70%, more preferably in the range of from 40 to 60%, of the distance between the outer position and a postulated further outer position, wherein the postulated further outer position is located at the outer surface of the single substrate where a postulated extended direction of the cavity punctures the outer surface of the single substrate.

128. The process of any one of embodiments 125 to 127, wherein providing one or more cavities according to (g) is performed from an outer position located at the outer surface of the single substrate in the range of from 25 to 75%, preferably in the range of from 40 to 60%, more preferably in the range of from 45 to 55%, more preferably in the range of from 47.5 to 52.5%, more preferably in the range of from 49 to 51%, of the length of the single substrate from the inlet end.

129. The process of any one of embodiments 125 to 128, wherein each cavity comprises a cross section having a surface normal, wherein the angle between the surface normal and the direction of the cavity is preferably in the range of from 0 to 5°, more preferably in the range of from 0 to 3°, more preferably in the range of from 0 to 1°, wherein the surface normal and the direction of the cavity are preferably essentially parallel to each other, wherein the direction of the cavity is preferably essentially orthogonal to the cross section.

130. The process of embodiment 129, wherein the cross section is circular, wherein the cross section preferably has a diameter in the range of from 5 to 55 mm, preferably in the range of from 10 to 55 mm.

131. The process of any one of embodiments 125 to 130, wherein each cavity is suitable for introducing a reductant, preferably a fuel or a hydrocarbon, into at least a portion of the plurality of the passages comprised in the single substrate.

132. The process of any one of embodiments 125 to 131, wherein the first coating according to (a.2) and the second coating according to (b.2) do not overlap, and wherein at least one of the one or more cavities is located between the first coating according to (a.2) and the second coating according to (b.2), wherein preferably all of the one or more cavities are located between the first coating according to (a.2) and the second coating according to (b.2).

133. The process of any one of embodiments 100 to 132, further comprising (h) providing at least one reductant injector, wherein each reductant injector preferably is a hydrocarbon injector, more preferably a fuel injector, wherein each reductant injector is arranged upstream of the lean NOx trap component, wherein each reductant injector is preferably arranged between the NOx adsorber component and the lean NOx trap component, more preferably between the first catalyst according to (a) and the second catalyst according to (b), wherein the process is preferably in accordance with any one of the embodiments 100 to 123, or (k) providing at least one reductant injector into a cavity provided according to (g) in accordance with any one of embodiments 125 to 132, wherein each reductant injector preferably is a hydrocarbon injector, more preferably a fuel injector.

134. The process of any one of embodiments 100 to 133, wherein no air injector is arranged between the first catalyst according to (i) and the second catalyst according to (ii), wherein more preferably no air injector is arranged between the NOx adsorber component and the lean NOx trap component, wherein more preferably no air injector is provided.

135. The process of any one of embodiments 100 to 134, further comprising (3) providing a gas heating component (4) arranging the gas heating component downstream of the NOx adsorber component and upstream of the lean NOx trap component.

136. The process of embodiment 135, wherein the NOx adsorber component and the gas heating component are arranged in directly consecutive order, and wherein preferably the gas heating component and the lean NOx trap component are arranged in directly consecutive order.

137. The process of embodiment 135 or 136, wherein no other component for the treatment of the exhaust gas is arranged between the NOx adsorber component and the gas heating component, and wherein preferably no other component for the treatment of the exhaust gas is arranged between the gas heating component and the lean NOx trap component.

138. The process of any one of embodiments 135 to 137, wherein providing the gas heating component according to (3) comprises (iii.1) providing a third substrate comprising an inlet end, an outlet end, a substrate axial length extending from the inlet end to the outlet end of the third substrate, and a plurality of passages defined by internal walls of the third substrate extending therethrough;

coupling the inlet end of the third substrate according to (iii.1) with the outlet end of the first substrate according to (i.1) to allow exhaust gas exiting from the passages of the first substrate to enter the passages of the third substrate; and coupling the inlet end of the second substrate according to (ii.1) with the outlet end of the third substrate according to (iii.1) to allow exhaust gas exiting from the passages of the third substrate to enter the passages of the second substrate;

wherein the internal walls of the third substrate are thermally conductive to allow heating thereof for heating of exhaust gas flowing through the passages of the third substrate.

139. The process of embodiment 138, wherein the third substrate provided according to (iii.1) is a flow-through substrate, preferably a metallic flow-through substrate, more preferably a metallic electrically and/or thermally conductive flow-through substrate.

140. The process of embodiment 138 or 139, wherein the third substrate provided according to (iii.1) has a cylindrical shape, the diameter of the third substrate preferably being in the range of from 3 to 10 inches, more preferably in the range of from 3.5 to 8 inches, more preferably in the range of from 4 to 6 inches, wherein more preferably, the diameter of the third substrate is in the range of from 90 to 110%, preferably in the range of from 95 to 105%, more preferably in the range of from 98 to 102% of the diameter of the first substrate, the third substrate provided according to (iii.1) preferably having an axial length in the range of from 0.15 to 2 inches, more preferably in the range of from 0.20 to 1.5 inches, more preferably in the range of from 0.30 to 1 inch.

141. The system of any one of embodiments 138 to 140, wherein the gas heating component provided according to (3) consists of the third substrate according to (iii.1), said substrate being an uncoated substrate.

142. The process of any one of embodiments 138 to 141, further comprising (iii.2) disposing a second lean NOx trap mixture on the surface of the internal walls of the third substrate provided according to (3) over at least 1% of the substrate axial length of the third substrate; to obtain a third coating;

wherein the second lean NOx trap mixture is preferably disposed on the surface of the internal walls of the third substrate from the outlet end to the inlet end of the third substrate, the second lean NOx trap mixture comprising a fourth non-zeolitic oxidic support material, Pt and Pd, wherein Pt and Pd are both supported on the fourth non-zeolitic oxidic support material;

wherein the fourth non-zeolitic oxidic support material comprises $CeO_2$ and $Al_2O_3$, wherein at least 45 weight-% of the fourth non-zeolitic oxidic support material consist of $Al_2O_3$, calculated as $Al_2O_3$, and wherein at least 10 weight-% of the fourth non-zeolitic oxidic support material consist of $CeO_2$, calculated as $CeO_2$;

(iii.3) optionally calcining of the coated third substrate obtained in (iii.1) in a gas atmosphere, the gas atmosphere preferably having a temperature in the range of from 400 to 800° C., preferably in the range of from 450 to 700° C., more preferably in the range of from 550 to 650° C., preferably for a duration in the range of from 0.25 to 5 hours, the gas atmosphere preferably being air, wherein, prior to calcining in (iii.2), optionally drying of the coated second substrate obtained in (iii.1) is performed in a gas atmosphere having a temperature in the range of from 90 to 150° C., preferably in the range of from 100 to 120° C., preferably for a duration in the range of from 0.5 to 4 hours, more preferably in the range of from 0.75 to 2 hours, the gas atmosphere preferably being air.

143. The process of embodiment 142, wherein the second lean NOx trap mixture is disposed according to (iii.2) on the surface of the internal walls of the third substrate over 5 to 100%, preferably over 10 to 90%, more preferably over 20 to 80%, more preferably over 30 to 70%, more preferably over 40 to 60%, of the substrate axial length of the third substrate, wherein disposing the third coating is preferably performed on the surface of the internal walls of the third substrate from the outlet end to the inlet end of the third substrate.

144. The process of embodiment 142 or 143, wherein from 45 to 90 weight-%, preferably from 50 to 90 weight-%, more preferably from 51 to 89 weight-%, more preferably from 55 to 85 weight-%, more preferably from 60 to 80 weight-%, more preferably from 65 to 75 weight-%, of the fourth non-zeolitic oxidic support material comprised in the second lean NOx trap mixture consist of $Al_2O_3$, calculated as $Al_2O_3$.

145. The process of any one of embodiments 142 to 144, wherein from 10 to 55 weight-%, preferably from 10 to 50 weight-%, more preferably from 11 to 49 weight-%, more preferably from 15 to 45 weight-%, more preferably from 20 to 40 weight-%, more preferably from 25 to 35 weight-%, of the fourth non-zeolitic oxidic support material comprised in the second lean NOx trap mixture consist of $CeO_2$, and/or wherein the fourth non-zeolitic oxidic support material comprised in the second lean NOx trap mixture further comprises BaO, wherein preferably from 5 to 20 weight-%, more preferably from 5 to 15 weight-%, more preferably from 5 to 10 weight-%, of the fourth non-zeolitic oxidic support material comprised in the second lean NOx trap mixture consist of BaO.

146. The process of any one of embodiments 142 to 145, wherein from 90 to 100 weight-%, preferably from 95 to 100 weight-%, more preferably from 99 to 100 weight-%, more preferably from 99.9 to 100 weight-%, of the fourth non-zeolitic oxidic support material comprised in the second lean NOx trap mixture consist of $CeO_2$, $Al_2O_3$, and optionally BaO.

147. The process of any one of embodiments 142 to 146, wherein the second lean NOx trap mixture further comprises Rh and a fifth non-zeolitic oxidic support material, wherein Rh is supported on the fifth non-zeolitic oxidic support material.

148. The process of embodiment 147, wherein the fifth non-zeolitic oxidic support material further comprised in the second lean NOx trap mixture is different to the fourth non-zeolitic oxidic support material comprised in the second lean NOx trap mixture, wherein the fifth non-zeolitic oxidic support material further comprised in the second lean NOx trap mixture preferably comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

149. The process of any one of embodiments 142 to 148, wherein the second lean NOx trap mixture further comprises a third alkaline earth metal supported on a sixth non-zeolitic oxidic support material.

150. The process of embodiment 149, wherein the third alkaline earth metal comprised in the second lean NOx trap mixture comprises one or more of Mg, Ca, Sr and Ba, more preferably one or more of Mg and Ba, wherein the third alkaline earth metal more preferably comprises, more preferably consists of, Ba.

151. The process of embodiment 149 or 150, wherein the sixth non-zeolitic oxidic support material comprised in the second lean NOx trap mixture comprises one or more of $Al_2O_3$, $SiO_2$, $TiO_2$, $ZrO_2$, $La_2O_3$, $Pr_2O_3$, $CeO_2$, $MnO_2$, a mixed oxide comprising two or more of Al, Si, Ti, Zr, La, Pr, Ce, and Mn, and a mixture of two or more thereof, preferably one or more of $Al_2O_3$, $SiO_2$, $CeO_2$, $MnO_2$, a mixed oxide comprising two or more of Al, Si, Ce, and Mn, and a mixture of two or more thereof, more preferably one or more of $Al_2O_3$, $CeO_2$, a mixed oxide comprising Al and Ce, and a mixture of two or more thereof, more preferably $CeO_2$.

152. The process of any one of embodiments 149 to 151, wherein the sixth non-zeolitic oxidic support material comprised in the second lean NOx trap mixture comprises the third alkaline earth metal at a loading, calculated as oxide of the third alkaline earth metal, preferably as BaO, in the range of from 0.5 to 5 weight-%, preferably in the range of from 1.5 to 2.5 weight-%, more preferably in the range of from 1.8 to 2.2 weight-%, based on the weight of the sixth non-zeolitic oxidic support material.

153. The process of any one of embodiments 142 to 152, wherein the second lean NOx trap mixture further comprises a fourth alkaline earth metal, wherein the fourth alkaline earth metal preferably comprises one or more of Mg, Ca, Sr and Ba, more preferably one or more of Mg and Ba, wherein the fourth alkaline earth metal more preferably comprises, more preferably consists of, Mg.

154. The process of any one of embodiments 142 to 153, wherein the second lean NOx trap mixture comprises from 0.001 to 1 weight-% preferably from 0.01 to 0.1 weight-%, of a zeolitic material, calculated as zeolitic material as such, wherein the second lean NOx trap mixture is more preferably essentially free of a zeolitic material.

155. The process of any one of embodiments 142 to 154, wherein from 98 to 100 weight-%, preferably from 99 to 100 weight-%, more preferably from 99.5 to 100 weight-%, more preferably from 99.9 to 100 weight-%, of the second lean NOx trap mixture consist of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$, wherein more preferably the second lean NOx trap mixture essentially consists of Pt, Pd, the fourth non-zeolitic oxidic support material, optionally Rh, optionally the fifth non-zeolitic oxidic support material, optionally the third alkaline earth metal and the sixth non-zeolitic oxidic support material, optionally the fourth alkaline earth metal, and optionally $ZrO_2$.

156. The process of any one of embodiments 138 to 155, wherein the outlet end of the third substrate and the inlet end of the second substrate are arranged opposite to each other, wherein the angle between the surface normal of the surface defined by the outlet end of the third substrate and the surface normal of the surface defined by the inlet end of the second substrate is preferably in the range of from 0 to 5°, more preferably in the range of from 0 to 3°, more preferably in the range of from 0 to 1°.

157. The process of any one of embodiments 138 to 156, wherein the outlet end of the third substrate and the inlet end of the second substrate are spaced from one another, preferably at a distance in the range of from 2 to 20 mm, preferably in the range of from 5 to 15 mm, more preferably in the range of from 8 to 12 mm, wherein the outlet end of the third substrate and the inlet end of the second substrate are preferably spaced from one another by one or more spacer means, preferably one or more spacer rods, wherein a given spacer rod is preferably fixed at either the outlet end of the third substrate, or at the inlet end of the second substrate, or at the outlet end of the third substrate as well as at the inlet end of the second substrate, wherein the one or more spacer means, preferably the one or more spacer rods, are preferably electrically insulating.

158. The process of any one of embodiments 138 to 157, further comprising
  (I) mounting a jacket around the third substrate according to (iii.1) and the second substrate according to (ii.1), wherein preferably from 95 to 100%, more preferably from 98 to 100%, more preferably from 99 to 100% of the inlet end face of the second substrate and preferably from 95 to 100%, more preferably from 98 to 100%, more preferably from 99 to 100% of the outlet end face of the third substrate are not covered by the jacket, wherein the jacket preferably comprises one or more means for connecting the third substrate to an electrical power supply.

159. A system for the treatment of an exhaust gas of a diesel combustion engine, preferably a system for the treatment of an exhaust gas of a diesel combustion engine according to any one of embodiments 1 to 99, obtainable or obtained by a process according to any one of embodiments 100 to 158.

160. A method for the treatment of an exhaust gas of a diesel combustion engine, comprising providing an exhaust gas from a diesel combustion engine and passing said exhaust gas through a system according to any one of embodiments 1 to 99 and 159.

161. The method of embodiment 160, wherein the system comprises a fuel injector, wherein a fuel is injected through the fuel injector into the exhaust gas passed through said system.

162. Use of a system according to any one of embodiments 1 to 99 and 159 for treating an exhaust gas of a diesel combustion engine, said use particularly comprising passing said exhaust gas through said system.

By way of example, a fuel injector may comprise a pumping mechanism and/or a valve for interrupting the inlet for one or more fuels into the exhaust gas wherein said pumping device and/or valve is respectively adjusted for providing the desired amount of the one or more fuels into the exhaust gas and/or is connected to a control device which is preferably integrated in a monitoring system for allowing exact control of the rate of introduction of the one or more fuels into the exhaust gas depending on the desired composition of the exhaust gas upon contacting thereof with at least a portion of the catalyst.

In the context of the present invention, the term “the surface of the internal walls” is to be understood—unless otherwise stated—as the “naked” or “bare” or “blank” surface of the walls, i. e. the surface of the walls in an untreated state which consists—apart from any unavoidable impurities with which the surface may be contaminated—of the material of the walls.

In the case where a single substrate is used in accordance with the present invention, thus, including a first and a second catalyst, it is to be understood that the first coating is disposed first on the surface of the internal walls of the single substrate and a second coating is disposed second on the single substrate. Depending on the length of the first and second coating, the following three possible arrangements are conceivable. First, the first and second coating do not overlap. In this case, the first coating is disposed from the inlet end of the single substrate and the second coating is disposed from the outlet end of the single substrate. Second, the first and second coating overlap. In this case, the second coating is at least partially disposed on the first coating and at least partially on the surface of the internal walls of the single substrate. Third, the second coating is disposed completely on the first coating. In this case, the second coating is disposed on the surface of the internal walls of the single substrate which are already coated with the first coating. Then, the first coating represents a bottom coating and the second coating represents a top coating.

In the context of the present invention, the term “consists of” with regard to the weight-% of one or more components indicates the weight-% amount of said component(s) based on 100 weight-% of the designated entity. For example, the wording “wherein from 0 to 0.001 weight-% of the first coating consists of X” indicates that among the 100 weight-% of the components of which said coating consists of, 0 to 0.001 weight-% is X.

In the context of the present invention, a weight/loading of a platinum group metal is calculated as the weight/loading of the respective platinum group metal as element or the sum the weights/loadings of the respective platinum group metals as elements. For example, if a platinum group metal comprises Rh, the weight of said platinum group metal is calculated as elemental Rh. As a further example, if a platinum group metal comprises of Pt and Pd, the weight of said platinum group metal is calculated as elemental Pt and Pd. The same applies to a weight/loading of an alkaline earth metal.

In the context of the present invention, the indication of a loading of a given component/coating (in $g/in^3$ or $g/ft^3$) refers to the mass of said component/coating per volume of the substrate, wherein the volume of the substrate is the volume which is defined by the cross-section of the substrate times the axial length of the substrate on/over which said component/coating is present. For example, if reference is made to the loading of a first coating extending over x % of the axial length of the substrate and having a loading of X g/in$^3$, said loading would refer to X gram of the first coating per x % of the volume (in in$^3$) of the entire substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

In the context of the present invention, a weight/loading of a non-zeolitic oxidic support material is calculated as the weight/loading of the respective non-zeolitic oxidic support material as oxide or the sum the weights/loadings of the respective non-zeolitic oxidic support material as oxides. For example, if a non-zeolitic oxidic material is $SiO_2$, the weight of said non-zeolitic oxidic support material is calculated as $SiO_2$. As a further example, if a non-zeolitic oxidic support material consists of a mixed oxide comprising Ti and Al, the weight of said non-zeolitic oxidic support material is calculated as sum of $TiO_2$ and $Al_2O_3$.

In the context of the present invention the indication of supporting a platinum group metal on a non-zeolitic oxidic support material is to be understood as including ion-exchanging, impregnating, e.g. by wet impregnation, adsorbing, and other conceivable methods.

According to the present invention, the terms "upstream" and "downstream" are used to describe a location relative to the direction of exhaust flow originating from the engine.

The present invention is further illustrated by the following examples and comparative examples.

EXAMPLES

Comparative Example 1: Preparation of a System Comprising a NOx Adsorber Component and a Diesel Oxidation Catalyst Component An ammonium ferrierite (FER; having a silica-to-alumina ratio of 26:1) zeolite was wet impregnated with palladium to attain a Pd loading of 2.31 weight-%. The resulting Pd-FER slurry was coated as a bottom layer onto a cordierite honeycomb substrate having a total volume of 1.85 I then dried for 1 h in air and then calcined for 1 h in air at 590° C. The loading of palladium on the coated substrate was 80 g/ft$^3$ and the total bottom washcoat loading was 3 g/in$^3$.

An $Al_2O_3$ support material comprising 5 weight-% $MnO_2$ was impregnated with platinum via a wet impregnation process. A slurry containing the resulting material and a Beta zeolite (having a silica-to-alumina ratio of 26:1) was coated 50% from the outlet of the cordierite substrate carrying the Pd-FER bottom layer. The outlet top layer contained 80 g/ft$^3$ platinum and the outlet top layer washcoat loading was 1.45 g/in$^3$.

An $Al_2O_3$ support material comprising 5 weight-% $SiO_2$ was impregnated with platinum and Palladium in a weight ratio of 10:1 via a wet impregnation process. A slurry containing this material and a Beta zeolite was coated 50% from the inlet of the cordierite substrate carrying the Pd-FER bottom layer and the outlet top layer. The inlet top layer contained 37 g/ft$^3$ platinum and 3.7 g/ft$^3$ Pd. The inlet top layer washcoat loading was 1.55 g/in$^3$.

Comparative Example 2: Preparation of a System Comprising a Lean NOx Trap Component A $CeO_2$—$Al_2O_3$ support material comprising 30 weight-% $CeO_2$ and 70 weight-% $Al_2O_3$ was impregnated via incipient wetness method firstly with platinum to give a dry Pt content of 121 g/ft$^3$ and secondly with palladium giving a final dry Pd content of 14 g/ft$^3$. The resulting powder with a solid content of 55 weight-% was dispersed in water.

$CeO_2$ was wet impregnated with rhodium giving a final dry Rh content of 5 g/ft$^3$.

$CeO_2$ was impregnated via incipient wetness method with 0.08 g/in$^3$ Ba-Acetate solution. The final powder was dried for 30 min at a temperature of 120° C. in air and calcined for 2 h at a temperature of 600° C. in air to achieve a $CeO_2$ material containing 2 weight-% BaO.

The resulting Rh—$CeO_2$ slurry, the $CeO_2$ material containing 2 weight-% BaO, Magnesium acetate hydrate ($Mg(OAc)_2 \cdot 4H_2O$) and Zirconium acetate ($Zr(OAc)_4$) were added to the Pt—Pd—$Al_2O_3$ slurry. The final slurry is coated onto a cordierite honeycomb substrate having a total volume of 1.85 l. The coated substrate was dried for 1 h at a temperature of 110° C. in air and calcined for 1 h at a temperature of 590° C. in air.

The washcoat had a total loading of $CeO_2$ of 4.1 g/in$^3$ whereby 0.4 g/in$^3$ were used as support for Rh as described above and 4.02 g/in$^3$ were used as support for BaO as described above. Further, the total loading of MgO was 0.3 g/in$^3$, the total loading of $ZrO_2$ was 0.05 g/in$^3$, and the total loading of $CeO_2$—$Al_2O_3$ as support for Pt and Pd was 1.5 g/in$^3$.

Example 3: Preparation of a System Comprising a NOx Adsorber Component and a Lean NOx Trap Component For a first component, an ammonium ferrierite (FER; having a silica-to-alumina ratio of 26:1) zeolite was wet impregnated with palladium to attain a Pd loading of 2.31 weight-%. The resulting Pd-FER slurry was coated as a bottom layer onto a first cordierite honeycomb substrate having a total volume of 0.925 l then dried for 1 h in air and then and calcined for 1 h in air at 590° C. The loading of palladium on the coated substrate was 140 g/ft$^3$ and the total bottom washcoat loading on the first substrate was 3 g/in$^3$.

For a second component, a mixture of $CeO_2$ and $Al_2O_3$ as support material comprising 30 weight-% $CeO_2$ and 70 weight-% $Al_2O_3$ was impregnated via incipient wetness method firstly with platinum to give a dry Pt content of 121 g/ft$^3$ and secondly with palladium giving a final dry Pd content of 14 g/ft$^3$. The resulting powder with a solid content of 55 weight-% was dispersed in water.

$CeO_2$ (0.4 g/in$^3$) was wet impregnated with rhodium giving a final dry Rh content of 5 g/ft$^3$. The resulting powder was dispersed in water.

$CeO_2$ (4.02 g/in$^3$) was impregnated via incipient wetness method with Ba-Acetate solution giving a final BaO loading of 0.08 g/in$^3$. The final powder was dried for 30 min at a temperature of 120° C. in air and calcined for 2 h at a temperature of 600° C. in air to achieve a $CeO_2$ material containing 2 weight-% BaO. The resulting powder was dispersed in water.

The resulting Rh—$CeO_2$ slurry, the $CeO_2$ material containing 2 weight-% BaO, Magnesium acetate hydrate ($Mg(OAc)_2 \cdot 4H_2O$) and Zirconium acetate ($Zr(OAc)_4$) were added to the Pt—Pd—$Al_2O_3$ slurry. The final slurry was coated onto a second cordierite honeycomb substrate having a total volume of 0.925 l. The coated substrate was dried for 1 h at a temperature of 110° C. in air and then calcined for 1 h at a temperature of 590° C. in air.

The washcoat on the second substrate had a total loading of $CeO_2$ of 4.42 g/in$^3$ comprising 0.4 g/in$^3$ of $CeO_2$ which were used as support for Rh as described above and 4.02 g/in$^3$ of $CeO_2$ which were used as support for BaO as described above. Further, the total loading of MgO was 0.3 g/in$^3$, the total loading of $ZrO_2$ was 0.05 g/in$^3$, the total loading of BaO was 0.08 g/in$^3$, and the total loading of $CeO_2$—$Al_2O_3$ as support for Pt and Pd was 1.5 g/in$^3$.

Based on said loadings the washcoat on the second substrate exhibited a ratio of the weight of Pt, calculated as elemental Pt, to the weight of Pd, calculated as elemental Pd, of 8.64:1, a ratio of the weight of Pt, calculated as elemental Pt, to the weight of Rh, calculated as elemental Rh, of 24.2:1, a ratio of the weight of Pd, calculated as elemental Pd, to the weight of Rh, calculated as elemental Rh, of 2.8:1.

The components were combined such that the first component was placed upstream of the second component to obtain a system comprising a NOx adsorber component and a lean NOx trap component.

Example 4: Preparation of a System Comprising a NOx Adsorber Component, a Fuel Injector and a Lean NOx Trap Component First component and second component were prepared according to Example 3. The components were combined with a fuel injector such that the first component was placed upstream of the fuel injector which was placed upstream of the second component to obtain a system comprising a NOx adsorber component and a lean NOx trap component.

Example 5: Catalytic Testing in Accordance with the City Driving Mode of the New European Driving Cycle (NEDC)

The systems according to Comparative examples 1 and 2 and Example 3 were tested in a simulated city driving cycle on a 2 l diesel engine. The driving cycle was compiled from city driving mode of the New European Driving Cycle (NEDC). The average temperature of the cycle was about 170° C. The cycle was driven twice for 1880 s. Prior to the first test the temperature of the evaluated samples, the pre catalyst temperature, was increased to 650° C. for 10 min, to remove pre-adsorbed NOx.

The systems according to Comparative example 1 and Example 3 were tested after aging each for 16 h at 800° C. in air comprising 10 weight-% steam. In case of Comparative example 2 a standard desulfation (DeSOx) procedure (10 min alternating lean and rich) was applied to activate the sample. For Comparative examples 2 and Example 3 rich DeNOx pulses were applied for 10 s at a lambda of 0.95 at 1182 s and at 1812 s. In particular, each rich DeNOx pulse is performed for a duration of 10 s at a lambda of 0.95.

FIG. 1 provides the test results of the second run. The two formulations comprising the Pd-FER NOx adsorber material, Comparative example 1 and Example 3, show a high NOx adsorption during the first 400 s, whereas Comparative example 2 shows a lower NOx adsorption rate. After 400 s of the second run, i.e. after the cold start, the LNT containing Comparative example 2 and Example 3 show lower emissions compared to Comparative example 1. Example 3 shows the lowest NOx emissions, as can be seen in table 1.

TABLE 1

NO*x* emissions (in mg) of the systems according to Comparative example 1, Comparative example 2, and Example 3 determined after 400 s of the second test run, and after 1880 s

| # | NO*x* emissions after 400 s [mg] | NO*x* emissions after 1880 s [mg] |
|---|---|---|
| Comparative example 1 | 40 | 1960 |
| Comparative example 2 | 200 | 1760 |
| Example 3 | 30 | 1620 |

Example 6: Catalytic Testing in Accordance with the Worldwide Harmonized Light Vehicle Test Cycle (WLTC)

In addition to NOx the lean NOx trap (LNT) also adsorbs sulfur and sulfur compounds. Typically, this leads to a decrease of the NOx adsorption capacity of the lean NOx trap. After 1-2 g/l sulfur loading the LNT usually needs to be desulfated applying a high temperature lean rich treatment from the engine. To simulate 50000 km driving a desulfation (DeSOx) aging procedure comprising 750 lean/rich transition at 720° C. maximum temperature were applied on engine for Comparative example 2 and Example 3.

Comparative example 2 and Example 3 were tested each in a Worldwide Harmonized Light Vehicle Test Cycle (WLTC) on a 2 l diesel engine after aging. As aging conditions, oven aging was performed for 16 h at 800° C. in air comprising 10 weight-% steam and/or additional desulfation (DeSOx) aging was performed.

FIG. 2 provides the NOx emissions determined during the cold start phase of the WLTC for the system according to Comparative example 2 oven aged and desulfation (DeSOx) aged, for the system according to Example 3 oven aged and for the system according to Example 3 desulfation (DeSOx) aged. The system according to Comparative example 2 shows very low impact of desulfation (DeSOx) aging. The system according to Example 3 shows a strong negative impact on NOx adsorption after DeSOx aging—the NOx adsorption of the Example 3 is lower compared to Comparative example 2.

However, said effect of DeSOx aging can be remedied by operation of a fuel injector arranged upstream of the lean NOx trap (LNT) component. Thus, in Example 4 a fuel injector was placed downstream of the NOx adsorber component and upstream of the lean NOx trap (LNT) component. In this set-up, the desulfation (DeSOx) has no negative impact on the NOx adsorber. As a consequence, the NOx adsorption performance of the system according to Example 4 will be the same as achieved for the system according to Example 3 oven aged.

Example 7: Preparation of a System Comprising a NOx Adsorber Component, and a Lean NOx Trap Component For a first component, an ammonium ferrierite (FER; having a silica-to-alumina ratio of 26:1) zeolite was wet impregnated with palladium to attain a Pd loading of 2.3 weight-%. $Zr(OAc)_4$ was added to the resulting Pd-FER slurry to achieve a final amount of $ZrO_2$ on the substrate of 0.15 g/in$^3$. The slurry was coated onto a first metallic substrate having a total volume of 0.597 l.

The coated substrate was dried at a temperature of 110° C. for 1 h in air and then calcined for 1 h in air at 590° C. The loading of palladium on the coated substrate was 120 g/ft$^3$ and the total washcoat loading on the first substrate was 3.15 g/in$^3$.

For a second component, a mixture of NOx adsorber material containing 10% BaO; 45% $CeO_2$ and 45% $Al_2O_3$ was impregnated via incipient wetness method firstly with platinum to give a dry Pt content of 103 g/ft$^3$ and secondly with palladium giving a final dry Pd content of 12 g/ft$^3$. The resulting powder with a solid content of 55 weight-% was dispersed in water.

$CeO_2$ (0.32 g/in$^3$) was wet impregnated with rhodium giving a final dry Rh content of 5 g/ft$^3$. The resulting powder was dispersed in water.

The resulting Rh—$CeO_2$ slurry, $CeO_2$ (2.73 g/in$^3$), Magnesium acetate hydrate ($Mg(OAc)_2 \cdot 4H_2O$) (0.3 g/in$^3$) and Zirconium acetate ($Zr(OAc)_4$) (0.05 g/in$^3$) were added to the Pt—Pd—BaO—$CeO_2$—$Al_2O_3$ slurry. The final slurry was coated onto a second metallic substrate having a total volume of 2.0 l, wherein the second substrate was an electrically and thermally conductive flowthrough substrate such that it was possible to heat it up. The coated substrate was dried for 1 h at a temperature of 110° C. in air and then calcined for 1 h at a temperature of 590° C. in air.

The washcoat on the second substrate had a total loading of $CeO_2$ of 3.05 g/in$^3$ comprising 0.32 g/in$^3$ of $CeO_2$ which were used as support for Rh as described above. Further, the total loading of MgO was 0.3 g/in$^3$, the total loading of $ZrO_2$ was 0.05 g/in$^3$, and the total loading of BaO—$CeO_2$—$Al_2O_3$ as support for Pt and Pd was 2.66 g/in$^3$, wherein the BaO—$CeO_2$—$Al_2O_3$ comprised an amount of BaO of 0.26 g/in$^3$.

Based on said loadings the washcoat on the second substrate exhibited a ratio of the weight of Pt, calculated as elemental Pt, to the weight of Pd, calculated as elemental Pd, of 8.58:1, a ratio of the weight of Pt, calculated as elemental Pt, to the weight of Rh, calculated as elemental Rh, of 20.6:1, a ratio of the weight of Pd, calculated as elemental Pd, to the weight of Rh, calculated as elemental Rh, of 2.4:1.

The components were combined such that the first component was placed upstream of the second component to obtain a system comprising a NOx adsorber component and a lean NOx trap component, wherein the lean NOx trap component can be heated up.

Example 8: Sulfation/Desulfation Testing

In addition to NOx the lean NOx trap (LNT) also adsorbs sulfur and sulfur compounds. After 1-2 g/l sulfur loading the LNT usually needs to be desulfated applying a high temperature lean rich treatment from the engine. To simulate 50000 km driving an aging procedure as well as a sulfation/desulfation (DeSOx) procedure was applied on engine for the system according to Example 7.

Thus, the system according to Example 7 was tested in a Worldwide Harmonized Light Vehicle Test Cycle (WLTC) on a 2 l diesel engine after aging. As aging conditions, oven aging was performed for 16 h at 800° C. in air comprising 10 weight-% steam. Then, the system was loaded with 3 g/l sulfur at 300° C. via $SO_2$ injection.

For desulfation, the temperature upstream of the first catalyst component was set to 220° C. via the engine, and the second catalyst component was heated to a temperature of up to 500° C. Then, a desulfation (DeSOx) rich pulse was applied for 6 s at a lambda of 0.95, followed by a lean desulfation pulse for 75 s. Said lean/rich procedure was applied 15 times in total. The $SO_2$ release was measured downstream of the first as well as the second catalyst component. The results are shown in FIG. 6.

As can be gathered from the results shown in FIG. 6, the lean NOx trap component started to release $SO_2$ after 400 s when the temperature was in the range of from 450 to about 500° C., and when lambda was 0.95. Said finding shows that a desulfation of the lean NOx trap component is possible by heating of said component.

Example 9: Catalytic Testing in Accordance with the Worldwide Harmonized Light Vehicle Test Cycle (WLTC)

The system according to Example 7 was tested in a Worldwide Harmonized Light Vehicle Test Cycle (WLTC) on a 2 l diesel engine after an aging procedure and a sulfation/desulfation procedure according to Example 8.

FIG. 7 provides the NOx emissions determined during the cold start phase of the WLTC for the system according to Example 7 after aging and sulfation/desulfation (DeSOx) according to Example 8. As can be gathered from the results shown in FIG. 7, the system according to Example 7 is working properly and, thus, shows a low impact of desulfation (DeSOx) aging. Thus, it is shown that the NOx adsorption capacity of the lean NOx trap does not significantly decrease after desulfation (DeSOx) aging, which would have been expected for a common NOx lean trap.

CITED LITERATURE

Figure 1:
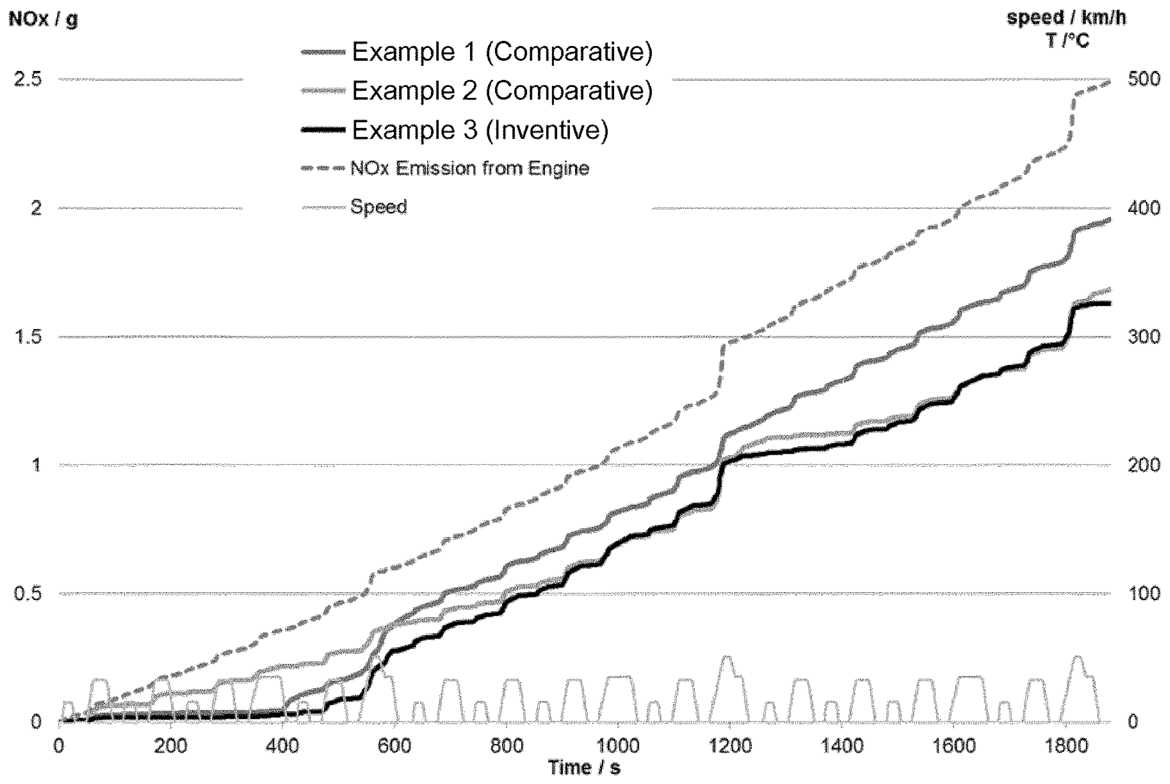
FIG. 1 shows the NOx adsorption for a simulated city cycle evaluation for the systems of Comparative Example 1, Comparative Example 2, and Example 3. On the abscissa, the time in s is given, on the left ordinate the NOx emission in g is given and on the right ordinate the speed in km/h and also the temperature in ° C. is given.
Figure 2:
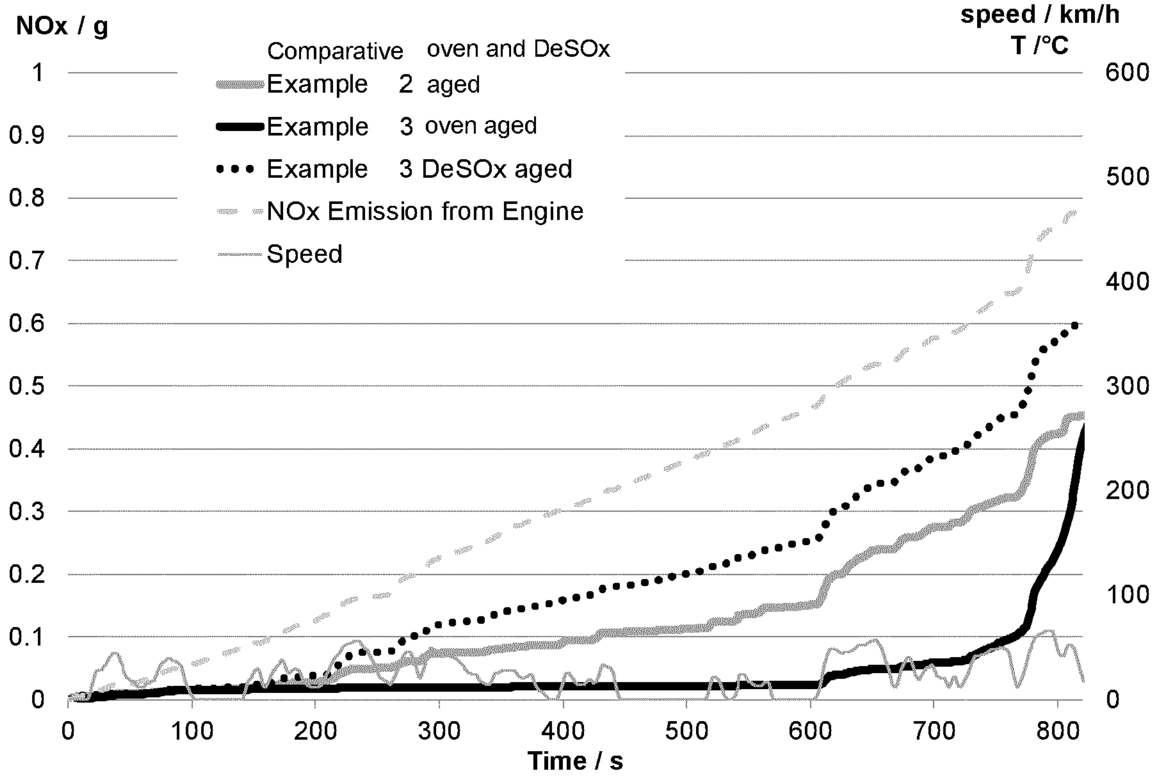
FIG. 2 shows the NOx emissions during the cold start phase in a worldwide harmonized light vehicle test cycle (WLTC) for the system according to Comparative Example 2 after oven aging and additional DeSOx aging, for the system according to Example 3 after oven aging, and for the system according to Example 3 after DeSOx aging. On the abscissa, the time in s is given, on the left ordinate the NOx emission in g is given and on the right ordinate the speed in km/h and also the temperature in ° C. is given.
Figure 3A:
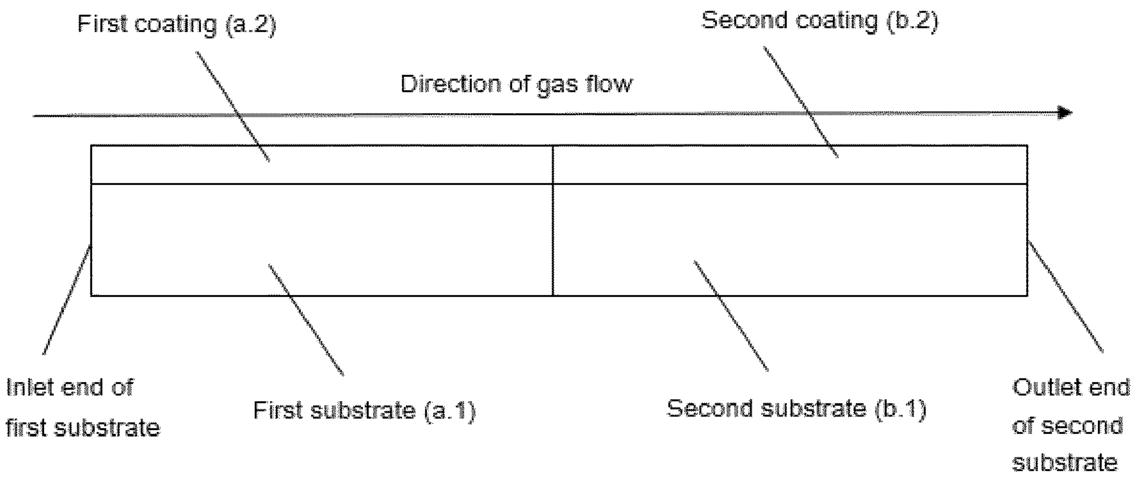
FIG. 3A: shows a system according to an embodiment of the present invention, wherein the first substrate (a.1) is coated with the first coating (a.2) over the total length of the first substrate and the second substrate (b.1) is coated with the second coating (b.2) over the total length of the second substrate, and wherein the first substrate and the second substrate are arranged in directly consecutive order.
Figure 3B:
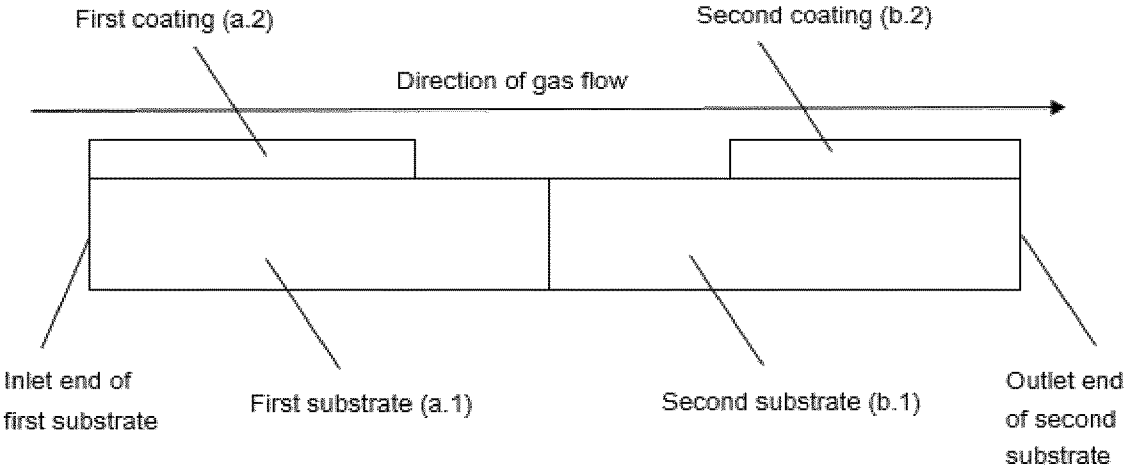
FIG. 3B: shows a system according to an embodiment of the present invention, wherein the first substrate (a.1) is coated with the first coating (a.2) over at least 50% of its length from its inlet end and the second substrate (b.1) is coated with the second coating (b.2) over at least 50% of its length from its outlet end, and wherein the first substrate and the second substrate are arranged in directly consecutive order.
Figure 4A:
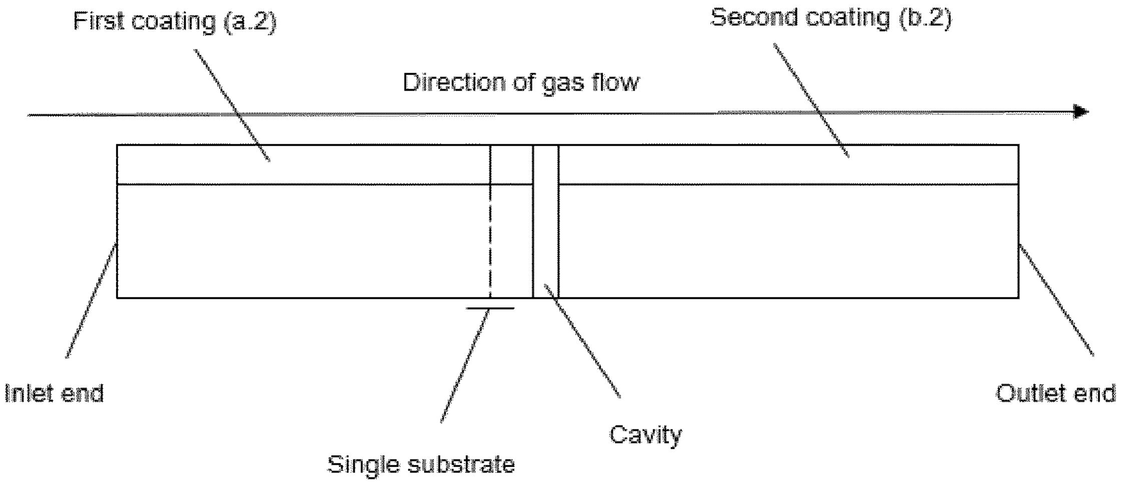
FIG. 4A: shows a system according to an embodiment of the present invention, wherein the first substrate (a.1) and the second substrate (b.1) form a single substrate, wherein the first substrate (a.1) is coated with the first coating (a.2) over the total length of the first substrate and the second substrate (b.1) is coated with the second coating (b.2) over the total length of the second substrate, and wherein a cavity is located in the single substrate.
Figure 4B:
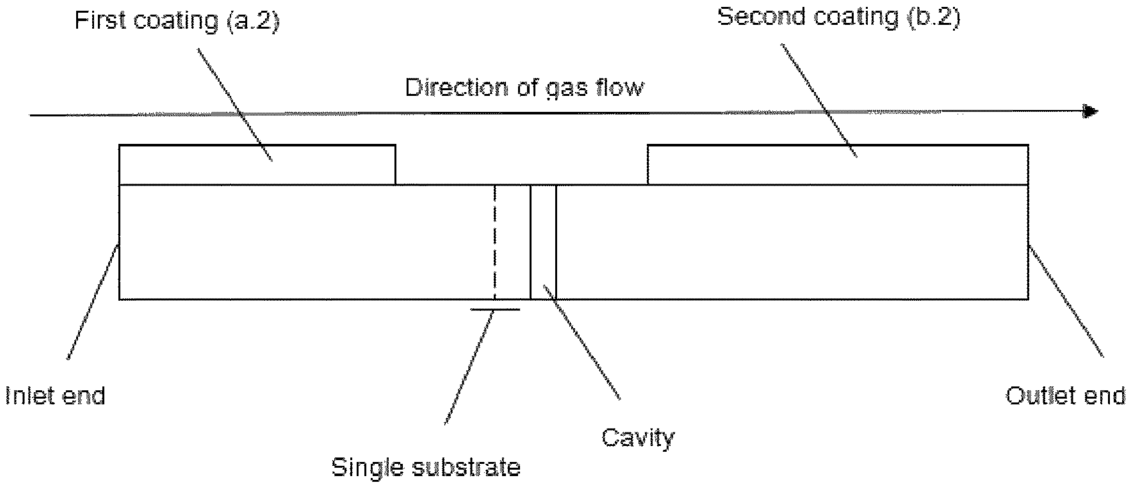
FIG. 4B: shows a system according to an embodiment of the present invention, wherein the first substrate (a.1) and the second substrate (b.1) form a single substrate, wherein the first substrate (a.1) is coated with the first coating (a.2) over at least 50% of its length from its inlet end and the second substrate (b.1) is coated with the second coating (b.2) over at least 50% of its length from its outlet end, and wherein a cavity is located in the single substrate.
Figure 5A:
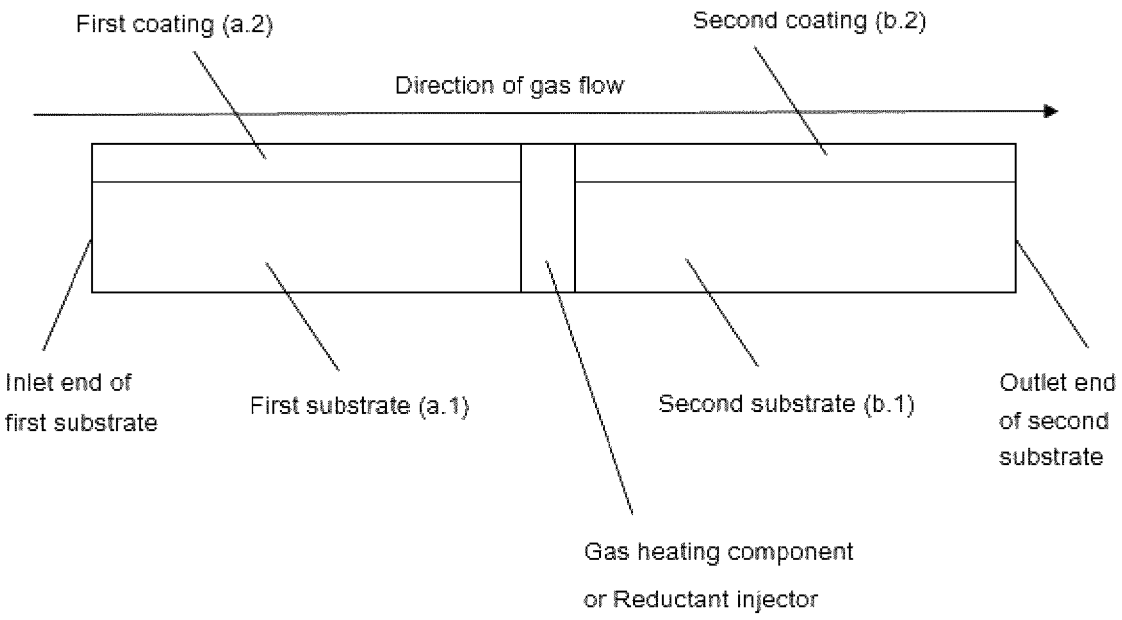
FIG. 5A: shows a system according to an embodiment of the present invention, wherein the first substrate (a.1) is coated with the first coating (a.2) over the total length of the first substrate and the second substrate (b.1) is coated with the second coating (b.2) over the total length of the second substrate, and wherein a gas heating component or a reductant injector is located between the first substrate and the second substrate.
Figure 5B:
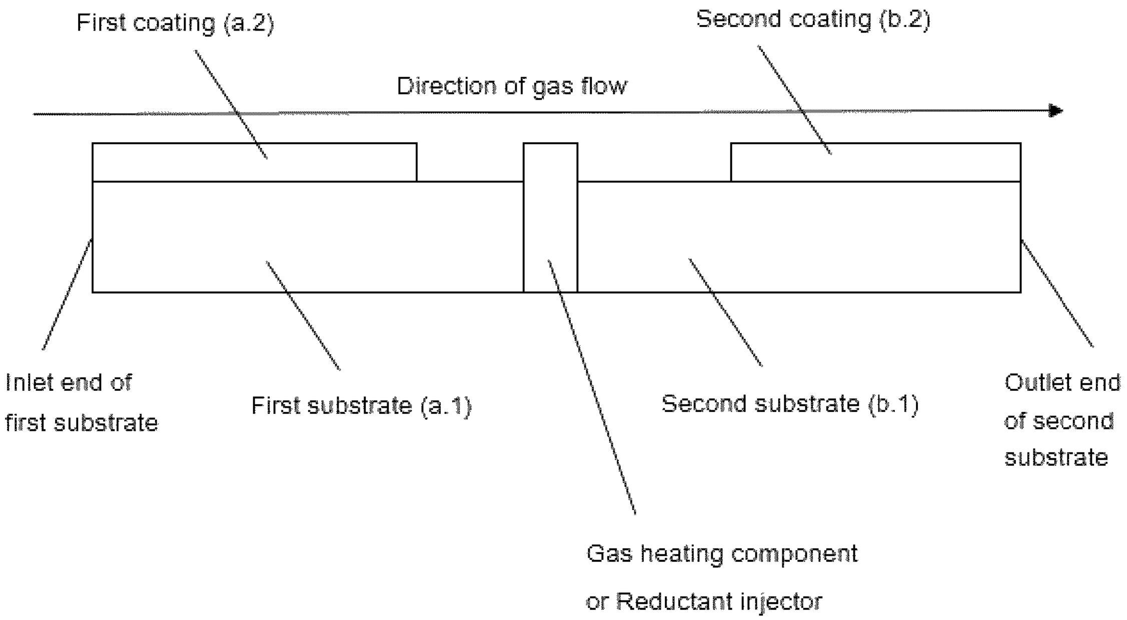
FIG. 5B: shows a system according to an embodiment of the present invention, wherein the first substrate (a.1) is coated with the first coating (a.2) over at least 50% of its length from its inlet end and the second substrate (b.1) is coated with the second coating (b.2) over at least 50% of its length from its outlet end, and wherein a gas heating component or a reductant injector is located between the first substrate and the second substrate.
Figure 6:
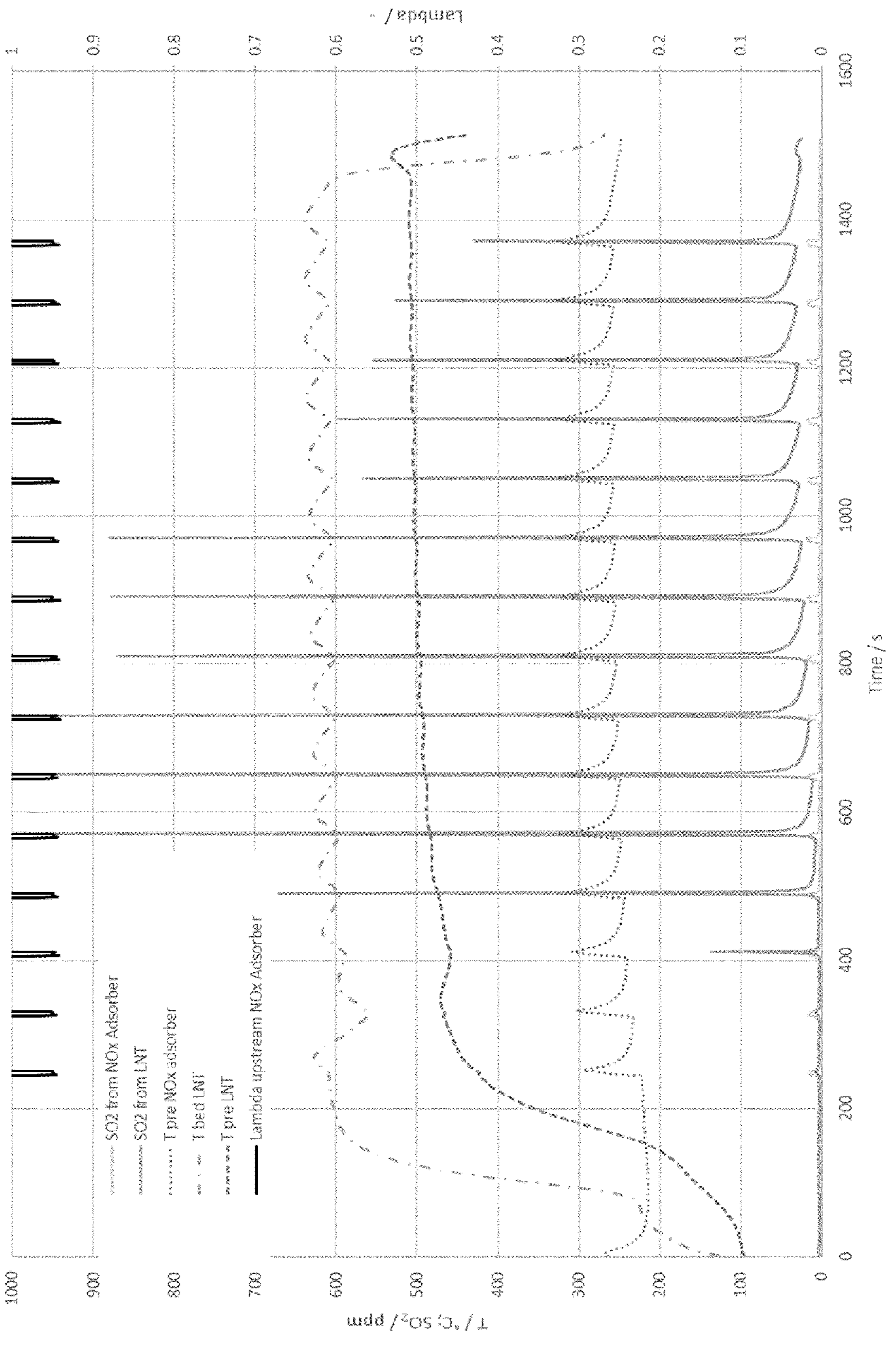
FIG. 6: shows the $SO_2$ emissions of the system according to Example 7 from the sulfation/desulfation testing according to Example 8. On the left ordinate, the temperature in ° C., and the $SO_2$ emission in ppm is given, and on the right ordinate the lambda is given. On the abscissa, the time in s is given for the sulfation/desulfation procedure according to Example 8.
Figure 7:
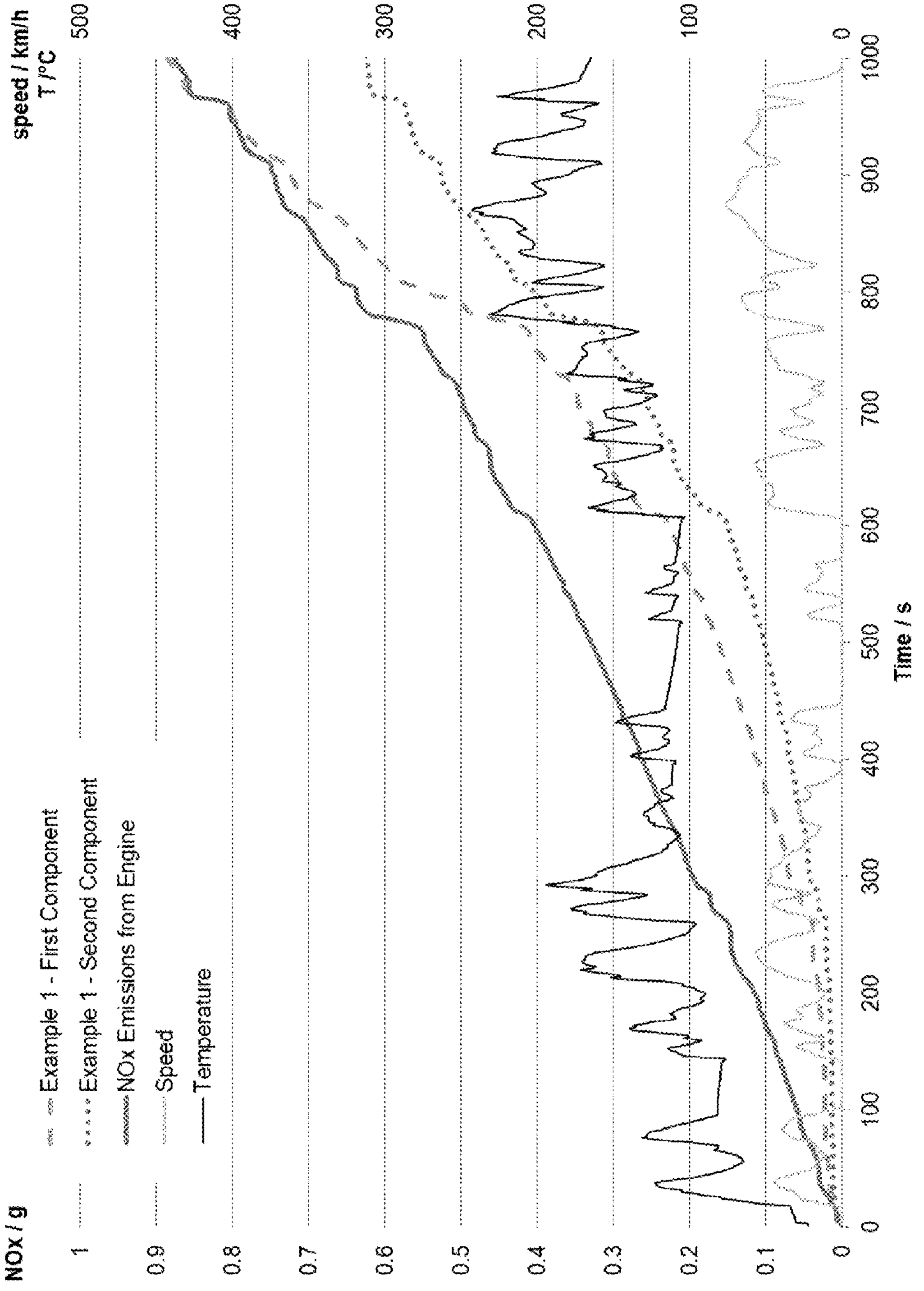
FIG. 7: shows the NOx emissions during the cold start phase in a worldwide harmonized light vehicle test cycle (WLTC) for the system according to Example 7 after SOx/DeSOx aging according to Example 8. On the abscissa, the time in s is given, on the left ordinate the NOx emission in g is given and on the right ordinate the speed in km/h and also the temperature in ° C. is given.

U.S. Pat. No. 10,005,075 B2
WO 2018/183688 A1
US 2018/0085707 A1
US 2017/0096922 A1
US 2015/075140 A1

The invention claimed is:

1. A system for the treatment of an exhaust gas of a diesel combustion engine, the system comprising a NOx adsorber component and a lean NOx trap component, wherein the NOx adsorber component is comprised in (a) a first catalyst comprising (a.1) a first substrate comprising an inlet end, an outlet end, a substrate axial length extending from the inlet end to the outlet end of the first substrate, and a plurality of passages defined by internal walls of the first substrate extending therethrough;

(a.2) a first coating being said NOx adsorber component, said coating being disposed on a surface of the internal walls of the first substrate over at least 50% of the substrate axial length of the first substrate, the first coating comprising a platinum group metal supported on a zeolitic material having a framework type FER; and wherein the lean NOx trap component is comprised in (b) a second catalyst comprising (b.1) a second substrate comprising an inlet end, an outlet end, a substrate axial length extending from the inlet end to the outlet end of the second substrate, and a plurality of passages defined by internal walls of the second substrate extending therethrough;

(b.2) a second coating being said lean NOx trap component, said coating being disposed on the surface of the internal walls of the second substrate over at least 50% of the substrate axial length of the second substrate, the second coating comprising a first non-zeolitic oxidic support material, Pt and Pd, wherein Pt and Pd are both supported on the first non-zeolitic oxidic support material;

wherein the first non-zeolitic oxidic support material comprises $CeO_2$ and $Al_2O_3$, wherein at least 45 weight-% of the first non-zeolitic oxidic support material consist of $Al_2O_3$, calculated as $Al_2O_3$, wherein at least 10 weight-% of the first non-zeolitic oxidic support material consist of $CeO_2$, calculated as $CeO_2$, wherein in said system the NOx adsorber component is arranged upstream of the lean NOx trap component.

2. The system of claim 1, wherein the zeolitic material according to (a.2) comprises a 10-membered ring pore zeolitic material.

3. The system of claim 1, wherein from 45 to 90 weight-% of the first non-zeolitic oxidic support material consist of $Al_2O_3$, calculated as $Al_2O_3$.

4. The system of claim 1, wherein the second coating according to (b.2) further comprises Rh and a second non-zeolitic oxidic support material, wherein Rh is supported on the second non-zeolitic oxidic support material.

5. The system of claim 4, wherein the second coating according to (b.2) exhibits a ratio of the weight of Pt, calculated as elemental Pt, to the weight of Rh, calculated as elemental Rh, in the range of from 5:1 to 50:1.

6. The system of claim 1, wherein the system further comprises at least one reductant injector, wherein each reductant injector is arranged between the NOx adsorber component and the lean NOx trap component.

7. The system of claim 1, further comprising (c) a gas heating component, wherein the gas heating component is arranged downstream of the NOx adsorber component and upstream of the lean NOx trap component.

8. The system of claim 1, wherein the first substrate according to (a.1) and the second substrate according to (b.1) together form one single substrate which comprises an inlet end, an outlet end, a substrate axial length extending from the inlet end to the outlet end of the single substrate, and a plurality of passages defined by internal walls of the single substrate extending therethrough, wherein the first coating according to (a.2) is disposed on the surface of the internal walls of the single substrate over at least 25% of the substrate axial length of the single substrate and the second coating according to (b.2) is disposed on the surface of the internal walls of the single substrate, the surface of the internal walls of the single substrate being at least partially coated with the first coating according to (a.2), over at least 25% of the substrate axial length of the single substrate.

9. The system of claim 8, wherein the single substrate comprises one or more cavities, wherein each cavity extends from an outer position, wherein the outer position is located at an outer surface of the single substrate, to an inner position, wherein the inner position is located within the single substrate.

10. The system of claim 9, wherein the system further comprises at least one reductant injector, and wherein each reductant injector is located in a cavity.

11. A process for preparing a system for the treatment of an exhaust gas of a diesel combustion engine according to claim 1, said process comprising (1) providing a NOx adsorber component and a lean NOx trap component wherein the NOx adsorber component is comprised in (i) a first catalyst comprising (i.1) a first substrate comprising an inlet end, an outlet end, a substrate axial length from the inlet end to the outlet end of the first substrate, and a plurality of passages extending defined by internal walls of the first substrate extending therethrough;

(i.2) a first coating being said NOx adsorber component, said coating being disposed on the surface of the internal walls of the first substrate over at least 50% of the substrate axial length of the first substrate, the first coating comprising a platinum group metal supported on a zeolitic material; and wherein the lean NOx trap component is comprised in (ii) a second catalyst comprising (ii.1) a second substrate comprising an inlet end, an outlet end, a substrate axial length extending from the inlet end to the outlet end of the second substrate, and a plurality of passages defined by internal walls of the second substrate extending therethrough;

(ii.2) a second coating being said lean NOx trap component, said coating being disposed on the surface of the internal walls of the second substrate over at least 50% of the substrate axial length of the second substrate, the second coating comprising Pt, Pd, and a first non-zeolitic oxidic support material, wherein Pt and Pd are both supported on the first non-zeolitic oxidic support material, wherein the first non-zeolitic oxidic support material comprises $CeO_2$ and $Al_2O_3$, wherein at least 45 weight-% of the first non-zeolitic oxidic support material consist of $Al_2O_3$, calculated as $Al_2O_3$, and wherein at least 10 weight-% of the first non-zeolitic oxidic support material consist of $CeO_2$, calculated as $CeO_2$;

(2) arranging the NOx adsorber component upstream of the lean NOx trap component.

12. A system for the treatment of an exhaust gas of a diesel combustion engine obtainable or obtained by a process according to claim 11.

13. A method for the treatment of an exhaust gas of a diesel combustion engine, comprising providing an exhaust gas from a diesel combustion engine and passing said exhaust gas through a system according to claim 1.

* * * * *